United States Patent
Wolf et al.

(10) Patent No.: US 10,430,821 B2
(45) Date of Patent: Oct. 1, 2019

(54) PREPAID REWARDS CREDITED TO A TRANSACTION ACCOUNT

(71) Applicant: American Express Travel Related Services Company, Inc., New York, NY (US)

(72) Inventors: David Wolf, Brooklyn, NY (US); Sripriya V. Tiku, Chandler, AZ (US); Scott M. Roen, Ridgewood, NJ (US); Jennifer M. Russo, Brooklyn, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 83 days.

(21) Appl. No.: 15/195,781

(22) Filed: Jun. 28, 2016

(65) Prior Publication Data

US 2016/0307226 A1    Oct. 20, 2016

Related U.S. Application Data

(63) Continuation-in-part of application No. 13/593,204, filed on Aug. 23, 2012, now Pat. No. 9,412,102, (Continued)

(51) Int. Cl.
*G06Q 30/00* (2012.01)
*G06Q 30/02* (2012.01)
(Continued)

(52) U.S. Cl.
CPC ......... *G06Q 30/0226* (2013.01); *G06Q 20/28* (2013.01); *G06Q 20/387* (2013.01);
(Continued)

(58) Field of Classification Search
CPC .......... G06Q 30/0226; G06Q 30/0215; G06Q 30/0234; G06Q 20/387; G06Q 20/28; G06Q 30/02
(Continued)

(56) References Cited

U.S. PATENT DOCUMENTS

| 4,833,308 A | 5/1989 | Humble |
| 4,882,675 A | 11/1989 | Nichtberger et al. |

(Continued)

FOREIGN PATENT DOCUMENTS

| WO | 2001086378 | 11/2001 |
| WO | 2012024109 | 2/2012 |

(Continued)

OTHER PUBLICATIONS

USPTO; Final Office Action dated Aug. 11, 2017 in U.S. Appl. No. 13/443,100.
(Continued)

*Primary Examiner* — Luis A Brown
(74) *Attorney, Agent, or Firm* — Snell & Wilmer, L.L.P.

(57) ABSTRACT

A system and method provide rewards or loyalty incentives to card member customers. The system includes an enrolled card member customer database, an enrolled merchant database, a participating merchant offer database and a registered card processor. The enrolled card member customer database includes transaction accounts of card member customers enrolled in a loyalty incentive program. If the purchase qualifies for a rebate credit, the registered card processor provides the rebate credit to an account of the enrolled card member customer. The registered card processor also provides for electronic notification of rewards offers or credit to prepaid cards, in response to purchases conforming to a specific set of merchant criteria. The system provides a coupon-less way for merchants to provide incentive discounts and/or credits to enrolled customers, along with notifying customers of other available incentive offers.

20 Claims, 13 Drawing Sheets

Related U.S. Application Data which is a continuation of application No. 12/857,424, filed on Aug. 16, 2010, now Pat. No. 9,558,505, which is a continuation-in-part of application No. 11/779,734, filed on Jul. 18, 2007, now Pat. No. 9,430,773.

(60) Provisional application No. 60/831,457, filed on Jul. 18, 2006.

(51) Int. Cl.
  *G06Q 20/28* (2012.01)
  *G06Q 20/38* (2012.01)

(52) U.S. Cl.
  CPC ......... *G06Q 30/02* (2013.01); *G06Q 30/0215* (2013.01); *G06Q 30/0234* (2013.01)

(58) Field of Classification Search
  USPC ........... 705/14.38, 14.34, 14.36, 14.3, 14.17, 705/14.1, 39, 26.1
  See application file for complete search history.

(56) References Cited

U.S. PATENT DOCUMENTS

| | | | |
|---|---|---|---|
| 5,025,372 A | 6/1991 | Burton et al. | |
| 5,467,269 A | 11/1995 | Flaten | |
| 5,471,669 A | 11/1995 | Lidman | |
| 5,729,693 A | 3/1998 | Holda-Fleck | |
| 5,918,211 A | 6/1999 | Sloane | |
| 5,923,016 A | 7/1999 | Fredregill et al. | |
| 5,948,040 A | 9/1999 | DeLorme et al. | |
| 5,953,706 A | 9/1999 | Patel | |
| 6,009,411 A * | 12/1999 | Kepecs | G06Q 20/387 705/14.17 |
| 6,018,718 A | 1/2000 | Walker et al. | |
| 6,035,280 A | 3/2000 | Christensen | |
| 6,039,244 A | 3/2000 | Finsterwald | |
| 6,222,914 B1 | 4/2001 | McMullin | |
| 6,266,649 B1 | 7/2001 | Linden et al. | |
| 6,298,330 B1 | 10/2001 | Gardensqwartz | |
| 6,321,208 B1 | 11/2001 | Barnett et al. | |
| 6,330,543 B1 | 12/2001 | Kepecs | |
| 6,332,126 B1 | 12/2001 | Peirce et al. | |
| 6,336,099 B1 | 1/2002 | Barnett et al. | |
| 6,343,317 B1 | 1/2002 | Glorikian | |
| 6,360,167 B1 | 3/2002 | Millington et al. | |
| 6,370,514 B1 | 4/2002 | Messner | |
| 6,381,603 B1 | 4/2002 | Chan et al. | |
| 6,414,635 B1 | 7/2002 | Stewart et al. | |
| 6,430,539 B1 | 8/2002 | Lazarus et al. | |
| 6,434,534 B1 | 8/2002 | Walker et al. | |
| 6,542,814 B2 | 4/2003 | Polidi et al. | |
| 6,584,448 B1 | 6/2003 | Laor | |
| 6,587,835 B1 | 7/2003 | Treyz et al. | |
| 6,594,640 B1 * | 7/2003 | Postrel | G06Q 20/06 705/14.27 |
| 6,606,619 B2 | 8/2003 | Ortega et al. | |
| 6,691,915 B1 | 2/2004 | Thaxton et al. | |
| 6,738,711 B2 | 5/2004 | Ohmura et al. | |
| 6,748,365 B1 | 6/2004 | Quinlan et al. | |
| 6,847,935 B1 | 1/2005 | Solomon | |
| 6,865,544 B1 | 3/2005 | Austin | |
| 6,882,290 B2 | 4/2005 | French et al. | |
| 6,883,708 B1 | 4/2005 | Fiedler et al. | |
| 6,904,408 B1 | 6/2005 | McCarthy et al. | |
| 6,915,265 B1 | 7/2005 | Johnson | |
| 6,937,995 B1 | 8/2005 | Kepecs | |
| 7,003,476 B1 | 2/2006 | Samra et al. | |
| 7,010,497 B1 | 3/2006 | Nyhan et al. | |
| 7,016,856 B1 | 3/2006 | Wiggins | |
| 7,016,860 B2 | 3/2006 | Modani et al. | |
| 7,054,830 B1 | 5/2006 | Eggleston et al. | |
| 7,072,851 B1 | 7/2006 | Wilcox et al. | |
| 7,107,238 B2 | 9/2006 | Hatakama et al. | |
| 7,120,591 B1 | 10/2006 | Solomon et al. | |
| 7,139,793 B2 | 11/2006 | Lala et al. | |
| 7,146,328 B1 | 12/2006 | Solomon et al. | |
| 7,165,037 B2 | 1/2007 | Lazarus et al. | |
| 7,302,429 B1 | 11/2007 | Wanker | |
| 7,392,224 B1 | 6/2008 | Bauer et al. | |
| 7,406,436 B1 | 7/2008 | Reisman | |
| 7,428,505 B1 | 9/2008 | Levy et al. | |
| 7,430,521 B2 | 9/2008 | Walker et al. | |
| 7,455,226 B1 * | 11/2008 | Hammond | G06Q 10/087 235/385 |
| 7,472,073 B1 | 12/2008 | Masi | |
| 7,493,268 B2 | 2/2009 | Kepros et al. | |
| 7,496,520 B1 | 2/2009 | Handel et al. | |
| 7,499,889 B2 | 3/2009 | Golan et al. | |
| 7,506,805 B1 | 3/2009 | Chakravarthy | |
| 7,512,551 B2 | 3/2009 | Postrel | |
| 7,596,566 B1 | 9/2009 | Patwardhan | |
| 7,599,858 B1 | 10/2009 | Grady et al. | |
| 7,618,318 B2 | 11/2009 | Ciancio et al. | |
| 7,630,935 B2 | 12/2009 | Loeger et al. | |
| 7,636,689 B2 | 12/2009 | Dent | |
| 7,647,278 B1 * | 1/2010 | Foth | G06Q 20/10 380/270 |
| 7,653,572 B1 | 1/2010 | Thompson | |
| 7,660,743 B1 | 2/2010 | Messa et al. | |
| 7,665,660 B2 | 2/2010 | Degliantoni et al. | |
| 7,668,749 B2 | 2/2010 | Kepros et al. | |
| 7,676,467 B1 | 3/2010 | Kozyrczak et al. | |
| 7,681,786 B1 | 3/2010 | Chakravarthy | |
| 7,702,540 B1 | 4/2010 | Woolston | |
| 7,706,808 B1 | 4/2010 | Aggarwal et al. | |
| 7,711,586 B2 | 5/2010 | Aggarwal et al. | |
| 7,734,486 B2 | 6/2010 | Mortimore, Jr. | |
| 7,739,134 B2 | 6/2010 | Mortimore, Jr. | |
| 7,742,954 B1 | 6/2010 | Handel et al. | |
| 7,743,002 B2 | 6/2010 | Hernandez | |
| 7,747,524 B2 | 6/2010 | Brown | |
| 7,765,119 B2 | 6/2010 | Messa et al. | |
| 7,751,805 B2 | 7/2010 | Neven | |
| 7,752,328 B2 | 7/2010 | Mortimore, Jr. et al. | |
| 7,788,141 B1 | 8/2010 | Sim | |
| 7,797,199 B2 | 9/2010 | Forshaw et al. | |
| 7,801,760 B2 | 9/2010 | Handel et al. | |
| 7,806,328 B2 | 10/2010 | Chakravarthy | |
| 7,814,029 B1 | 10/2010 | Siegel | |
| 7,844,488 B2 | 11/2010 | Merriman et al. | |
| 7,844,490 B2 | 11/2010 | Patterson | |
| 7,865,513 B2 | 1/2011 | Welch et al. | |
| 7,870,022 B2 | 1/2011 | Bous et al. | |
| 7,899,704 B1 | 3/2011 | Thompson | |
| 7,925,540 B1 | 4/2011 | Orttung et al. | |
| 7,933,810 B2 | 4/2011 | Morgenstern | |
| 7,937,330 B2 | 5/2011 | Handel et al. | |
| 7,941,374 B2 | 5/2011 | Orttung et al. | |
| 7,958,017 B1 | 6/2011 | Rempe et al. | |
| 7,962,381 B2 | 6/2011 | Handel et al. | |
| 7,966,213 B2 | 6/2011 | Messa et al. | |
| 7,970,666 B1 | 6/2011 | Handel | |
| 7,991,664 B1 | 8/2011 | Stone | |
| 8,070,056 B2 | 12/2011 | Feldman et al. | |
| 8,073,719 B2 | 12/2011 | Orttung et al. | |
| 8,078,496 B2 | 12/2011 | Postrel | |
| 8,082,270 B2 | 12/2011 | Goyal | |
| 8,090,707 B1 | 1/2012 | Orttung et al. | |
| 8,095,402 B2 | 1/2012 | Orttung et al. | |
| 8,108,304 B2 | 1/2012 | Loeger et al. | |
| 8,117,073 B1 | 2/2012 | Orttung et al. | |
| 8,121,953 B1 | 2/2012 | Orttung et al. | |
| 8,126,771 B2 | 2/2012 | Walker et al. | |
| 8,126,776 B2 | 2/2012 | Messa et al. | |
| 8,131,588 B2 | 3/2012 | Walker et al. | |
| 8,140,387 B2 | 3/2012 | Heywood | |
| 8,145,522 B2 | 3/2012 | Warren et al. | |
| 8,160,922 B2 | 4/2012 | Postrel | |
| 8,170,916 B1 | 5/2012 | Dicker et al. | |
| 8,175,926 B1 | 5/2012 | Handel et al. | |
| 8,180,682 B2 | 5/2012 | Narayanaswami et al. | |

(56) References Cited

U.S. PATENT DOCUMENTS

| | | | |
|---|---|---|---|
| 8,180,796 B1 | 5/2012 | Mah et al. | |
| 8,213,423 B1 | 7/2012 | Breau | |
| 8,249,934 B2 | 8/2012 | Agarwal et al. | |
| 8,438,061 B2 | 5/2013 | Grimes | |
| 8,459,551 B2 | 6/2013 | Lee et al. | |
| 8,463,643 B2 | 6/2013 | Bennett | |
| 8,463,706 B2 | 6/2013 | Cervenka et al. | |
| 8,463,851 B2 | 6/2013 | Bennett et al. | |
| 8,468,053 B2 | 6/2013 | Bennett | |
| 8,473,334 B2 | 6/2013 | Gibbs | |
| 8,484,088 B1 | 7/2013 | Orttung et al. | |
| 8,484,093 B2 | 7/2013 | Bennett et al. | |
| 8,489,452 B1 | 7/2013 | Warner et al. | |
| 8,489,456 B2 | 7/2013 | Burgess et al. | |
| 8,494,901 B2 | 7/2013 | Magadi et al. | |
| 8,494,914 B2 | 7/2013 | Mesaros | |
| 8,504,411 B1 | 8/2013 | Subasic | |
| 8,504,423 B2 | 8/2013 | Rotbard et al. | |
| 8,515,810 B2 | 8/2013 | Grimes | |
| 8,517,258 B2 | 8/2013 | Taylor et al. | |
| 8,543,470 B2 | 9/2013 | Grady et al. | |
| 8,554,670 B1 | 10/2013 | Blank | |
| 8,560,389 B2 | 10/2013 | Burgess et al. | |
| 8,573,477 B2 | 11/2013 | Bennett et al. | |
| 8,573,491 B2 | 11/2013 | Bennett et al. | |
| 8,606,630 B2 | 12/2013 | Fordyce, III et al. | |
| 8,615,426 B2 | 12/2013 | Carlson | |
| 8,621,068 B2 | 12/2013 | Zohar et al. | |
| 8,621,215 B1 | 12/2013 | Iyer | |
| 8,626,579 B2 | 1/2014 | Fordyce, III et al. | |
| 8,639,567 B2 | 1/2014 | Winters | |
| 8,650,071 B2 | 2/2014 | Pointer et al. | |
| 8,655,695 B1 | 2/2014 | Qu | |
| 8,725,635 B2 | 5/2014 | Klein et al. | |
| 8,874,674 B2 | 10/2014 | Allison et al. | |
| 9,009,082 B1 | 4/2015 | Marshall et al. | |
| 9,031,866 B1 | 5/2015 | Ng et al. | |
| 9,430,773 B2 | 8/2016 | Aloni et al. | |
| 2001/0014868 A1 | 8/2001 | Herz et al. | |
| 2001/0020242 A1 | 9/2001 | Gupta et al. | |
| 2001/0037254 A1 | 11/2001 | Glikman | |
| 2001/0054003 A1* | 12/2001 | Chien | G06Q 20/04 705/14.17 |
| 2002/0026348 A1* | 2/2002 | Fowler | G06Q 30/02 705/14.11 |
| 2002/0052841 A1 | 5/2002 | Guthrie | |
| 2002/0069079 A1 | 6/2002 | Vega | |
| 2002/0069312 A1 | 6/2002 | Jones | |
| 2002/0082920 A1 | 6/2002 | Austin et al. | |
| 2002/0095357 A1 | 7/2002 | Hunter et al. | |
| 2002/0099824 A1 | 7/2002 | Bender | |
| 2002/0138343 A1 | 9/2002 | Weatherford et al. | |
| 2002/0178056 A1 | 11/2002 | Lim | |
| 2002/0194069 A1 | 12/2002 | Thakur | |
| 2003/0004802 A1 | 1/2003 | Callegari | |
| 2003/0027630 A1 | 2/2003 | Kelly et al. | |
| 2003/0028426 A1 | 2/2003 | Banerjee | |
| 2003/0028518 A1 | 2/2003 | Mankoff | |
| 2003/0033211 A1 | 2/2003 | Haines et al. | |
| 2003/0061093 A1 | 3/2003 | Todd | |
| 2003/0078832 A1 | 4/2003 | Alvarez et al. | |
| 2003/0208442 A1 | 11/2003 | Cockrill et al. | |
| 2003/0233278 A1 | 12/2003 | Marshall | |
| 2004/0006509 A1 | 1/2004 | Mannik et al. | |
| 2004/0039686 A1 | 2/2004 | Klebenoff | |
| 2004/0098326 A1 | 5/2004 | James | |
| 2004/0098332 A1 | 5/2004 | Dvir | |
| 2004/0122736 A1 | 6/2004 | Strock et al. | |
| 2004/0143518 A1* | 7/2004 | Siegel | G06Q 10/087 705/28 |
| 2004/0153389 A1 | 8/2004 | Lortscher | |
| 2004/0172260 A1* | 9/2004 | Junger | G06Q 10/0833 705/21 |
| 2004/0215517 A1 | 10/2004 | Chen | |
| 2004/0225509 A1 | 11/2004 | Andre et al. | |
| 2004/0225573 A1 | 11/2004 | Ling | |
| 2004/0243468 A1 | 12/2004 | Cohagan et al. | |
| 2005/0010394 A1 | 1/2005 | Bergeron | |
| 2005/0010428 A1 | 1/2005 | Bergeron | |
| 2005/0010472 A1 | 1/2005 | Quatse et al. | |
| 2005/0021401 A1 | 1/2005 | Postrel | |
| 2005/0033583 A1 | 2/2005 | Bergeron | |
| 2005/0033605 A1 | 2/2005 | Bergeron | |
| 2005/0065848 A1 | 3/2005 | Mitchell et al. | |
| 2005/0071225 A1 | 3/2005 | Bortolin et al. | |
| 2005/0071227 A1 | 3/2005 | Hammad et al. | |
| 2005/0071228 A1* | 3/2005 | Bortolin | G06Q 20/387 705/14.27 |
| 2005/0071230 A1 | 3/2005 | Mankoff | |
| 2005/0075931 A1* | 4/2005 | Pearson | G06Q 30/02 705/2 |
| 2005/0075932 A1 | 4/2005 | Mankoff | |
| 2005/0096976 A1 | 5/2005 | Nelms | |
| 2005/0134449 A1* | 6/2005 | Barile | G06K 7/0008 340/505 |
| 2005/0149394 A1 | 7/2005 | Postrel | |
| 2005/0159996 A1* | 7/2005 | Lazarus | G06Q 30/02 705/7.31 |
| 2005/0160023 A1* | 7/2005 | Pearson | G06Q 20/06 705/35 |
| 2005/0165684 A1 | 7/2005 | Jensen | |
| 2005/0192863 A1* | 9/2005 | Mohan | G06Q 30/0277 705/14.19 |
| 2005/0234753 A1 | 10/2005 | Pinto | |
| 2005/0240477 A1 | 10/2005 | Friday et al. | |
| 2005/0246272 A1 | 11/2005 | Kitada et al. | |
| 2005/0273388 A1 | 12/2005 | Roetter | |
| 2005/0289003 A1* | 12/2005 | Thompson | G06Q 30/02 705/14.28 |
| 2006/0004633 A1 | 1/2006 | Ashbaugh | |
| 2006/0026067 A1 | 2/2006 | Nicholas et al. | |
| 2006/0041480 A1 | 2/2006 | Briggs | |
| 2006/0053056 A1 | 3/2006 | Alspach-Goss et al. | |
| 2006/0064372 A1* | 3/2006 | Gupta | G06Q 20/10 705/39 |
| 2006/0074749 A1 | 4/2006 | Kline | |
| 2006/0076400 A1 | 4/2006 | Fletcher | |
| 2006/0085240 A1 | 4/2006 | Salehi-sedeh et al. | |
| 2006/0095434 A1 | 5/2006 | McCullough et al. | |
| 2006/0111930 A1 | 5/2006 | Ayer et al. | |
| 2006/0116800 A1 | 6/2006 | Obradovich et al. | |
| 2006/0122874 A1 | 6/2006 | Postrel | |
| 2006/0129426 A1* | 6/2006 | Pearson | G06Q 20/06 705/2 |
| 2006/0136299 A1 | 6/2006 | Ruhmkorf | |
| 2006/0155603 A1 | 7/2006 | Abendroth et al. | |
| 2006/0155641 A1* | 7/2006 | Postrel | G06Q 20/10 705/39 |
| 2006/0167753 A1 | 7/2006 | Teague et al. | |
| 2006/0173672 A1 | 8/2006 | Bergeron | |
| 2006/0178932 A1 | 8/2006 | Lang | |
| 2006/0195359 A1* | 8/2006 | Robinson | G06Q 30/02 705/14.17 |
| 2006/0212355 A1 | 9/2006 | Teague et al. | |
| 2006/0224449 A1 | 10/2006 | Byerley et al. | |
| 2006/0235747 A1* | 10/2006 | Hammond | G06Q 10/10 705/14.24 |
| 2006/0241859 A1 | 10/2006 | Kimchi et al. | |
| 2006/0242011 A1 | 10/2006 | Bell et al. | |
| 2006/0253321 A1 | 11/2006 | Heywood | |
| 2006/0258397 A1 | 11/2006 | Kaplan et al. | |
| 2006/0259364 A1* | 11/2006 | Strock | G06Q 30/02 705/14.15 |
| 2006/0271552 A1 | 11/2006 | McChesney et al. | |
| 2006/0293957 A1 | 12/2006 | Petersen | |
| 2007/0000997 A1 | 1/2007 | Lambert et al. | |
| 2007/0010942 A1 | 1/2007 | Bill | |
| 2007/0016462 A1* | 1/2007 | Atkinson | G06Q 10/06 705/28 |
| 2007/0022019 A1 | 1/2007 | Sherwin et al. | |
| 2007/0033104 A1 | 2/2007 | Collins et al. | |
| 2007/0038515 A1 | 2/2007 | Postrel | |
| 2007/0038516 A1 | 2/2007 | Apple et al. | |

(56) References Cited

U.S. PATENT DOCUMENTS

| | | |
|---|---|---|
| 2007/0050258 A1 | 3/2007 | Dohse |
| 2007/0061216 A1 | 3/2007 | Jain et al. |
| 2007/0061223 A1 | 3/2007 | Rodriguez et al. |
| 2007/0073599 A1 | 3/2007 | Perry et al. |
| 2007/0083428 A1 | 4/2007 | Goldstein |
| 2007/0094114 A1* | 4/2007 | Bufford ............... G06Q 30/02 705/35 |
| 2007/0129995 A1 | 6/2007 | Brandow |
| 2007/0130000 A1 | 6/2007 | Assanassios |
| 2007/0136135 A1 | 6/2007 | Loeger et al. |
| 2007/0146812 A1 | 6/2007 | Lawton |
| 2007/0150349 A1 | 6/2007 | Handel et al. |
| 2007/0156515 A1* | 7/2007 | Hasselback ........... G06Q 30/02 705/14.27 |
| 2007/0156533 A1* | 7/2007 | Hammond ............ G06Q 10/10 705/14.35 |
| 2007/0157237 A1 | 7/2007 | Cordray |
| 2007/0192178 A1 | 8/2007 | Fung et al. |
| 2007/0192192 A1 | 8/2007 | Haberman et al. |
| 2007/0198354 A1 | 8/2007 | Senghore et al. |
| 2007/0198432 A1 | 8/2007 | Pitroda et al. |
| 2007/0198937 A1 | 8/2007 | Paris |
| 2007/0208879 A1 | 9/2007 | Liu |
| 2007/0210152 A1* | 9/2007 | Read ...................... G06Q 20/10 235/380 |
| 2007/0214040 A1 | 9/2007 | Patel et al. |
| 2007/0233517 A1 | 10/2007 | Dayal |
| 2007/0244741 A1* | 10/2007 | Blume ................... G06Q 30/02 705/7.31 |
| 2007/0244811 A1 | 10/2007 | Tumminaro |
| 2007/0260513 A1 | 11/2007 | Pavlov |
| 2007/0260523 A1* | 11/2007 | Schadt ................. G06Q 10/107 705/14.16 |
| 2007/0288312 A1 | 12/2007 | Wang |
| 2007/0288372 A1 | 12/2007 | Behar et al. |
| 2008/0004917 A1 | 1/2008 | Mortimore, Jr. |
| 2008/0004919 A1 | 1/2008 | Stubbs |
| 2008/0004980 A1 | 1/2008 | Hernandez |
| 2008/0005148 A1 | 1/2008 | Welch et al. |
| 2008/0021772 A1 | 1/2008 | Aloni et al. |
| 2008/0032720 A1 | 2/2008 | Mamdani et al. |
| 2008/0033857 A1* | 2/2008 | Moses ................... G06Q 20/342 705/35 |
| 2008/0040211 A1 | 2/2008 | Walker et al. |
| 2008/0040288 A1 | 2/2008 | Mortimore, Jr. et al. |
| 2008/0052140 A1 | 2/2008 | Neal et al. |
| 2008/0052151 A1 | 2/2008 | Xie et al. |
| 2008/0059220 A1 | 3/2008 | Roth et al. |
| 2008/0065491 A1 | 3/2008 | Bakman |
| 2008/0082418 A1 | 4/2008 | Fordyce et al. |
| 2008/0091445 A1 | 4/2008 | Mihic |
| 2008/0091528 A1 | 4/2008 | Rampell et al. |
| 2008/0091537 A1 | 4/2008 | Miller et al. |
| 2008/0091549 A1 | 4/2008 | Chang et al. |
| 2008/0091828 A1 | 4/2008 | Mortimore, Jr. |
| 2008/0092162 A1 | 4/2008 | Lundy et al. |
| 2008/0097846 A1* | 4/2008 | Oikawa ................ G06Q 20/327 705/14.1 |
| 2008/0109317 A1 | 5/2008 | Singh et al. |
| 2008/0109489 A1 | 5/2008 | Sherwood |
| 2008/0120129 A1 | 5/2008 | Seubert |
| 2008/0120155 A1 | 5/2008 | Pliha |
| 2008/0126515 A1 | 5/2008 | Chambers et al. |
| 2008/0133488 A1 | 6/2008 | Bandaru |
| 2008/0147450 A1 | 6/2008 | Mortimore, Jr. |
| 2008/0147514 A1 | 6/2008 | Shuster et al. |
| 2008/0147773 A1 | 6/2008 | Aaron |
| 2008/0154664 A1 | 6/2008 | Kuo et al. |
| 2008/0162206 A1 | 7/2008 | Mak et al. |
| 2008/0167991 A1 | 7/2008 | Carlson et al. |
| 2008/0189169 A1 | 8/2008 | Turpin et al. |
| 2008/0195475 A1 | 8/2008 | Lambert et al. |
| 2008/0195609 A1 | 8/2008 | Paris |
| 2008/0196060 A1 | 8/2008 | Varghese |
| 2008/0201197 A1 | 8/2008 | Orttung et al. |
| 2008/0201224 A1 | 8/2008 | Owens et al. |
| 2008/0201432 A1 | 8/2008 | Orttung et al. |
| 2008/0210753 A1 | 9/2008 | Plozay et al. |
| 2008/0255940 A1 | 10/2008 | Perreault et al. |
| 2008/0262925 A1 | 10/2008 | Kim |
| 2008/0263135 A1 | 10/2008 | Olliphant |
| 2008/0270223 A1 | 10/2008 | Collins et al. |
| 2008/0270251 A1 | 10/2008 | Coelho et al. |
| 2008/0276270 A1 | 11/2008 | Kotaru et al. |
| 2008/0281699 A1 | 11/2008 | Whitehead |
| 2008/0281710 A1 | 11/2008 | Hoal |
| 2008/0294624 A1 | 11/2008 | Kanigsberg et al. |
| 2008/0300894 A1 | 12/2008 | John |
| 2008/0300979 A1 | 12/2008 | Abhyanker |
| 2008/0306769 A1 | 12/2008 | Roberts |
| 2008/0313078 A1 | 12/2008 | Payne |
| 2009/0006142 A1 | 1/2009 | Orttung et al. |
| 2009/0006143 A1 | 1/2009 | Orttung et al. |
| 2009/0006188 A1 | 1/2009 | Guo et al. |
| 2009/0006194 A1 | 1/2009 | Sridharan et al. |
| 2009/0012839 A1 | 1/2009 | Fusillo et al. |
| 2009/0018916 A1 | 1/2009 | Seven et al. |
| 2009/0030609 A1 | 1/2009 | Orttung et al. |
| 2009/0030742 A1 | 1/2009 | Orttung et al. |
| 2009/0030769 A1 | 1/2009 | Orttung et al. |
| 2009/0030779 A1 | 1/2009 | Tollinger et al. |
| 2009/0037264 A1 | 2/2009 | Del Favero et al. |
| 2009/0055292 A1 | 2/2009 | Chong et al. |
| 2009/0063268 A1 | 3/2009 | Burgess et al. |
| 2009/0063351 A1* | 3/2009 | Schmeyer ............. G06Q 10/02 705/64 |
| 2009/0076870 A1* | 3/2009 | Hammond ........... G06Q 10/087 235/385 |
| 2009/0076912 A1 | 3/2009 | Rajan et al. |
| 2009/0094048 A1* | 4/2009 | Wallace ................ G06Q 30/02 705/319 |
| 2009/0106112 A1* | 4/2009 | Dalmia .................. G06Q 20/04 705/14.17 |
| 2009/0125719 A1 | 5/2009 | Cochran |
| 2009/0132347 A1 | 5/2009 | Anderson et al. |
| 2009/0140799 A1 | 6/2009 | Kasperkovitz |
| 2009/0150272 A1 | 6/2009 | Blythe |
| 2009/0156310 A1 | 6/2009 | Fargo |
| 2009/0163227 A1 | 6/2009 | Collins |
| 2009/0164314 A1 | 6/2009 | Blythe |
| 2009/0171842 A1 | 7/2009 | Blythe |
| 2009/0171853 A1 | 7/2009 | Georgiou et al. |
| 2009/0182718 A1 | 7/2009 | Waclawik et al. |
| 2009/0210261 A1 | 8/2009 | Mortimore, Jr. et al. |
| 2009/0228365 A1 | 9/2009 | Tomchek et al. |
| 2009/0247193 A1 | 10/2009 | Kalavade |
| 2009/0247282 A1 | 10/2009 | Cheng |
| 2009/0248457 A1 | 10/2009 | Munter et al. |
| 2009/0248543 A1 | 10/2009 | Nihalani et al. |
| 2009/0259499 A1 | 10/2009 | Bhojwani et al. |
| 2009/0265236 A1 | 10/2009 | Schultz et al. |
| 2009/0271263 A1 | 10/2009 | Regmi et al. |
| 2009/0276306 A1 | 11/2009 | Hicks |
| 2009/0287562 A1* | 11/2009 | Bosch .................. G06Q 20/387 705/14.27 |
| 2009/0288012 A1 | 11/2009 | Hertel et al. |
| 2009/0288140 A1 | 11/2009 | Huber |
| 2009/0289111 A1 | 11/2009 | Motycka et al. |
| 2009/0313109 A1 | 12/2009 | Bous et al. |
| 2009/0319353 A1 | 12/2009 | Palmeri |
| 2009/0327062 A1 | 12/2009 | Botes |
| 2009/0327129 A1 | 12/2009 | Collas |
| 2009/0327174 A1 | 12/2009 | Honkala |
| 2010/0002722 A1 | 1/2010 | Porat |
| 2010/0057565 A1 | 3/2010 | Au-Yeung et al. |
| 2010/0076777 A1 | 3/2010 | Paretti et al. |
| 2010/0079336 A1 | 4/2010 | Skibiski et al. |
| 2010/0082418 A1 | 4/2010 | Loeger et al. |
| 2010/0082446 A1 | 4/2010 | Hjelm et al. |
| 2010/0088174 A1 | 4/2010 | Cohagan et al. |
| 2010/0094697 A1 | 4/2010 | Cananaugh |
| 2010/0094698 A1 | 4/2010 | Cawley |
| 2010/0094699 A1 | 4/2010 | Beal |

(56) References Cited

U.S. PATENT DOCUMENTS

| | | |
|---|---|---|
| 2010/0106568 A1 | 4/2010 | Grimes |
| 2010/0106569 A1 | 4/2010 | Grimes |
| 2010/0106578 A1 | 4/2010 | Allio et al. |
| 2010/0106596 A1 | 4/2010 | Grimes |
| 2010/0114661 A1 | 5/2010 | Alderfer |
| 2010/0114686 A1 | 5/2010 | Carlson et al. |
| 2010/0131342 A1 | 5/2010 | Thibedeau |
| 2010/0131840 A1 | 5/2010 | Walker et al. |
| 2010/0138299 A1 | 6/2010 | Preston et al. |
| 2010/0145744 A1 | 6/2010 | Beck et al. |
| 2010/0145762 A1 | 6/2010 | Coladonato et al. |
| 2010/0145778 A1 | 6/2010 | Fordyce et al. |
| 2010/0145786 A1 | 6/2010 | Fordyce, III et al. |
| 2010/0145798 A1 | 6/2010 | Richards |
| 2010/0145860 A1 | 6/2010 | Pelegero |
| 2010/0153194 A1 | 6/2010 | Oram |
| 2010/0179879 A1 | 7/2010 | Cunningham et al. |
| 2010/0191572 A1 | 7/2010 | Newman et al. |
| 2010/0203963 A1* | 8/2010 | Allen .............. G07F 17/32 463/30 |
| 2010/0211419 A1 | 8/2010 | Nickolayev et al. |
| 2010/0228613 A1 | 9/2010 | Anderson et al. |
| 2010/0241502 A1 | 9/2010 | Walker et al. |
| 2010/0241559 A1 | 9/2010 | O'Connor et al. |
| 2010/0250351 A1 | 9/2010 | Gillenson et al. |
| 2010/0250356 A1 | 9/2010 | Gillenson et al. |
| 2010/0257047 A1 | 10/2010 | Foodman et al. |
| 2010/0262456 A1 | 10/2010 | Feng et al. |
| 2010/0312629 A1 | 12/2010 | Wolf et al. |
| 2010/0324990 A1 | 12/2010 | D'Angelo et al. |
| 2010/0325048 A1 | 12/2010 | Carlson |
| 2010/0332307 A1 | 12/2010 | Parento |
| 2011/0004497 A1 | 1/2011 | Mortimore, Jr. et al. |
| 2011/0022448 A1 | 1/2011 | Strock et al. |
| 2011/0022455 A1 | 1/2011 | Wolf et al. |
| 2011/0029363 A1 | 2/2011 | Gillenson et al. |
| 2011/0029364 A1 | 2/2011 | Roeding et al. |
| 2011/0029367 A1 | 2/2011 | Olson et al. |
| 2011/0035266 A1 | 2/2011 | Patterson |
| 2011/0040539 A1 | 2/2011 | Szymczyk et al. |
| 2011/0047023 A1 | 2/2011 | Lieblang et al. |
| 2011/0055880 A1 | 3/2011 | Archer |
| 2011/0066483 A1 | 3/2011 | Salmon et al. |
| 2011/0066548 A1 | 3/2011 | Rodin |
| 2011/0078030 A1 | 3/2011 | Borst et al. |
| 2011/0078055 A1 | 3/2011 | Faribault et al. |
| 2011/0083101 A1 | 4/2011 | Sharon et al. |
| 2011/0087530 A1 | 4/2011 | Fordyce et al. |
| 2011/0087531 A1 | 4/2011 | Winters et al. |
| 2011/0093327 A1 | 4/2011 | Fordyce et al. |
| 2011/0093335 A1 | 4/2011 | Fordyce et al. |
| 2011/0093361 A1 | 4/2011 | Morales |
| 2011/0106607 A1 | 5/2011 | Alfonso et al. |
| 2011/0119133 A1 | 5/2011 | Igelman et al. |
| 2011/0125561 A1 | 5/2011 | Marcus |
| 2011/0125565 A1 | 5/2011 | MacIlwaine et al. |
| 2011/0131077 A1 | 6/2011 | Tan |
| 2011/0137716 A1 | 6/2011 | Reuthe et al. |
| 2011/0137717 A1 | 6/2011 | Reuthe et al. |
| 2011/0137721 A1 | 6/2011 | Bansal |
| 2011/0145047 A1 | 6/2011 | Chetty et al. |
| 2011/0145149 A1 | 6/2011 | Valdes et al. |
| 2011/0161149 A1 | 6/2011 | Kaplan |
| 2011/0161154 A1 | 6/2011 | McLaughlin et al. |
| 2011/0161172 A1 | 6/2011 | Lee |
| 2011/0167440 A1 | 7/2011 | Greenfield |
| 2011/0178928 A1 | 7/2011 | Carmichael et al. |
| 2011/0184792 A1 | 7/2011 | Butcher et al. |
| 2011/0191150 A1 | 8/2011 | Blackhurst et al. |
| 2011/0213670 A1 | 9/2011 | Strutton |
| 2011/0218031 A1 | 9/2011 | Bryant et al. |
| 2011/0225033 A1 | 9/2011 | Schmeyer et al. |
| 2011/0231224 A1 | 9/2011 | Winters |
| 2011/0231235 A1 | 9/2011 | MacIlwaine et al. |
| 2011/0231246 A1 | 9/2011 | Bhatia et al. |
| 2011/0238469 A1 | 9/2011 | Gershman et al. |
| 2011/0246219 A1 | 10/2011 | Smith |
| 2011/0246280 A1 | 10/2011 | Satyavolu et al. |
| 2011/0246281 A1 | 10/2011 | Satyavolu et al. |
| 2011/0246287 A1* | 10/2011 | Wright ................ G06Q 10/00 705/14.45 |
| 2011/0246299 A1 | 10/2011 | Satyavolu et al. |
| 2011/0251883 A1 | 10/2011 | Satyavolu et al. |
| 2011/0251891 A1 | 10/2011 | Satyavolu et al. |
| 2011/0251934 A1 | 10/2011 | Satyavolu et al. |
| 2011/0258011 A1 | 10/2011 | Burns |
| 2011/0264490 A1 | 10/2011 | Durvasula et al. |
| 2011/0270617 A1 | 11/2011 | Murta et al. |
| 2011/0270666 A1 | 11/2011 | Welsh et al. |
| 2011/0276373 A1 | 11/2011 | Juszczak et al. |
| 2011/0276377 A1 | 11/2011 | Kim et al. |
| 2011/0282702 A1 | 11/2011 | Mortimore, Jr. |
| 2011/0288918 A1 | 11/2011 | Cervenka et al. |
| 2011/0295689 A1 | 12/2011 | Brady |
| 2011/0295749 A1 | 12/2011 | Scalisi |
| 2011/0302011 A1 | 12/2011 | Yoder et al. |
| 2011/0307509 A1 | 12/2011 | Hsiao |
| 2011/0313840 A1 | 12/2011 | Mason et al. |
| 2011/0313874 A1 | 12/2011 | Hardie et al. |
| 2011/0320250 A1 | 12/2011 | Gemmell et al. |
| 2012/0004964 A1 | 1/2012 | Satyavolu et al. |
| 2012/0004965 A1 | 1/2012 | Satyavolu et al. |
| 2012/0004966 A1 | 1/2012 | Satyavolu et al. |
| 2012/0004967 A1 | 1/2012 | Satyavolu et al. |
| 2012/0004968 A1 | 1/2012 | Satyavolu et al. |
| 2012/0004969 A1 | 1/2012 | Satyavolu et al. |
| 2012/0004970 A1 | 1/2012 | Satyavolu et al. |
| 2012/0004975 A1 | 1/2012 | Satyavolu et al. |
| 2012/0010932 A1 | 1/2012 | Satyavolu et al. |
| 2012/0010933 A1 | 1/2012 | Satyavolu et al. |
| 2012/0010934 A1 | 1/2012 | Walker et al. |
| 2012/0010936 A1 | 1/2012 | Satyavolu et al. |
| 2012/0010937 A1 | 1/2012 | Hanson et al. |
| 2012/0022923 A1 | 1/2012 | Walker et al. |
| 2012/0023122 A1 | 1/2012 | Gregov et al. |
| 2012/0029990 A1 | 2/2012 | Fisher |
| 2012/0029996 A1 | 2/2012 | Lang et al. |
| 2012/0030048 A1 | 2/2012 | Manley et al. |
| 2012/0035997 A1 | 2/2012 | Burgess et al. |
| 2012/0036079 A1 | 2/2012 | Sushil et al. |
| 2012/0036178 A1 | 2/2012 | Gavini et al. |
| 2012/0046958 A1 | 2/2012 | Pynadath |
| 2012/0047008 A1 | 2/2012 | Alhadeff et al. |
| 2012/0053987 A1 | 3/2012 | Satyavolu et al. |
| 2012/0059701 A1 | 3/2012 | Van der Veen et al. |
| 2012/0066037 A1 | 3/2012 | Glen |
| 2012/0066046 A1 | 3/2012 | Satyavolu et al. |
| 2012/0066050 A1 | 3/2012 | Satyavolu et al. |
| 2012/0066051 A1 | 3/2012 | Black et al. |
| 2012/0066062 A1 | 3/2012 | Yoder et al. |
| 2012/0072270 A1 | 3/2012 | Waylonis et al. |
| 2012/0078689 A1 | 3/2012 | Rothschild |
| 2012/0101881 A1 | 4/2012 | Taylor et al. |
| 2012/0109751 A1 | 5/2012 | Binenstock et al. |
| 2012/0130536 A1* | 5/2012 | Canter ................ G06Q 20/18 700/237 |
| 2012/0130737 A1 | 5/2012 | Finizio |
| 2012/0150641 A1 | 6/2012 | Dobbs |
| 2012/0150740 A1* | 6/2012 | Isaacson ............. G06Q 10/101 705/41 |
| 2012/0196568 A1 | 8/2012 | Bakshi |
| 2012/0196675 A1* | 8/2012 | Ferdinand ............. G06Q 30/02 463/29 |
| 2012/0197707 A1 | 8/2012 | Cohagan |
| 2012/0197887 A1 | 8/2012 | Anderson |
| 2012/0203604 A1 | 8/2012 | Brown et al. |
| 2012/0203846 A1 | 8/2012 | Hull et al. |
| 2012/0209672 A1 | 8/2012 | Winner et al. |
| 2012/0209695 A1 | 8/2012 | Winner et al. |
| 2012/0209696 A1 | 8/2012 | Winner et al. |
| 2012/0209771 A1 | 8/2012 | Winner et al. |
| 2012/0220308 A1 | 8/2012 | Ledlie |
| 2012/0221437 A1 | 8/2012 | Yoo |
| 2012/0221479 A1 | 8/2012 | Schneck et al. |

(56) References Cited

U.S. PATENT DOCUMENTS

| | | |
|---|---|---|
| 2012/0226530 A1 | 9/2012 | Gebb et al. |
| 2012/0239417 A1 | 9/2012 | Pourfallah |
| 2012/0239479 A1 | 9/2012 | Amaro et al. |
| 2012/0246004 A1 | 9/2012 | Book |
| 2012/0253852 A1 | 10/2012 | Pourfallah |
| 2012/0253957 A1 | 10/2012 | Bakshi |
| 2012/0278127 A1 | 11/2012 | Kirakosyan et al. |
| 2012/0296724 A1 | 11/2012 | Faro et al. |
| 2012/0303425 A1 | 11/2012 | Katzin et al. |
| 2012/0303430 A1 | 11/2012 | Tiku et al. |
| 2013/0006737 A1 | 1/2013 | Goldberg |
| 2013/0006766 A1 | 1/2013 | Dedeoglu |
| 2013/0013396 A1 | 1/2013 | Vinson et al. |
| 2013/0024256 A1 | 1/2013 | Wolf et al. |
| 2013/0040654 A1 | 2/2013 | Parish |
| 2013/0041902 A1 | 2/2013 | Swann et al. |
| 2013/0060623 A1 | 3/2013 | Walker et al. |
| 2013/0060644 A1 | 3/2013 | Le Quay |
| 2013/0073336 A1 | 3/2013 | Heath |
| 2013/0073361 A1 | 3/2013 | Silver |
| 2013/0073366 A1 | 3/2013 | Heath |
| 2013/0073371 A1 | 3/2013 | Bosworth et al. |
| 2013/0073374 A1 | 3/2013 | Heath |
| 2013/0073376 A1 | 3/2013 | Heath |
| 2013/0073377 A1 | 3/2013 | Heath |
| 2013/0073387 A1 | 3/2013 | Heath |
| 2013/0073388 A1 | 3/2013 | Heath |
| 2013/0073389 A1 | 3/2013 | Heath |
| 2013/0073400 A1 | 3/2013 | Heath |
| 2013/0073473 A1 | 3/2013 | Heath |
| 2013/0073568 A1 | 3/2013 | Federov et al. |
| 2013/0080259 A1 | 3/2013 | Durvasula |
| 2013/0091000 A1 | 4/2013 | Hagey et al. |
| 2013/0103472 A1 | 4/2013 | Burgess et al. |
| 2013/0110555 A1 | 5/2013 | Dunham |
| 2013/0110604 A1 | 5/2013 | Rooke et al. |
| 2013/0124283 A1 | 5/2013 | Kaulbach |
| 2013/0132175 A1 | 5/2013 | Claessen et al. |
| 2013/0132183 A1 | 5/2013 | Klein et al. |
| 2013/0145016 A1 | 6/2013 | Vantalon |
| 2013/0151602 A1 | 6/2013 | McClelland et al. |
| 2013/0173320 A1 | 7/2013 | Bank et al. |
| 2013/0173478 A1 | 7/2013 | Farhi |
| 2013/0178280 A1 | 7/2013 | Ganz |
| 2013/0179246 A1 | 7/2013 | Ross et al. |
| 2013/0191195 A1 | 7/2013 | Carlson et al. |
| 2013/0212177 A1 | 8/2013 | Friedman |
| 2013/0218653 A1 | 8/2013 | Rooke et al. |
| 2013/0238412 A1 | 9/2013 | Boncyk et al. |
| 2013/0246146 A1 | 9/2013 | Fischer et al. |
| 2013/0246185 A1 | 9/2013 | Hardman et al. |
| 2013/0260727 A1 | 10/2013 | Knudson et al. |
| 2013/0262209 A1 | 10/2013 | Bayer |
| 2013/0268333 A1 | 10/2013 | Ovick et al. |
| 2013/0275192 A1 | 10/2013 | Aissa |
| 2013/0304563 A1 | 11/2013 | Haupt et al. |
| 2013/0325946 A1 | 12/2013 | Allison, Jr. et al. |
| 2013/0346170 A1 | 12/2013 | Epstein et al. |
| 2014/0006129 A1 | 1/2014 | Heath |
| 2014/0006132 A1 | 1/2014 | Barker |
| 2014/0025451 A1 | 1/2014 | Knowles et al. |
| 2014/0025452 A1 | 1/2014 | Knowles et al. |
| 2014/0025453 A1 | 1/2014 | Knowles et al. |
| 2014/0025460 A1 | 1/2014 | Knowles et al. |
| 2014/0046675 A1 | 2/2014 | Harwood |
| 2014/0046744 A1 | 2/2014 | Hagey |
| 2014/0046748 A1 | 2/2014 | Nagarajan et al. |
| 2014/0046794 A1 | 2/2014 | Vallery |
| 2014/0108108 A1 | 4/2014 | Artman et al. |
| 2014/0164199 A1 | 6/2014 | Wilkes |
| 2015/0039393 A1 | 2/2015 | Jain |
| 2015/0073980 A1 | 3/2015 | Griffin |
| 2015/0170256 A1 | 6/2015 | Pettyjohn |
| 2015/0248702 A1 | 9/2015 | Chatterton |
| 2016/0307226 A1* | 10/2016 | Wolf .................. G06Q 20/28 |

FOREIGN PATENT DOCUMENTS

| | | |
|---|---|---|
| WO | 2012106114 | 8/2012 |
| WO | 2012170088 | 12/2012 |
| WO | 2013015846 | 1/2013 |
| WO | 2014106207 | 7/2014 |
| WO | 2015102889 | 7/2015 |
| WO | 2015134947 | 9/2015 |

OTHER PUBLICATIONS

USPTO; Final Office Action dated Aug. 18, 2017 in U.S. Appl. No. 13/794,272.
USPTO; Non-Final Office Action dated Aug. 30, 2017 in U.S. Appl. No. 13/941,306.
USPTO; Final Office Action dated Sep. 20, 2017 in U.S. Appl. No. 13/466,412.
Examination Report dated Jan. 11, 2017 in Australian Application No. 2016201509.
USPTO; Final Office Action dated Jan. 19, 2017 in U.S. Appl. No. 13/466,445.
USPTO; Final Office Action dated Jan. 20, 2017 in U.S. Appl. No. 13/467,503.
Examination Report dated Jan. 23, 2017 in Australian Application No. 2015201925.
USPTO; Office Action dated Jan. 23, 2017 in U.S. Appl. No. 14/464,439.
USPTO; Advisory Action dated Jan. 25, 2017 in U.S. Appl. No. 14/284,817.
USPTO; Office Action dated Jan. 30, 2017 in U.S. Appl. No. 14/464,474.
USPTO; Notice of Allowance dated Feb. 2, 2017 in U.S. Appl. No. 12/857,389.
USPTO; Advisory Action dated Feb. 7, 2017 in U.S. Appl. No. 13/188,693.
USPTO; Final Office Action dated Feb. 8, 2017 in U.S. Appl. No. 13/715,770.
USPTO; Final Office Action dated Feb. 9, 2017 in U.S. Appl. No. 13/443,100.
USPTO; Final Office Action dated Feb. 14, 2017 in U.S. Appl. No. 13/466,412.
USPTO; Notice of Allowance dated Feb. 14, 2017 in U.S. Appl. No. 13/794,226.
USPTO; Notice of Allowance dated Feb. 15, 2017 in U.S. Appl. No. 13/794,145.
USPTO; Notice of Allowance dated Feb. 16, 2017 in U.S. Appl. No. 13/889,307.
Examination Report dated Feb. 24, 2017 in Australian Application No. 2015201925.
USPTO; Advisory Action dated Feb. 27, 2017 in U.S. Appl. No. 13/468,880.
USPTO; Final Office Action dated Feb. 27, 2017 in U.S. Appl. No. 13/926,895.
Pocket-lint, Apples iBeacons explained: What it is and why it matters, retrieved from internet on Feb. 21, 2017, http://web.archive.org/web/20130925141212/http://www.packet-lint.com/news/123730-apple-sibeacons-explained-what-it-is-and-why-it-matters> published on Sep. 25, 2013 as per Wayback Machine, 10 pages.
Office Action dated Jan. 11, 2017 in Canadian Application No. 2,849,271.
Office Action dated Feb. 15, 2017 in Canadian Application No. 2,874,582.
USPTO; Notice of Allowance dated Mar. 10, 2017 in U.S. Appl. No. 13/467,503.
USPTO; Advisory Action dated Mar. 10, 2017 in U.S. Appl. No. 13/466,445.
USPTO; Advisory Action dated Mar. 13, 2017 in U.S. Appl. No. 13/466,412.
Morris, U.S. Appl. No. 15/456,777, filed Mar. 13, 2017 and entitled Purchase Instructions Complying With Reservation Instructions.
USPTO; Notice of Allowance dated Mar. 15, 2017 in U.S. Appl. No. 13/476,910.

(56) References Cited

OTHER PUBLICATIONS

USPTO; Advisory Action dated Mar. 23, 2017 in U.S. Appl. No. 13/443,100.
Examination Report dated Mar. 23, 2017 in Australian Application No. 2016201509.
USPTO; Notice of Allowance dated Mar. 24, 2017 in U.S. Appl. No. 13/794,334.
USPTO; Final Office Action dated Mar. 27, 2017 in U.S. Appl. No. 13/794,374.
Notice of Allowance dated Mar. 29, 2017 in Canadian Application No. 2,888,085.
USPTO; Advisory Action dated Mar. 29, 2017 in U.S. Appl. No. 13/715,770.
USPTO; Office Action dated Apr. 7, 2017 in U.S. Appl. No. 13/889,272.
USPTO; Office Action dated Apr. 10, 2017 in U.S. Appl. No. 13/443,100.
USPTO; Office Action dated Apr. 12, 2017 in U.S. Appl. No. 13/794,272.
USPTO; Office Action dated Apr. 13, 2017 in U.S. Appl. No. 13/466,412.
USPTO; Notice of Allowance dated Apr. 17, 2017 in U.S. Appl. No. 13/466,445.
USPTO; Notice of Allowance dated Apr. 20, 2017 in U.S. Appl. No. 13/889,288.
USPTO; Final Office Action dated Apr. 20, 2017 in U.S. Appl. No. 14/065,883.
USPTO; Final Office Action dated Apr. 20, 2017 in U.S. Appl. No. 13/941,306.
USPTO; Notice of Allowance dated Apr. 24, 2017 in U.S. Appl. No. 13/926,895.
Aloni, U.S. Appl. No. 15/495,428, filed Apr. 24, 2017 and entitled Offers Selected During Authorization.
Fischer, U.S. Appl. No. 15/494,940, filed Apr. 24, 2017 and entitled Ranking Merchants Based on a Normalized Popularity Score.
USPTO; Final Office Action dated Apr. 28, 2017 in U.S. Appl. No. 13/153,890.
USPTO; Final Office Action dated Apr. 28, 2017 in U.S. Appl. No. 13/889,305.
USPTO; Final Office Action dated May 4, 2017 in U.S. Appl. No. 13/794,301.
USPTO; Final Office Action dated May 17, 2017 in U.S. Appl. No. 13/411,281.
USPTO; Advisory Action dated May 17, 2017 U.S. Appl. No. 13/794,374.
USPTO; Final Office Action dated May 17, 2017 in U.S. Appl. No. 14/464,439.
USPTO; Final Office Action dated May 17, 2017 in U.S. Appl. No. 14/464,474.
USPTO; Final Office Action dated Apr. 11, 2011 in U.S. Appl. No. 12/857,389.
USPTO; Final Office Action dated Apr. 5, 2011 in U.S. Appl. No. 12/857,424.
Todorova, Aleksandra, "The Best Rewards Programs," www.smartmoney.com, Sep. 2005, pp. 1-2.
Todorova, Aleksandra, "Capital One Tests a New Type of Debit Card," www.smartmoney.com, Jun. 2007, pp. 1-2.
Nickel, "Citi Thank You Redemptions: No Thanks," www.fivecentnickel.com, Sep. 2005.
American Express Website, Frequenty Asked Questions regarding American Express GiftCards, www.americanexpress.com/gift/faq from Feb. 25, 2005, 2 pages.
USPTO; Office Action dated Nov. 26, 2010 in U.S. Appl. No. 12/857,424.
USPTO; Office Action dated Nov. 26, 2010 in U.S. Appl. No. 12/857,389.
USPTO; Office Action dated Apr. 30, 2010 in U.S. Appl. No. 11/779,734.
USPTO; Advisory Action dated Jan. 6, 2011 in U.S. Appl. No. 11/779,734.
USPTO; Final Office Action dated Oct. 15, 2010 in U.S. Appl. No. 11/779,734.
USPTO; Advisory Action dated Jul. 11, 2011 in U.S. Appl. No. 12/857,389.
USPTO; Advisory Action dated Jul. 11, 2011 in U.S. Appl. No. 12/857,424.
PCT; International Search Report and Written Opinion dated Nov. 17, 2011 in Application No. PCT/US2011/047012.
USPTO; Office Action dated Nov. 10, 2011 in U.S. Appl. No. 13/153,890.
USPTO; Final Office Action dated Apr. 5, 2012 in U.S. Appl. No. 13/153,890.
PCT; International Search Report and Written Opinion dated May 7, 2012 in Application No. PCT/US2012/021648.
PCT; International Search Report and Written Opinion dated Jun. 19, 2012 in Application No. PCT/US2012/027810.
PCT; International Search Report and Written Opinion dated Jul. 6, 2012 in Application No. PCT/US2012/027664.
USPTO; Office Action dated Aug. 3, 2012 in U.S. Appl. No. 13/466,412.
USPTO; Office Action dated Aug. 17, 2012 in U.S. Appl. No. 13/466,445.
USPTO; Office Action dated Aug. 30, 2012 in U.S. Appl. No. 13/188,693.
USPTO; Office Action dated Aug. 30, 2012 in U.S. Appl. No. 13/468,880.
USPTO; Office Action dated Sep. 6, 2012 in U.S. Appl. No. 13/467,503.
USPTO; Office Action dated Sep. 14, 2012 in U.S. Appl. No. 13/476,910.
USPTO; Office Action dated Sep. 17, 2012 in U.S. Appl. No. 13/021,237.
USPTO; Office Action dated Oct. 9, 2012 in U.S. Appl. No. 13/468,931.
USPTO; Office Action dated Oct. 9, 2012 in U.S. Appl. No. 13/477,806.
USPTO; Office Action dated Oct. 12, 2012 in U.S. Appl. No. 13/439,768.
USPTO; Final Office Action dated Oct. 12, 2012 in U.S. Appl. No. 13/466,412.
USPTO; Office Action dated Oct. 15, 2012 in U.S. Appl. No. 13/594,528.
USPTO; Office Action dated Oct. 18, 2012 in U.S. Appl. No. 13/593,204.
USPTO; Office Action dated Oct. 19, 2012 in U.S. Appl. No. 13/411,281.
Dan Oshinsky, "Jet Blues $1 Million Twitter Hashtag," Aug. 18, 2010, 4 pages, retrieved from: http://danoshinsky.com/2010/08/18/a-social-media-case-study-jetblue-vs-sun-country/.
USPTO; Office Action dated Nov. 15, 2012 in U.S. Appl. No. 13/443,100.
USPTO; Advisory Action dated Nov. 23, 2012 in U.S. Appl. No. 13/466,412.
International Preliminary Report on Patentability dated Dec. 7, 2012 in Application No. PCT/US2011/047012.
MG Seigler, "Want Everyone to See your Credit Card Transactions? Of Course you do. Meet Blippy.", techcrunch.com, Dec. 11, 2009, 3 pages.
Tsotsis, Alexia, "The End of Blippy as We Know it." techcrunch.com, May 19, 2011, 3 pages.
USPTO; Office Action dated Jan. 4, 2013 in U.S. Appl. No. 13/593,204.
USPTO; Office Action dated Jan. 7, 2013 in U.S. Appl. No. 13/467,503.
USPTO; Office Action dated Jan. 7, 2013 in U.S. Appl. No. 13/466,445.
USPTO; Advisory Action dated Mar. 15, 2013 in U.S. Appl. No. 13/593,204.
USPTO; Advisory Action dated Mar. 18, 2013 in U.S. Appl. No. 13/467,503.
USPTO; Advisory Action dated Mar. 19, 2013 in U.S. Appl. No. 13/021,237.

(56) References Cited

OTHER PUBLICATIONS

USPTO; Advisory Action dated Mar. 19, 2013 in U.S. Appl. No. 13/468,931.
International Search Report and Written Opinion dated Mar. 22, 2013 in Application No. PCT/2013/028209.
USPTO; Advisory Action dated Mar. 28, 2013 in U.S. Appl. No. 13/411,281.
USPTO; Office Action dated Apr. 11, 2013 in U.S. Appl. No. 12/857,424.
USPTO; Office Action dated Apr. 12, 2013 in U.S. Appl. No. 13/467,910.
Supplementary Examination Report dated Oct. 17, 2016 in New Zealand Application No. 11201400788P.
USPTO; Advisory Action dated Oct. 31, 2016 in U.S. Appl. No. 13/889,288.
USPTO; Advisory Action dated Nov. 1, 2016 in U.S. Appl. No. 13/153,890.
USPTO; Final Office Action dated Nov. 1, 2016 in U.S. Appl. No. 13/926,895.
Notice of Eligibility for Grant dated Nov. 1, 2016 in Singapore Application No. 11201400788P.
USPTO; Notice of Allowance dated Nov. 2, 2016 in U.S. Appl. No. 13/477,806.
USPTO; Advisory Action dated Nov. 3, 2016 in U.S. Appl. No. 14/065,883.
USPTO; Advisory Action dated Nov. 4, 2016 in U.S. Appl. No. 13/443,100.
USPTO; Final Office Action dated Nov. 4, 2016 in U.S. Appl. No. 13/794,334.
USPTO; Office Action dated Nov. 10, 2016 in U.S. Appl. No. 13/476,910.
USPTO; Final Office Action dated Nov. 10, 2016 in U.S. Appl. No. 14/284,817.
USPTO; Advisory Action dated Nov. 15, 2016 in U.S. Appl. No. 13/889,299.
USPTO; Advisory Action dated Nov. 16, 2016 in U.S. Appl. No. 13/941,306.
USPTO; Notice of Allowance dated Nov. 17, 2016 in U.S. Appl. No. 12/857,424.
USPTO; Final Office Action dated Nov. 17, 2016 in U.S. Appl. No. 13/188,693.
USPTO; Notice of Allowance dated Nov. 18, 2016 in U.S. Appl. No. 13/468,931.
USPTO; Office Action dated Nov. 18, 2016 in U.S. Appl. No. 13/443,100.
Examination Report dated Nov. 22, 016 in Australian Application No. 2015201925.
USPTO; Office Action dated Nov. 28, 2016 in U.S. Appl. No. 14/065,883.
USPTO; Office Action dated Dec. 2, 2016 in U.S. Appl. No. 13/153,890.
USPTO; Office Action dated Dec. 14, 2016 in U.S. Appl. No. 13/941,306.
USPTO; Advisory Action dated Dec. 14, 2016 in U.S. Appl. No. 13/794,334.
USPTO; Final Office Action dated Dec. 15, 2016 in U.S. Appl. No. 13/468,880.
USPTO; Office Action dated Dec. 15, 2016 in U.S. Appl. No. 13/411,281.
USPTO; Office Action dated Dec. 20, 2016 in U.S. Appl. No. 13/889,305.
USPTO; Office Action dated Jan. 4, 2017 in U.S. Appl. No. 13/794,334.
USPTO; Office Action dated Jan. 13, 2017 in U.S. Appl. No. 13/794,374.
USPTO; Advisory Action dated Dec. 8, 2016 in U.S. Appl. No. 13/926,895.
USPTO; Office Action dated Jun. 3, 2016 in U.S. Appl. No. 14/065,883.
USPTO; Office Action dated Jun. 3, 2016 in U.S. Appl. No. 12/857,424.
USPTO; Notice of Allowance dated Jun. 3, 2016 in U.S. Appl. No. 13/593,204.
USPTO; Final Office Action dated Jun. 8, 2016 in U.S. Appl. No. 12/857,389.
USPTO; Office Action dated Jun. 9, 2016 in U.S. Appl. No. 13/926,895.
USPTO; Final Office Action dated Jun. 10, 2016 in U.S. Appl. No. 13/466,412.
USPTO; Final Office Action dated Jun. 13, 2016 in U.S. Appl. No. 13/468,931.
USPTO; Final Office Action dated Jun. 15, 2016 in U.S. Appl. No. 13/686,608.
USPTO; Office Action dated Jun. 17, 2016 in U.S. Appl. No. 13/468,880.
USPTO; Office Action dated Jun. 17, 2016 in U.S. Appl. No. 13/941,306.
USPTO; Final Office Action dated Jun. 17, 2016 in U.S. Appl. No. 13/794,145.
USPTO; Advisory Action dated Jun. 24, 2016 in U.S. Appl. No. 13/715,770.
USPTO; Final Office Action dated Jul. 1, 2016 in U.S. Appl. No. 13/794,226.
USPTO; Final Office Action dated Jul. 5, 2016 in U.S. Appl. No. 13/889,305.
USPTO; Advisory Action dated Jul. 6, 2016 in U.S. Appl. No. 13/468,931.
USPTO; Office Action dated Jul. 7, 2016 in U.S. Appl. No. 14/284,817.
USPTO; Notice of Allowance dated Jul. 13, 2016 in U.S. Appl. No. 11/779,734.
USPTO; Final Office Action dated Jul. 28, 2016 in U.S. Appl. No. 13/889,272.
USPTO; Final Office Action dated Aug. 12, 2016in U.S. Appl. No. 13/889,299.
"What is a token in programming?" Quora, pp. 1-3, retrieved from https://www.quora.com/What-is-a-token-in-programming on May 31, 2016.
IP Australia; Examination Report dated Aug. 3, 2016 in Australian Application No. 2015201925.
USPTO; Advisory Action dated Aug. 17, 2016 in U.S. Appl. No. 12/857,389.
CIPO; Notice of Allowance dated Aug. 18, 2016 in Canadian Application No. 2,863,576.
USPTO; Advisory Action dated Aug. 18, 2016 in U.S. Appl. No. 13/466,412.
USPTO; Notice of Allowance dated Aug. 24, 2016 in U.S. Appl. No. 13/021,237.
USPTO; Advisory Action dated Aug. 24, 2016 in U.S. Appl. No. 13/686,608.
USPTO; Office Action dated Aug. 24, 2016 in U.S. Appl. No. 13/794,334.
USPTO; Final Office Action dated Aug. 25, 2016 in U.S. Appl. No. 13/466,445.
USPTO; Advisory Action dated Aug. 25, 2016 in U.S. Appl. No. 13/794,145.
USPTO; Final Office Action dated Aug. 26, 2016 in U.S. Appl. No. 13/443,100.
USPTO; Final Office Action dated Aug. 30, 2016 in U.S. Appl. No. 13/889,307.
USPTO; Office Action dated Sep. 2, 2016 in U.S. Appl. No. 13/467,503.
USPTO; Final Office Action dated Sep. 2, 2016 in U.S. Appl. No. 12/857,424.
USPTO; Final Office Action dated Sep. 7, 2016 in U.S. Appl. No. 13/153,890.
USPTO; Notice of Allowance dated Sep. 9, 2016 in U.S. Appl. No. 13/926,789.
USPTO; Advisory Action dated Sep. 12, 2016 in U.S. Appl. No. 13/889,305.
USPTO; Final Office Action dated Sep. 14, 2016 in U.S. Appl. No. 13/477,806.

(56) References Cited

OTHER PUBLICATIONS

USPTO; Advisory Action dated Sep. 21, 2016 in U.S. Appl. No. 13/889,272.
USPTO; Final Office Action dated Sep. 22, 2016 in U.S. Appl. No. 13/889,288.
USPTO; Advisory Action dated Sep. 22, 2016 in U.S. Appl. No. 13/794,226.
USPTO; Final Office Action dated Sep. 23, 2016 in U.S. Appl. No. 14/065,883.
USPTO; Office Action dated Sep. 29, 2016 in U.S. Appl. No. 12/857,389.
USPTO; Office Action dated Sep. 29, 2016 in U.S. Appl. No. 13/466,412.
USPTO; Final Office Action dated Sep. 30, 2016 in U.S. Appl. No. 13/941,306.
USPTO; Office Action dated Oct. 7, 2016 in U.S. Appl. No. 13/715,770.
USPTO; Notice of Allowance dated Oct. 11, 2016 in U.S. Appl. No. 13/926,884.
USPTO; Office Action dated Oct. 11, 2016 in U.S. Appl. No. 13/794,145.
USPTO; Office Action dated Oct. 11, 2016 in U.S. Appl. No. 13/794,226.
USPTO; Office Action dated Oct. 11, 2016 in U.S. Appl. No. 13/794,301.
USPTO; Advisory Action dated Oct. 20, 2016 in U.S. Appl. No. 13/889,307.
USPTO; Advisory Action dated Oct. 27, 2016 in U.S. Appl. No. 12/857,424.
USPTO; Office Action dated Oct. 23, 2014 in U.S. Appl. No. 13/715,770.
USPTO; Advisory Action dated Oct. 24, 2014 in U.S. Appl. No. 13/153,890.
USPTO; Office Action dated Oct. 29, 2014 in U.S. Appl. No. 13/926,884.
USPTO; Office Action dated Oct. 29, 2014 in U.S. Appl. No. 13/926,895.
USPTO; Office Action dated Nov. 7, 2014 in U.S. Appl. No. 13/715,792.
USPTO; Office Action dated Nov. 7, 2014 in U.S. Appl. No. 13/715,423.
USPTO; Office Action dated Dec. 29, 2014 in U.S. Appl. No. 13/188,693.
USPTO; Office Action dated Jan. 9, 2015 in U.S. Appl. No. 13/468,880.
USPTO; Office Action dated Jan. 16, 2015 in U.S. Appl. No. 13/889,299.
USPTO; Advisory Action dated Sep. 5, 2014 in U.S. Appl. No. 13/889,305.
USPTO; Office Action dated Sep. 17, 2014 in U.S. Appl. No. 13/794,226.
USPTO; Office Action dated Sep. 26, 2014 in U.S. Appl. No. 13/477,806.
USPTO; Office Action dated Oct. 17, 2014 in U.S. Appl. No. 14/065,883.
USPTO; Office Action dated Oct. 17, 2014 in U.S. Appl. No. 11/779,734.
USPTO; Office Action dated Oct. 20, 2014 in U.S. Appl. No. 13/941,306.
USPTO; Office Action dated Oct. 3, 2014 in U.S. Appl. No. 12/857,424.
USPTO; Office Action dated Oct. 8, 2014 in U.S. Appl. No. 13/734,693.
USPTO; Office Action dated Oct. 9, 2014 in U.S. Serial No. 13/926,789.
USPTO; Final Office Action dated Jan. 30, 2015 in U.S. Appl. No. 13/794,301.
USPTO; Final Office Action dated Feb. 11, 2015 in U.S. Appl. No. 14/065,883.
USPTO; Final Office Action dated Feb. 13, 2015 in U.S. Appl. No. 13/794,334.
Search Report and Written Opinion dated Feb. 16, 2015 in Singapore Application No. 11201400788P.
USPTO; Final Office Action dated Feb. 26, 2015 in U.S. Appl. No. 13/941,306.
USPTO; Office Action dated Feb. 27, 2015 in U.S. Appl. No. 13/443,100.
USPTO; Office Action dated Mar. 2, 2015 in U.S. Appl. No. 13/686,608.
USPTO; Final Office Action dated Mar. 13, 2015 in U.S. Appl. No. 13/794,374.
USPTO; Final Office Action dated Mar. 23, 2015 in U.S. Appl. No. 13/926,789.
Examination Report dated Mar. 24, 2015 in Australian Application No. 2012316453.
USPTO; Final Office Action dated Mar. 25, 2015 in U.S. Appl. No. 13/477,806.
USPTO; Final Office Action dated Mar. 25, 2015 in U.S. Appl. No. 13/794,226.
USPTO; Office Action dated Mar. 27, 2015 in U.S. Appl. No. 13/466,445.
USPTO; Final Office Action dated Apr. 3, 2015 in U.S. Appl. No. 13/926,884.
USPTO; Final Office Action dated Apr. 3, 2015 in U.S. Appl. No. 13/715,770.
USPTO; Final Office Action dated Apr. 7, 2015 in U.S. Appl. No. 13/926,895.
USPTO; Advisory Action dated Apr. 8, 2015 in U.S. Appl. No. 13/794,301.
USPTO; Office Action dated Apr. 8, 2015 in U.S. Appl. No. 13/021,237.
USPTO; Final Office Action dated Apr. 8, 2015 in U.S. Appl. No. 13/794,145.
USPTO; Final Office Action dated Apr. 13, 2015 in U.S. Appl. No. 13/734,693.
USPTO; Advisory Action dated Apr. 17, 2015 in U.S. Appl. No. 13/889,307.
USPTO; Final Office Action dated Apr. 17, 2015 in U.S. Appl. No. 13/715,792.
USPTO; Advisory Action dated Apr. 23, 2015 in U.S. Appl. No. 13/794,334.
USPTO; Advisory Action dated Apr. 23, 2015 in U.S. Appl. No. 14/065,883.
USPTO; Final Office Action dated Apr. 30, 2015 in U.S. Appl. No. 12/857,424.
Notice of Acceptance dated May 8, 2015 in New Zealand Application No. 623019.
USPTO; Advisory Action dated May 8, 2015 in U.S. Appl. No. 13/941,306.
USPTO; Final Office Action dated May 13, 2015 in U.S. Appl. No. 11/779,734.
USPTO; Office Action dated May 19, 2015 in U.S. Appl. No. 13/476,910.
USPTO; Office Action dated May 28, 2015 in U.S. Appl. No. 13/467,503.
USPTO; Advisory Action dated Jun. 3, 2015 in U.S. Appl. No. 13/794,226.
USPTO; Advisory Action dated Jun. 3, 2015 in U.S. Appl. No. 13/794,374.
USPTO; Advisory Action dated Jun. 10, 2015 in U.S. Appl. No. 13/477,806.
USPTO; Advisory Action dated Jun. 11, 2015 in U.S. Appl. No. 13/926,789.
USPTO; Advisory Action dated Jun. 15, 2015 in U.S. Appl. No. 13/715,770.
USPTO; Office Action dated Jun. 19, 2015 in U.S. Appl. No. 13/794,301.
USPTO; Office Action dated Jun. 25, 2015 in U.S. Appl. No. 13/889,307.
USPTO; Advisory Action dated Jun. 25, 2015 in U.S. Appl. No. 13/734,693.

(56) References Cited

OTHER PUBLICATIONS

USPTO; Advisory Action dated Jun. 26, 2015 in U.S. Appl. No. 13/794,145.
USPTO; Advisory Action dated Jun. 29, 2015 in U.S. Appl. No. 13/715,792.
USPTO; Office Action dated Jul. 10, 2015 in U.S. Appl. No. 13/794,374.
USPTO; Advisory Action dated Jul. 10, 2015 in U.S. Appl. No. 12/857,424.
USPTO; Office Action dated Jul. 10, 2015 in U.S. Appl. No. 13/411,281.
USPTO; Final Office Action dated Jul. 17, 2015 in U.S. Appl. No. 13/188,693.
USPTO; Final Office Action dated Jul. 20, 2015 in U.S. Appl. No. 13/686,608.
USPTO; Advisory Action dated Jul. 21, 2015 in U.S. Appl. No. 11/779,734.
USPTO; Final Office Action dated Jul. 23, 2015 in U.S. Appl. No. 13/466,445.
USPTO; Office Action dated Aug. 4, 2015 in U.S. Appl. No. 13/794,334.
USPTO; Office Action dated Aug. 5, 2015 in U.S. Appl. No. 13/926,789.
USPTO; Final Office Action dated Aug. 5, 2015 in U.S. Appl. No. 13/021,237.
USPTO; Final Office Action dated Aug. 7, 2015 in U.S. Appl. No. 13/889,299.
USPTO; Office Action dated Aug. 11, 2015 in U.S. Appl. No. 13/926,895.
USPTO; Final Office Action dated Aug. 12, 2015 in U.S. Appl. No. 13/468,880.
USPTO; Office Action dated Aug. 17, 2015 in U.S. Appl. No. 14/065,883.
USPTO; Office Action dated Aug. 17, 2015 in U.S. Appl. No. 13/439,768.
USPTO; Office Action dated Aug. 19, 2015 in U.S. Appl. No. 13/926,884.
USPTO; Office Action dated Aug. 28, 2015 in U.S. Appl. No. 13/794,272.
Burke, "Hybrid Recommender Systems: Survey and Experiments," User modeling and user-adapted interaction, 2002, Kluwer Academic Publishers, pp. 331-370.
Aimeur et al., "Alambic: a privacy-preserving recommender system for electronic commerce," Feb. 27, 2008, Springer-Verlag, pp. 307-334.
Tang, "Approac to detection of community's consensus and interest," Institute of Systems Science, 2008, Springer-Verlag, pp. 17-29.
Lee et al., "iJADE eMiner—A Web Based Mining Agent Based on Intelligent Java Agent Development Environment (iJADE) on Internet Shopping," Advances in Knowledge Discovery and Data Mining, 2001, Springer-Verlag, pp. 28-40.
Written Opinion dated Aug. 5, 2015 in Singapore Application No. 11201400788P.
USPTO; Advisory Action dated Sep. 29, 2015 in U.S. Appl. No. 13/686,608.
USPTO; Notice of Allowance dated Sep. 29, 2015 in U.S. Appl. No. 13/715,792.
USPTO; Office Action dated Oct. 8, 2015 in U.S. Appl. No. 13/941,306.
USPTO; Advisory Action dated Oct. 13, 2015 in U.S. Appl. No. 13/021,237.
USPTO; Advisory Action dated Oct. 16, 2015 in U.S. Appl. No. 13/466,445.
USPTO; Final Office Action dated Oct. 16, 2015 in U.S. Appl. No. 13/443,100.
USPTO; Advisory Action dated Oct. 22, 2015 in U.S. Appl. No. 13/188,693.
USPTO; Final Office Action dated Oct. 26, 2015 in U.S. Appl. No. 13/476,910.
USPTO; Final Office Action dated Oct. 26, 2015 in U.S. Appl. No. 13/467,503.
USPTO; Advisory Action dated Nov. 17, 2015 in U.S. Appl. No. 13/889,299.
USPTO; Advisory Action dated Nov. 17, 2015 in U.S. Appl. No. 13/468,880.
USPTO; Office Action dated Dec. 4, 2015 in U.S. Appl. No. 13/794,145.
USPTO; Office Action dated Dec. 17, 2015 in U.S. Appl. No. 13/715,770.
USPTO; Office Action dated Dec. 31, 2015 in U.S. Appl. No. 13/734,693.
USPTO; Final Office Action dated Dec. 30, 2015 in U.S. Appl. No. 14/065,883.
USPTO; Advisory Action dated Jan. 6, 2016 in U.S. Appl. No. 13/443,100.
USPTO; Final Office Action dated Jan. 11, 2016 in U.S. Appl. No. 13/411,281.
USPTO; Advisory Action dated Jan. 11, 2016 in U.S. Appl. No. 13/467,503.
USPTO; Office Action dated Jan. 14, 2016 in U.S. Appl. No. 13/889,272.
USPTO; Final Office Action dated Jan. 14, 2016 in U.S. Appl. No. 13/794,301.
USPTO; Final Office Action dated Mar. 1, 2013 in U.S. Appl. No. 13/439,768.
USPTO; Final Office Action dated Mar. 4, 2013 in U.S. Appl. No. 13/594,528.
USPTO; Final Office Action dated Mar. 6, 2013 in U.S. Appl. No. 13/188,693.
USPTO; Final Office Action dated Jan. 10, 2013 in U.S. Appl. No. 13/468,931.
USPTO; Final Office Action dated Jan. 31, 2013 in U.S. Appl. No. 13/411,281.
USPTO; Final Office Action dated Jan. 31, 2013 in U.S. Appl. No. 13/467,910.
USPTO; Final Office Action dated Feb. 14, 2013 in U.S. Appl. No. 13/021,237.
USPTO; Final Office Action dated Feb. 25, 2013 in U.S. Appl. No. 13/477,806.
USPTO; Office Action dated May 2, 2013 in U.S. Appl. No. 13/468,880.
International Preliminary Report on Patentability dated on May 7, 2013 in Application No. PCT/US2012/021648.
USPTO; Advisory Action dated May 9, 2013 in U.S. Appl. No. 13/477,806.
USPTO; Advisory Action dated May 22, 2013 in U.S. Appl. No. 13/188,693.
USPTO; Office Action dated May 23, 2013 in U.S. Appl. No. 13/734,693.
International Preliminary Report on Patentability dated on May 23, 2013 in Application No. PCT/US2012/027810.
International Preliminary Report on Patentability dated on Jun. 28, 2013 in Application No. PCT/US2012/027664.
USPTO; Advisory Action dated Jun. 6, 2013 in U.S. Appl. No. 13/466,445.
USPTO; Office Action dated Jul. 19, 2013 in U.S. Appl. No. 13/715,423.
USPTO; Office Action dated Aug. 14, 2013 in U.S. Appl. No. 11/779,734.
USPTO; Final Office Action dated Aug. 14, 2013 in U.S. Appl. No. 12/857,424.
USPTO; Office Action dated Aug. 26, 2013 in U.S. Appl. No. 13/889,305.
USPTO; Office Action dated Aug. 27, 2013 in U.S. Appl. No. 13/889,285.
USPTO; Final Office Action dated Aug. 28, 2013 in U.S. Appl. No. 13/443,100.
USPTO; Office Action dated Sep. 23, 2013 in U.S. Appl. No. 13/889,307.
USPTO; Advisory Action dated Oct. 7, 2013 in U.S. Appl. No. 12/857,424.

(56) References Cited

OTHER PUBLICATIONS

USPTO; Advisory Action dated Oct. 4, 2013 in U.S. Appl. No. 13/468,880.
USPTO; Final Office Action dated Oct. 30, 2013 in U.S. Appl. No. 11/779,734.
USPTO; Restriction Requirement dated Oct. 30, 2013 in U.S. Appl. No. 13/889,288.
USPTO; Final Office Action dated Oct. 31, 2013 in U.S. Appl. No. 13/889,305.
USPTO; Advisory Action dated Nov. 5, 2013 in U.S. Appl. No. 13/443,100.
USPTO; Final Office Action dated Nov. 5, 2013 in U.S. Appl. No. 13/889,285.
USPTO; Office Action dated Nov. 6, 2013 in U.S. Appl. No. 13/889,272.
USPTO; Office Action dated Nov. 22, 2013 in U.S. Appl. No. 13/889,299.
USPTO; Final Office Action dated Nov. 26, 2013 in U.S. Appl. No. 13/734,693.
USPTO; Notice of Allowance dated Dec. 17, 2013 in U.S. Appl. No. 13/594,528.
USPTO; Office Action dated Jan. 3, 2014 in U.S. Appl. No. 13/889,288.
USPTO; Advisory Action dated Jan. 14, 2014 in U.S. Appl. No. 13/889,285.
USPTO; Office Action dated Jan. 15, 2014 in U.S. Appl. No. 13/411,281.
USPTO; Final Office Action dated Jan. 29, 2014 in U.S. Appl. No. 13/889,307.
USPTO; Office Action dated Jan. 30, 2014 in U.S. Appl. No. 13/476,910.
USPTO; Office Action dated Feb. 3, 2014 in U.S. Appl. No. 13/593,204.
International Preliminary Report on Patentability dated on Feb. 3, 2014 in Application No. PCT/US2013/028209.
USPTO; Advisory Action dated Feb. 5, 2014 in U.S. Appl. No. 13/734,693.
USPTO; Final Office Action dated Feb. 11, 2014 in U.S. Appl. No. 13/715,423.
USPTO; Office Action dated Feb. 12, 2014 in U.S. Appl. No. 13/468,931.
Golson, "Major League Baseball Rolling out Thousands of iBeacons for Opening Day," Jan. 30, 2014, pp. 2-3, retrieved from http://www.macrumors.com/2014/01/30/mlb-ibeacon-rollout/ on Feb. 12, 2014.
D Arthur, S Vassilvitskii , "k-means++: The advantages of careful seeding", Proceedings of the eighteenth annual ACM-SIAM symposium on Discrete algorithms, pp. 1027-1035, 2007, dl.acm.org.
AK Jain, "Data clustering: 50 years beyond K-means", Pattern Recognition Letters, 2010, pp. 1-33, Elsevier.
K-means++ Wikipedia Page, pp. 1-4, page last modified on Nov. 18, 2013, http://en.wikipedia.org/wiki/K-means++ retrieved from the web Nov. 21, 2013.
USPTO; Advisory Action dated Apr. 30, 2014 in U.S. Appl. No. 13/715,423.
USPTO; Final Office Action dated May 5, 2014 in U.S. Appl. No. 13/411,281.
USPTO; Office Action dated Jan. 15, 2016 in U.S. Appl. No. 13/889,299.
USPTO; Advisory Action dated Jan. 15, 2016 in U.S. Appl. No. 13/476,910.
USPTO; Office Action dated Jan. 20, 2016 in U.S. Appl. No. 13/889,307.
Pashtan, et al., "Personal Service Areas for Mobile Web Applications," IEEE Internet Computing, 2004, ieeexplore.ieee.org, 7 pages.
Pandey, et al., "Exploiting User Profiles to Support Differentiated Services in Next-Generation Wireless Networks," Network, IEEE, 2004, ieeexplore.ieee.org, 23 pages.
Liapis, et al., Implementing a Low-Cost, Personalized and Location Based Service for Delivering Advertisements to Mobile Users, Athens Information Technology, Oct. 2008, ieeexplore.ieee.org, 49 pages.
Park, et al., "Location-Based Recommendation System using Bayesian User's Preference Model in Mobile Devices," Ubiquitous Intelligence and Computing, 2007, Springer-Verlag Berlin Heidelberg, 10 pages.
Office Action dated Oct. 26, 2015 in Canadian Application No. 2,863,576.
Notice of Acceptance dated Nov. 30, 2015 in Australian Application No. 2012316453.
Office Action dated Dec. 10, 2015 in Canadian Application No. 2,849,271.
USPTO; Office Action dated Feb. 1, 2016 in U.S. Appl. No. 13/443,100.
USPTO; Final Office Action dated Feb. 2, 2016 in U.S. Appl. No. 13/926,789.
USPTO; Final Office Action dated Feb. 2, 2016 in U.S. Appl. No. 13/941,306.
USPTO; Final Office Action dated Feb. 9, 2016 in U.S. Appl. No. 13/794,374.
USPTO; Final Office Action dated Feb. 9, 2016 in U.S. Appl. No. 13/794,272.
USPTO; Final Office Action dated Feb. 11, 2016 in U.S. Appl. No. 13/794,334.
USPTO; Final Office Action dated Feb. 11, 2016 in U.S. Appl. No. 13/926,884.
USPTO; Final Office Action dated Feb. 12, 2016 in U.S. Appl. No. 13/926,895.
USPTO; Office Action dated Feb. 12, 2016 in U.S. Appl. No. 13/593,204.
USPTO; Office Action dated Feb. 19, 2016 in U.S. Appl. No. 13/468,931.
Office Action dated Feb. 29, 2016 in Canadian Application No. 2,874,582.
USPTO; Office Action dated Feb. 29, 2016 in U.S. Appl. No. 13/686,608.
USPTO; Office Action dated Mar. 4, 2016 in U.S. Appl. No. 13/466,412.
USPTO; Office Action dated Mar. 4, 2016 in U.S. Appl. No. 13/794,226.
USPTO; Office Action dated Mar. 7, 2016 in U.S. Appl. No. 12/857,389.
USPTO; Office Action dated Mar. 17, 2016 in U.S. Appl. No. 13/889,305.
USPTO; Advisory Action dated Mar. 18, 2016 in U.S. Appl. No. 13/439,768.
USPTO; Advisory Action dated Mar. 18, 2016 in U.S. Appl. No. 13/411,281.
USPTO; Advisory Action dated Mar. 25, 2016 in U.S. Appl. No. 13/794,301.
USPTO; Advisory Action dated Mar. 28, 2016 in U.S. Appl. No. 14/065,883.
White, "Deals as Debit Rewards? Bank of America Brings Back Debit Card Rewards With a Twist," Jan. 25, 2012, 2 pages, retrieved from http://moneyland.time.com/2012/01/25/deals-as-debit-rewards-bank-of-america-brings-back-debit-card-rewards-with-a-twist/.
Owen, et al., "Improving the Value and Performance of Online Offers," A First Data White Paper, First Data Corporation, 2012, 10 pages.
Noyes, "Card-Linked Offers Update," Transaction World Magazine, Jul. 2012, 2 pages.
Examination Report dated Feb. 26, 2016 in Australian Application No. 2015201925.
USPTO; Office Action dated Mar. 31, 2016 in U.S. Appl. No. 13/889,288.
USPTO; Final Office Action dated Apr. 14, 2016 in U.S. Appl. No. 13/715,770.
USPTO; Office Action dated Apr. 15, 2016 in U.S. Appl. No. 13/188,693.
USPTO; Advisory Action dated Apr. 15, 2016 in U.S. Appl. No. 13/926,789.

(56) References Cited

OTHER PUBLICATIONS

USPTO; Notice of Allowance dated Apr. 18, 2016 in U.S. Appl. No. 13/734,693.
USPTO; Advisory Action dated Apr. 21, 2016 in U.S. Appl. No. 13/794,272.
USPTO; Advisory Action dated Apr. 22, 2016 in U.S. Appl. No. 13/794,374.
Office Action dated Apr. 25, 2016 in Canadian Application No. 2,888,085.
USPTO; Advisory Action dated May 2, 2016 in U.S. Appl. No. 13/926,884.
USPTO; Advisory Action dated May 2, 2016 in U.S. Appl. No. 13/794,334.
USPTO; Office Action dated May 16, 2016 in U.S. Appl. No. 13/153,890.
USPTO; Office Action dated May 19, 2016 in U.S. Appl. No. 13/926,895.
Ghose, et al., "Opinion Mining using Econometrics: A case study on Reputation Systems", Department of Information, Operations, and Management Sciences, Annual Meeting, 2007.
Pang, et al., "Opinion mining and sentiment analysis", Foundations and trends in information retrieval, vol. 2, No. 1-2 (2008) 1-135.
Pavlovic, "Dynamics, robustness and fragility of trust", Formal Aspects in Secruity and Trust, 2009—Springer.
USPTO; Office Action dated Feb. 26, 2014 in U.S. Appl. No. 13/467,503.
USPTO; Office Action dated Feb. 26, 2014 in U.S. Appl. No. 12/857,389.
USPTO; Office Action dated Feb. 26, 2014 in U.S. Appl. No. 13/466,412.
USPTO; Office Action dated Feb. 26, 2014 in U.S. Appl. No. 13/021,237.
USPTO; Office Action dated Feb. 26, 2014 in U.S. Appl. No. 13/466,445.
USPTO; Office Action dated Feb. 26, 2014 in U.S. Appl. No. 13/889,305.
USPTO; Office Action dated Mar. 7, 2014 in U.S. Appl. No. 13/889,285.
USPTO; Office Action dated Mar. 11, 2014 in U.S. Appl. No. 13/153,890.
USPTO; Final Office Action dated Mar. 13, 2014 in U.S. Appl. No. 13/889,272.
USPTO; Final Office Action dated Apr. 25, 2014 in U.S. Appl. No. 13/889,299.
USPTO; Final Office Action dated Apr. 28, 2014 in U.S. Appl. No. 13/889,288.
USPTO; Notice of Allowance dated May 22, 2014 in U.S. Appl. No. 13/245,636.
International Preliminary Report on Patentability dated Aug. 22, 2013 in PCT/US2012/056231.
USPTO; Office Action dated May 7, 2014 in U.S. Appl. No. 13/477,806.
USPTO; Final Office Action dated May 13, 2014 in U.S. Appl. No. 13/476,910.
USPTO; Final Office Action dated May 20, 2014 in U.S. Appl. No. 13/593,204.
USPTO; Advisory Action dated Jul. 8, 2014 in U.S. Appl. No. 13/889,299.
USPTO; Final Office Action dated May 29, 2014 in U.S. Appl. No. 13/468,931.
USPTO; Advisory Action dated Jun. 2, 2014 in U.S. Appl. No. 13/889,272.
USPTO; Office Action dated Jun. 5, 2014 in U.S. Appl. No. 11/779,734.
USPTO; Office Action dated Jun. 11, 2014 in U.S. Appl. No. 13/188,693.
USPTO; Final Office Action dated Jun. 16, 2014 in U.S. Appl. No. 13/467,503.
USPTO; Final Office Action dated Jun. 16, 2014 in U.S. Appl. No. 12/857,389.
USPTO; Final Office Action dated Jun. 16, 2014 in U.S. Appl. No. 13/466,412.
USPTO; Final Office Action dated Jun. 16, 2014 in U.S. Appl. No. 13/466,445.
USPTO; Office Action dated Jun. 24, 2014 in U.S. Appl. No. 13/468,880.
USPTO; Final Office Action dated Jun. 30, 2014 in U.S. Appl. No. 13/021,237.
USPTO; Final Office Action dated Jun. 30, 2014 in U.S. Appl. No. 13/889,305.
USPTO; Notice of Allowance dated Jul. 2, 2014 in U.S. Appl. No. 13/889,285.
USPTO; Advisory Action dated Jul. 2, 2014 in U.S. Appl. No. 13/889,288.
USPTO; Office Action dated Jul. 3, 2014 in U.S. Appl. No. 13/889,307.
International Preliminary Report on Patentability dated Sep. 19, 2012 in Application No. PCT/US2011/047012.
USPTO; Final Office Action dated Jan. 28, 2015 in U.S. Appl. No. 13/889,307.
USPTO; Office Action dated Oct. 11, 2013 in U.S. Appl. No. 13/245,636.
USPTO; Office Action dated Feb. 5, 2014 in U.S. Appl. No. 13/245,636.
USPTO; Office Action dated Jul. 30, 2014 in U.S. Appl. No. 13/794,301.
USPTO; Advisory Action dated Jul. 30, 2014 in U.S. Appl. No. 13/411,281.
USPTO; Advisory Action dated Jul. 30, 2014 in U.S. Appl. No. 13/593,204.
USPTO; Advisory Action dated Jul. 31, 2014 in U.S. Appl. No. 13/476,910.
USPTO; Advisory Action dated Aug. 7, 2014 in U.S. Appl. No. 13/468,931.
Examination Report dated Aug. 11, 2014 in New Zealand Application No. 623019.
USPTO; Final Office Action dated Aug. 13, 2014 in U.S. Appl. No. 13/153,890.
USPTO; Office Action dated Aug. 14, 2014 in U.S. Appl. No. 13/794,145.
USPTO; Office Action dated Aug. 14, 2014 in U.S. Appl. No. 13/794,334.
USPTO; Office Action dated Aug. 15, 2014 in U.S. Appl. No. 13/794,374.
USPTO; Advisory Action dated Sep. 3, 2014 in U.S. Appl. No. 13/466,412.
USPTO; Advisory Action dated Sep. 3, 2014 in U.S. Appl. No. 13/467,503.
USPTO; Advisory Action dated Sep. 3, 2014 in U.S. Appl. No. 13/021,237.
USPTO; Advisory Action dated Sep. 3, 2014 in U.S. Appl. No. 12/857,389.
USPTO; Advisory Action dated Sep. 2, 2014 in U.S. Appl. No. 13/466,445.
Resnick, et al., "Recommender Systems", Mar. 1997, Commuincations of the ACM, vol. 40,No. 3, pp. 56-58.
Ricci, et al.; "Recommendation and Personalization in eCommerce", Proceedings of the AH'2002 Workshop on Recommendation and Personalization in eCommerce, Malaga, Spain, May 28, 2002, pp. 1-160.
USPTO; Notice of Allowance dated May 25, 2016 in U.S. Appl. No. 13/439,768.
USPTO; Office Action dated May 26, 2016 in U.S. Appl. No. 13/477,806.
USPTO; Advisory Action dated Jun. 2, 2017 in U.S. Appl. No. 13/941,306.
USPTO; Notice of Allowance dated Jun. 9, 2017 in U.S. Appl. No. 14/464,439.
USPTO; Notice of Allowance dated Jun. 13, 2017 in U.S. Appl. No. 13/889,305.
USPTO; Notice of Allowance dated Jun. 13, 2017 in U.S. Appl. No. 14/464,474.

(56) References Cited

OTHER PUBLICATIONS

USPTO; Office Action dated Jun. 15, 2017 in U.S. Appl. No. 13/715,770.
Notice of Acceptance dated Jun. 21, 2017 in Australian Application No. 2016201509.
USPTO; Office Action dated Jun. 21, 2017 in U.S. Appl. No. 13/466,412.
USPTO; Notice of Allowance dated Jun. 29, 2017 in U.S. Appl. No. 13/889,299.
USPTO; Advisory Action dated Jul. 14, 2017 in U.S. Appl. No. 13/794,301.
USPTO; Notice of Allowance dated Jul. 25, 2017 in U.S. Appl. No. 13/411,281.
USPTO; Advisory Action dated Oct. 3, 2017 in U.S. Appl. No. 13/794,272.
USPTO; Non-Final Office Action dated Oct. 3, 2017 in U.S. Appl. No. 15/626,598.
USPTO; Non-Final Office Action dated Oct. 6, 2017 in U.S. Appl. No. 13/188,693.
USPTO; Non-Final Office Action dated Oct. 6, 2017 in U.S. Appl. No. 13/468,880.
USPTO; Final Office Action dated Oct. 25, 2017 in U.S. Appl. No. 13/889,272.
USPTO; Notice of Allowance dated Oct. 30, 2017 in U.S. Appl. No. 13/794,374.
USPTO; Advisory Action dated Nov. 9, 2017 in U.S. Appl. No. 13/466,412.
USPTO; Non-Final Office Action dated Nov. 14, 2017 in U.S. Appl. No. 14/284,817.
USPTO; Advisory Action dated Nov. 28, 2017 in U.S. Appl. No. 13/889,272.
USPTO; Final Office Action dated Dec. 11, 2017 in U.S. Appl. No. 13/715,423.
USPTO; Notice of Allowance dated Dec. 13, 2017 in U.S. Appl. No. 13/941,306.
USPTO; Non-Final Office Action dated Dec. 22, 2017 in U.S. Appl. No. 15/139,176.
Lynn, Michael et al., "Gratutude and Fratuity: A Meta-Analysis of Research on the Service-tipping Relationship", Cornel University of Hotel Admiistraiton, 2000, Journal of Socio-Economics 29, pp. 1-18.
USPTO; Final Office Action dated Jan. 18, 2018 in U.S. Appl. No. 13/715,770.
Australian Examination Report dated Jan. 19, 2018 in Australian Application No. 2017201307.
USPTO; Non-Final Office Action dated Jan. 23, 2018 in U.S. Appl. No. 15/166,086.
USPTO; Non-Final Office Action dated Feb. 2, 2018 in U.S. Appl. No. 14/928,680.
USPTO; Final Office Action dated Feb. 27, 2018 in U.S. Appl. No. 15/626,598.
USPTO; Advisory Action dated Feb. 28, 2018 in U.S. Appl. No. 13/715,770.
Ying Cai et al., Design, Analysis, and Implentation of a Large-scale Real-time Location-based Information Sharing System, pp. 106-117, Proceedings of the 6th International Conference on . . . , 2008, dl.acm.org.
Moon-Hee Parket et al., Location-Based Recommendation System Using Bayesian User's Preference Model in Mobile Devices, International Conference on Ubiquitous, pp. 1130-1139, 2007, Springer-Verlag Berlin Heidelberg.
Rashid, O. et. al., "Providing Location based information/ advertising for existing mobile phone users", Personal and Ubiquitous Computing, 2008, pp. 3-10, Springer.
Singhal, M., et al., "Implementation of Location based servcies in Android Using GPS and Web Servies", IJCSI International Journal of Computer Science Issues, vol. 9, Issue 1, No. 2, Jan. 2012, pp. 237-242, pdfs.semanticscholar.org.
"Standard Score", Wikipedia.org entry, retrieved on Nov. 30, 2017 from http://en.wikipedia.org/wiki/Standard_score, pp. 1-4.

Mahmoud, Q., "Provisioning Context-Aware Advertisements to Wireless Mobile Users", pp. 669-672, Multimedia and Expo, 2006 IEEE International, 2006.
Dhar, S. et al., "Challenges and Business Models for Mobile Location-Based Servies and Advertising", Communications of the ACM, May 2011, vol. 54, No. 5, pp. 121-129.
USPTO AdvisoryAction dated Jun. 8, 2018 in U.S. Appl. No. 13/468,880.
Canadian Examination Search Report dated Jun. 21, 2018 in Canadian Application No. 2,874,582.
USPTO; Non-final Office action dated Jun. 22, 2018 in U.S. Appl. No. 15/018,239.
USPTO; Non-Final Office action dated Jun. 28, 2018 in U.S. Appl. No. 14/928,855.
USPTO; Advisory Actoin dated Jul. 5, 2018 in U.S. Appl. No. 15/139,176.
USPTO; Final Office Action dated Jul. 6, 2018 in U.S. Appl. No. 14/284,817.
USPTO; Non-Final Office Action dated Jul. 11, 2018 in U.S. Appl. No. 13/794,272.
USPTO; Final Office Action dated Jul. 13, 2018 in U.S. Appl. No. 14/928,680.
USPTO; Notice of Allowance dated May 25, 2018 in U.S. Appl. No. 15/626,598.
USPTO; Advisory Actoin dated Jul. 23, 2018 in U.S. Appl. No. 15/166,086.
USTPO; Non-Final Office Action dated Jul. 23, 2018 in U.S. Appl. No. 13/889,272.
USPTO; Final Office Action dated Aug. 6, 2016 in U.S. Appl. No. 15/216,264.
USPTO; Non-Final Office action dated May 24, 2018 in U.S. Appl. No. 14/928,905.
USPTO; Final Office Action dated May 23, 2018 in U.S. Appl. No. 15/166,086.
USPTO; Non-Final Office action dated May 18, 2018 in U.S. Appl. No. 15/018,623.
USPTO; Final Office Action dated May 9, 2018 in U.S. Appl. No. 15/139,176.
USPTO; Advisory Action dated Apr. 26, 2018 in U.S. Appl. No. 15/626,598.
USPTO; Non-Final Office Action dated Apr. 5, 2018 in U.S. Appl. No. 15/216,264.
USPTO; Final Office Action dated Apr. 6, 2018 in U.S. Appl. No. 13/468,880.
USPTO; Advisory Action dated Mar. 22, 2018 in U.S. Appl. No. 13/715,423.
USPTO; Non-Final Action dated Mar. 9, 2018 in U.S. Appl. No. 13/794,301.
Canadian Examination Search Report dated Jan. 31, 2018 in Canadian Application No. 2,849,271.
Australian Examination Report No. 2 dated Jul. 11, 2018 in Canadian Application No. 2017201307.
USPTO; Non-Final Office Action dated Aug. 10, 2018 in U.S. Appl. No. 14/928,786.
USPTO; Notice of Allowance dated Sep. 21, 2018 in U.S. Appl. No. 13/794,301.
USPTO; Notice of Allowance dated Sep. 4, 2018 in U.S. Appl. No. 15/166,086.
USPTO; Notice of Allowance dated Sep. 6, 2018 in U.S. Appl. No. 15/139,176.
USPTO; Non-Final Office Action dated Sep. 7, 2018 in U.S. Appl. No. 15/456,777.
USPTO; Advisory Action dated Sep. 18, 2018 U.S. Appl. No. 14/284,817.
USPTO; Non-Final Office Action dated Sep. 19, 2018 in U.S. Appl. No. 13/686,608.
USPTO; Advisory Action dated Sep. 21, 2018 U.S. Appl. No. 14/928,680.
USPTO; Advisory Action dated Sep. 21, 2018 U.S. Appl. No. 15/216,264.
Australian Examination Report No. 3 dated Sep. 7, 2018 in Australian Application No. 2017201307.

(56) References Cited

OTHER PUBLICATIONS

USPTO; Non Final Office Action dated Oct. 2, 2018 in U.S. Appl. No. 15/495,428.
USPTO; Notice of Allowance dated Oct. 17, 2018 in U.S. Appl. No. 15/456,777.
USPTO;Non-Final Office Action dated Nov. 9, 2018 in U.S. Appl. No. 15/668,243.
USPTO; Restriction Requirement dated Nov. 23, 2018 in U.S. Appl. No. 15/018,239.
USPTO; Non-Final Office Action dated Nov. 29, 2018 in U.S. Appl. No. 15/216,264.

* cited by examiner

Return Policy Logic (Returns, Fraud, Disputes, Credit Refund)

| Purchase | | | | | Return | TAP Action<br>Debit CM | Write off Up to $xx |
|---|---|---|---|---|---|---|---|
| ← 60 days → | | | | | $1000 | | |
| | Purchase | | | | | | |
| ① | ②<br>$500<br>(15%) | ③ | ④<br>$1,000 | ⑤<br>$700<br>(15%) | ⑥<br>$1,000<br>(10%) | Look back, assume first exact tx matched is the correct original tx. Debit CM for $100 | CM claims return is part of tx 4 – write off |
| ①<br>$400<br>(30%) | ②<br>$900<br>(15%) | ③<br>$500 | ④<br>$800 | ⑤<br>$100<br>(15%) | ⑥<br>$5,000 | If no exact matched tx, use first tx > to return tx. No action | CM claims return is part of tx 5 & 2 – write off |
| ①<br>$150 | ②<br>$100<br>(15%) | ③<br>$300 | ④<br>$200 | ⑤<br>$250<br>(25%) | ⑥<br>$200 | If sum of return is equal or smaller than sum of tx in past 60 days, than assume that the return refers to TM tx's up to $1,000. (i.e., debit CM for 15% of $100 + 25% of $250 = $77.5). Else, do nothing. | CM claims return is part of a tx earlier than 60 days, no write off |

None TM tx ○    TM tx ●

FIG. 12

PREPAID REWARDS CREDITED TO A TRANSACTION ACCOUNT

CROSS REFERENCE TO RELATED APPLICATION

This application is a continuation-in-part of, claims priority to and the benefit of, U.S. Ser. No. 13/593,204 filed on Aug. 23, 2012 and entitled "System And Method For Prepaid Rewards" (now U.S. Pat. No. 9,412,102 issued on Aug. 9, 2016). The '204 application is a continuation of U.S. Ser. No. 12/857,424, entitled "System and Method for Prepaid Rewards," filed on Aug. 16, 2010 (now U.S. Pat. No. 9,558,505 issued on Jan. 31, 2017). The '424 application is a continuation-in-part of U.S. Ser. No. 11/779,734, entitled "Loyalty Incentive Program Using Transaction Cards," filed on Jul. 18, 2007 (now U.S. Pat. No. 9,430,773 issued on Aug. 30, 2016). The '734 application claims priority to U.S. Provisional Ser. No. 60/831,457, filed Jul. 18, 2006. The entire disclosures of which are incorporated herein by reference.

FIELD OF THE INVENTION

The present invention relates generally to systems and methods for providing rewards or loyalty incentive programs to consumers, and more particularly to systems and methods for operating a loyalty incentive program using transaction cards to permit consumers to receive discounts and notices of discounts without requiring a coupon to be redeemed.

BACKGROUND OF THE INVENTION

Loyalty incentive or reward programs are used as a form of highly customizable and targeted marketing. A loyalty program provider will attract customers who sign-up for a loyalty program. Shopping benefits such as discounts are offered to the customers by the provider. The provider then markets to merchants that the provider can bring customers to the merchant. For example, a loyalty program provider may approach a merchant, such as the clothing retailer GAP® Inc., with an offer to bring customers to the GAP® in exchange for a fee. The provider would then send a solicitation (via email or regular mail) to its customers offering, for example, a 10% discount coupon that may be redeemed at the GAP® on a particular day. The success of the solicitation can be assessed based on the number of coupons redeemed.

In such a loyalty solicitation, the merchant would pay the loyalty program provider a percentage of the sales (e.g., 10%) that result from the solicitation. The merchant benefits from the increased sales. The loyalty program provider benefits from the commission that it receives, and the customers benefit from the received discount.

There are several areas that could be improved in such traditional loyalty programs. For example, such traditional programs suffer from leakage. Leakage occurs when the merchant does not fully report sales resulting from the solicitation. Leakage results in loss revenues for the loyalty program provider. Further, administration of coupon redemption by a merchant is costly and requires training. What is needed is a system and method improving upon traditional loyalty programs.

SUMMARY OF THE INVENTION

In an embodiment a method for providing loyalty incentives to a card member customer, the method includes the following steps: a record of charge is received for a purchase made with a participating merchant by a card member customer; the record of charge is used to determine whether the purchase by the card member customer qualifies for a rebate credit in accordance with a discount offer from the participating merchant; and if the purchase qualifies for the rebate credit, then the rebate credit is provided to an account of the card member customer.

In another embodiment, a method for operating a loyalty incentive program includes the following steps: a list of participating merchants is received; a list of participating card members is received; a record of charge corresponding to a purchase by a card member customer is received from a merchant, and upon receipt, an account of the card member customer is debited by the amount of the charge, a merchant identification contained in the record of charge is compared with the list of participating merchants, and a card member identification contained in the record of charge is compared with the list of participating card members. If the card member is a participating card member and the merchant is a participating merchant, then it is determined whether the record of charge qualifies for a rebate credit. If the record of charge qualifies for a rebate credit, then the rebate credit is provided to an account of the card member customer.

In another embodiment, a method includes the following steps: participation of a merchant in a loyalty incentive program is solicited; an offer from a participating merchant is received; enrollment of a card member customer to the loyalty incentive program is solicited; the offer is provided to an enrolled card member customer; information is received which relates to a purchase by the enrolled card member customer in accordance with the offer from the participating merchant; an amount of a discount in accordance with the offer is calculated; and the amount of the discount is provided to a transaction account provider so that an account of the enrolled card member customer is credited in the amount of the discount.

One embodiment provides a system including an enrolled card member customer database having identification information of accounts associated with card member customers enrolled in the loyalty incentive program; an enrolled merchant database having identification information of merchants enrolled in the loyalty incentive program; a merchant offer database having identification information of discount offers provided by the merchants enrolled in the loyalty incentive program; and a registered card processor. The registered card processor receives a record of charge for a purchase made with an enrolled merchant by an enrolled card member customer and uses the record of charge to determine whether the purchase qualifies for a rebate credit in accordance with a discount offer from the enrolled merchant. If the purchase qualifies for a rebate credit, the registered card processor provides the rebate credit to an account of the enrolled card member customer.

In an embodiment this systems and methods described may be used to provide coupon-less discounts on purchase made by card member customers. As such, there is no leakage since an enrolled merchant does not have to process any coupons. In such a system, the merchant benefits from increased sales and elimination of the overhead required to manage a coupon program, the customer benefits from the coupon-less discount, and the loyalty program provider benefits from sales commissions and/or loyalty program fees paid by the merchant. In one embodiment, customers may also be charged a fee by the loyalty program provider for participation in the loyalty program.

In an embodiment, a method for managing a rewards program includes associating a prepaid transaction account (e.g. American Express® Gift Card) with a rewards program. The transactions of the prepaid transaction account can then be monitored and compared with criteria (e.g. transactions at a particular merchant or group of merchant, transactions in a particular region, spending levels at a particular merchant or in a particular region) governing the rewards program. Where the transactions comply the criteria governing the rules of the rewards program, a reward (e.g. a credit of monetary value to the transaction account, a merchant prepaid account, a discount, a credit of loyalty points) is provided to a beneficiary of the prepaid transaction account.

Further, the prepaid transaction account may be enrolled in any rewards program offered by an account issuer. Enrollment in a rewards program may be automatic or may require registration by the owner of the prepaid transaction account.

In an embodiment, a method for managing a rewards program includes monitoring spend data associated with a transaction account. The spend data may be analyzed and compared to a set of criteria (spend levels at particular merchants, spend level on classes of products, spend level in a particular region). The transaction account may then be assigned to one or more transaction account populations based on spend data and criteria. The spend data of the associated with the transaction account is also analyzed to determine whether a beneficiary of the transaction account qualifies for a reward in accordance with a rewards program. Where the spend data meets the rules governing the rewards program, a reward (e.g. a credit of monetary value to the transaction account, a merchant prepaid account, a discount, a credit of loyalty points) is provided to a beneficiary of the transaction account. The spend data activities associated with the transaction accounts of the population are also monitored. Where the activities meet criteria associated with the transaction account population, a rewards offer (an offer of a credit of monetary value to the transaction account, a merchant prepaid account, a discount, a credit of loyalty points) is sent to owner of transaction accounts associated with the population.

In an embodiment, the criteria may be established by a merchant or a prepaid account issuer. Enrollment in a transaction account population may be automatic or may require registration by the owner of the transaction account. Further features of various embodiments, as well as the structure and operation of various embodiments are described in detail below with reference to the accompanying drawings.

BRIEF DESCRIPTION OF THE FIGURES

A more complete understanding of the present inventions may be derived by referring to the detailed description and claims when considered in connection with the Figures, wherein like reference numbers refer to similar elements throughout the Figures, and:

FIG. 12 is a diagram of another method for determining whether a return was made on a purchase in which the card member received a discount credit, in accordance with another embodiment.

DETAILED DESCRIPTION

Figure 1:
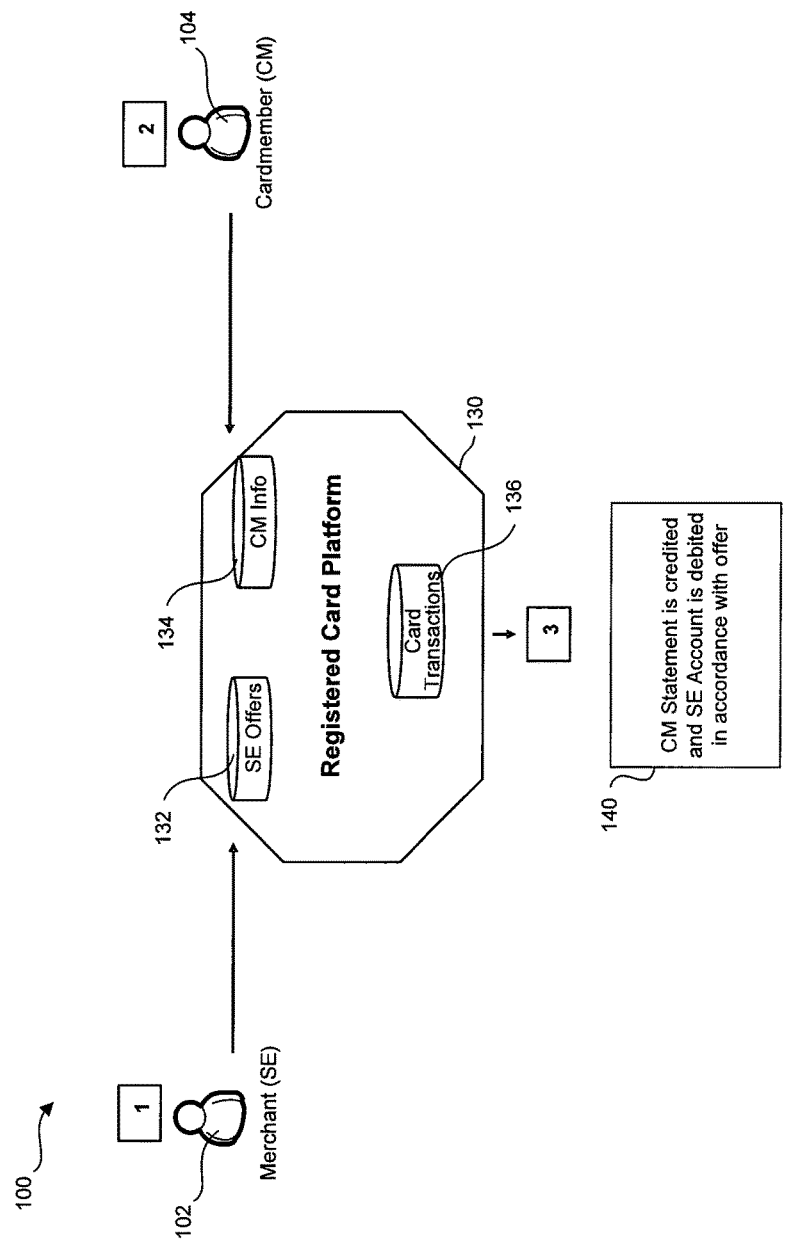
FIG. 1 is a high level flow diagram of a process for providing loyalty incentives to a card member customer in accordance with an embodiment.

The present invention is directed to a system and method for providing loyalty incentives to a card member customer and operating a loyalty incentive program. The present invention is now described in more detail herein in terms of an exemplary embodiment. This is for convenience only and is not intended to limit the application of the present invention. While specific configurations and arrangements are discussed, it should be understood that this is done for illustrative purposes only. In fact, after reading the following description, it will be apparent to one skilled in the relevant art(s) how to implement the following exemplary embodiments. A person skilled in the pertinent art will recognize that other configurations and arrangements can be used without departing from the spirit and scope of the present invention. It will be apparent to a person skilled in the pertinent art that this invention can also be employed in a variety of other applications.

The terms "user," "end user," "consumer," "customer," "participant," and/or the plural form of these terms are used interchangeably throughout herein to refer to those persons or entities capable of accessing, using, being affected by and/or benefiting from the tool that the present invention provides for the rewards program described herein. This includes both individual consumers and corporate customers such as, for example, small businesses.

Furthermore, the terms "service provider," "business" or "merchant" may be used interchangeably with each other and shall mean any person, entity, distributor system, software and/or hardware that is a provider, broker and/or any other entity in the distribution chain of goods or services. For example, a service provider may be a retail store, a hotel company, an airline company, a travel agency, an on-line merchant or the like.

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument. The term "transaction card" is used herein to be synonymous with the term "transaction account," unless indicated otherwise.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as the clothing retailer Gap®, Inc.

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments together totaling no more than ten dollars.

With regard to use of a transaction account, users may communicate with service providers in person (e.g., at the box office), telephonically, or electronically (e.g., from a user computer via the Internet). During the interaction, the service provider may offer goods and/or services to the user. The service provider may also offer the user the option of paying for the goods and/or services using any number of available transaction accounts. Furthermore, the transaction accounts may be used by the service provider as a form of identification of the user. The service provider may have a computing unit implemented in the form of a computer-server, although other implementations are possible.

In general, transaction accounts may be used for transactions between the user and service provider through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

An "account," "account number" or "account code," as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$N_1N_2N_3N_4 \ N_5N_6N_7N_8 \ N_9N_{10}N_{11}N_{12} \ N_{13}N_{14}N_{15}N_{16}$

The first five to seven digits are reserved for processing purposes and identify the issuing institution, card type, etc. In this example, the last (sixteenth) digit is typically used as a sum check for the sixteen-digit number. The intermediary eight-to-ten digits are used to uniquely identify the customer, card holder or card member.

A merchant account number may be, for example, any number or alpha-numeric characters that identifies a particular merchant for purposes of card acceptance, account reconciliation, reporting and the like.

It should be noted that the transfer of information in accordance with various embodiments may be done in a format recognizable by a merchant system or account issuer. In that regard, by way of example, the information may be transmitted from an RFID device to an RFID reader, or from the RFID reader to the merchant system in magnetic stripe or multi-track magnetic stripe format.

Because of the proliferation of devices using magnetic stripe format, the standards for coding information in magnetic stripe format were standardized by the International Organization for Standardization in ISO/IEC 7811-n (characteristics for identification cards) which are incorporated herein by reference. The ISO/IEC 7811 standards specify the conditions for conformance, physical characteristics for the card (warpage and surface distortions) and the magnetic stripe area (location, height and surface profile, roughness, adhesion, wear and resistance to chemicals), the signal amplitude performance characteristics of the magnetic stripe, the encoding specification including technique (MFM), angle of recording, bit density, flux transition spacing variation and signal amplitude, the data structure including track format, use of error correction techniques, user data capacity for ID-1, ID-2 and ID-3 size cards, and decoding techniques, and the location of encoded tracks.

Typically, magnetic stripe information is formatted in three tracks. Certain industry information must be maintained on certain portions of the tracks, while other portions of the tracks may have open data fields. The contents of each track and the formatting of the information provided to each track is controlled by the ISO/IEC 7811 standard. For example, the information must typically be encoded in binary. Track 1 is usually encoded with user information (i.e., name) in alphanumeric format. Track 2 is typically comprised of discretionary and nondiscretionary data fields. In one example, the nondiscretionary field may comprise 19 characters and the discretionary field may comprise 13 characters. Track 3 is typically reserved for financial transactions and includes enciphered versions of the user's personal identification number, country code, current units amount authorized per cycle, subsidiary accounts, and restrictions.

As such, where information is provided in accordance with an embodiment, it may be provided in magnetic stripe track format. For example, the counter values, authentication tags and encrypted identifiers may be forwarded encoded in all or a portion of a data stream representing data encoded in, for example, track 2 or track 3 format.

Persons skilled in the relevant arts will understand the breadth of the terms used herein and that the exemplary descriptions provided are not intended to be limiting of the generally understood meanings attributed to the foregoing terms.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

In an embodiment and with references to FIG. 1, a flow diagram illustrates operation of system 100. A transaction account provider (TAP) (such as American Express Travel Related Services Company, Inc., of New York, N.Y.) operates a registered card platform 130 to implement a reward or incentive program (sometimes referred to herein a registered card program), which does not require paper coupons for fulfillment of merchant offers to card members. Registered card platform 130 provides the capability to match merchant (SE or "service establishment") offers and card member (CM) customer information with card transactions for a card member customer's purchases or returns at a merchant participating in the registered card program. In various embodiments, the system determines, in response to receiving an authorization request from the merchant system for the purchase and prior to approving the authorization request, an offer from a plurality of offers based on the authorization request associated with a prepaid transaction account. The system approves the authorization request for the transaction based on the transaction information received from the merchant. As a result of such determining an offer using matching capability, registered card platform 130 allows TAP to fulfill a merchant's discount offer applicable to card member customer's purchase by providing a rebate credit in accordance with the discount offer on the card member customer's transaction account statement. If a return is made on a purchase for which a rebate credit was previously provided, registered card platform 130 also allows the TAP to debit the card member customer the amount of the rebate credit and credit the same back to the merchant.

TAP can collaborate with a loyalty program provider to produce the reward or incentive program. While, as used herein, "loyalty program provider" (LPP) refers to an external, third-party provider of marketing packages that may be provided to CMs in accordance with various embodiments, TAP may internally administer loyalty programs, such as restaurant or travel marketing program. Therefore, to distinguish from programs provided by an LPP, TAPS internal loyalty programs will be referred to herein as a "TAP marketing program" or simply a "TAP program." In the figures, the service mark "TailorMade" is used to refer to an example loyalty program offered by an LPP. Accordingly, although embodiments will be described herein in the environment of such collaboration between a TAP and an LPP, one of skill in the pertinent art(s) will recognize that a registered card program can be implemented with or without a loyalty program provider or other types of providers without departing from the spirit and scope of the present invention.

As shown in FIG. 1, in step 1, a merchant 102 enrolls and submits a discount offer to a loyalty program or other marketing program. These offers are compiled in an offer database 132. In step 2, a card member customer (CM) 104 registers their transaction account managed by TAP, such that CM's account is "registered" to the registered card program, thereby permitting the registered CM to receive coupon-less discounts in the form of rebate credits (via CM's account statement). Information relating to CM's now registered card is compiled in enrollee database 134. When CM shops and makes purchases (or returns) at a merchant using their financial transaction card, TAP will receive a record of charge (ROC) for the transaction, which may be stored in a card transaction database 136. The ROC may be any information that can be used to identify a card transaction. In step 3, matching is performed by registered card platform 130. In the case of a CM purchase, the CM's statement is credited and the merchant's account is debited in accordance with the merchant's offer, as illustrated in step 140. Further description of providing a credit to the CM and a debit to the merchant in step 140 is described below with reference to FIG. 3.

Figure 2:
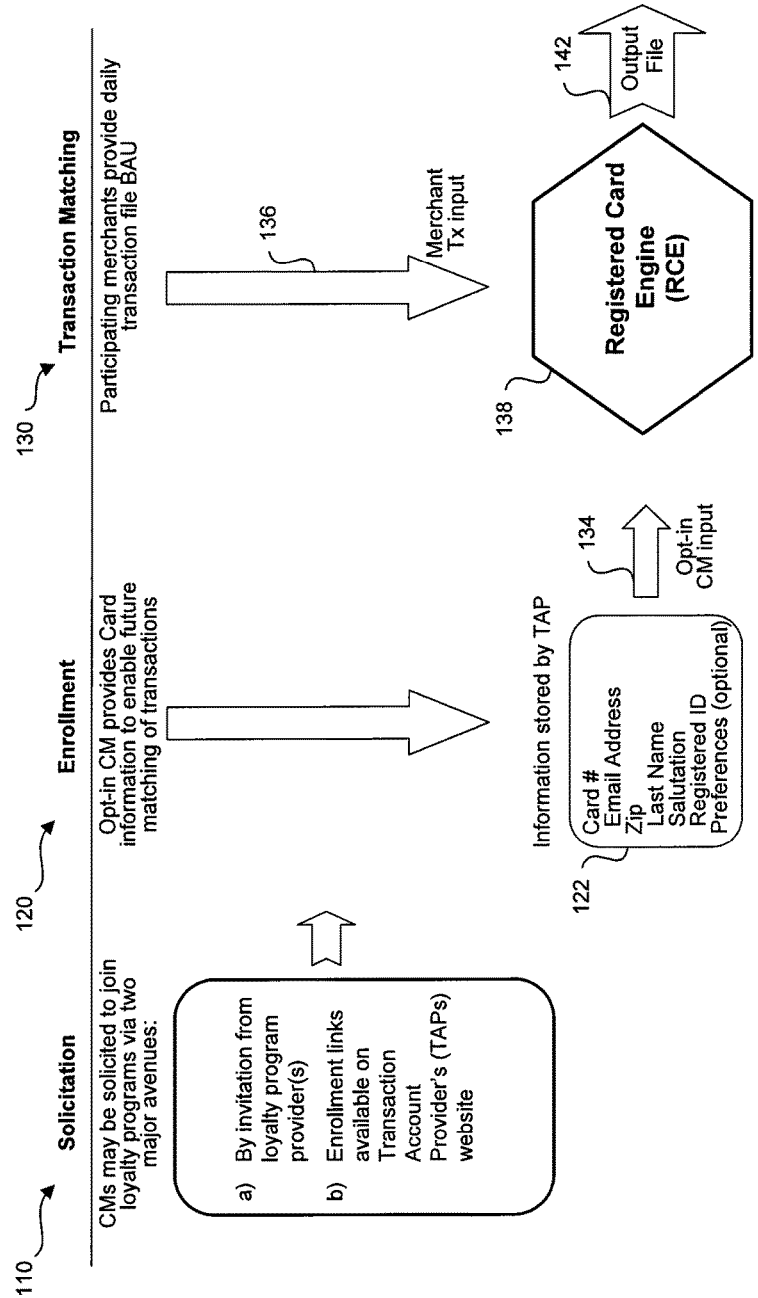
FIG. 2 is a high level flow diagram showing data management flow of card member customer information and participating merchant information for transaction matching in the process of FIG. 1.

FIG. 2 provides another high level flow diagram illustrating the steps of solicitation 110 and enrollment 120 relative to transaction matching 130 (performed by the registered card platform), in accordance with an embodiment. Solicitation 110 of a CM may include a targeted invitation, such as by e-mail, from loyalty program provider(s) or TAP, or by simply making available to a CM a link on TAP's website prompting the CM to enroll in TAP's registered card program. During enrollment 120, the CM opts to register their card information to enable registered card platform 130 to perform future matching of transactions. Box 122 sets forth exemplary fields of information stored by TAP for each enrolled CM. CM information is stored in database 134 (represented here as an arrow 134), and the information is provided to a matching transaction processor 138 of registered card platform 130. Matching processor 138 is shown and described in the example embodiments presented using the term "registered card engine" (RCE). As shown, in FIG. 2, RCE 138 is provided with merchant transaction information from participating merchants (i.e., a daily, "business as usual" (BAU) transaction file). This transaction information may be stored in transaction database 136 (shown here as an arrow 136). RCE 138 also receives participating merchant offers 132 (shown in FIG. 1) and matches them with transactions 136 made by registered CMs (i.e., via information from enrollee database 134). Matched transactions are provided in an output file 142.

Figure 3:
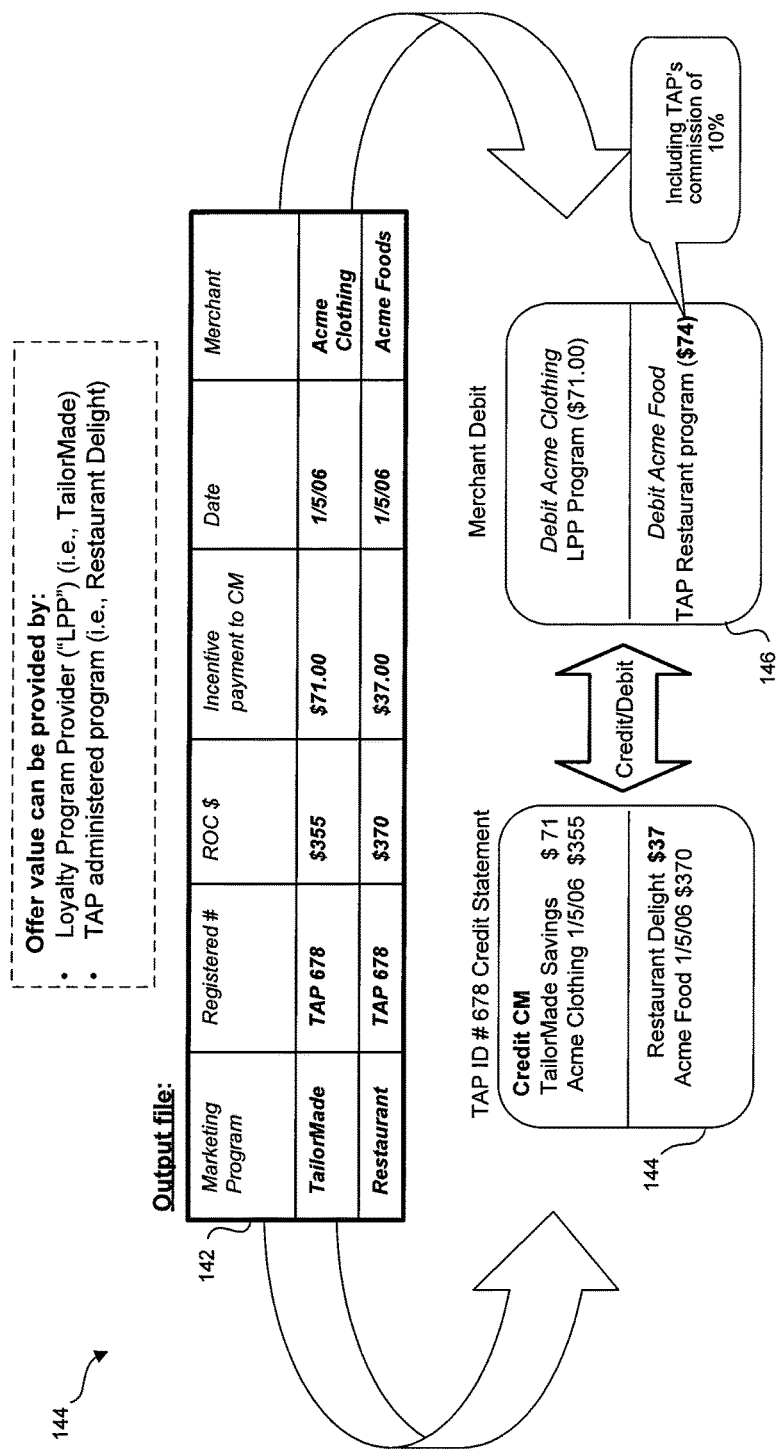
FIG. 3 illustrates an exemplary output file of matched transactions with corresponding statements of credit to a card member customer and debit to participating merchants.

FIG. 3 illustrates an exemplary output file and credit and debit statement for the CM and the merchant, in accordance with step 140 of FIG. 1. Output file 142 from RCE 138 (as shown in FIG. 2) includes an itemization of a discount amount (i.e., incentive payment) to CM for a purchase made (i.e., ROC) at a participating merchant in which a discount offer was applicable. In this embodiment, upon enrollment in the registered card program, the registered accounts of the CM receive a registration identification (i.e., "registered #"), which is also included in output file 142. In this embodiment, output file 142 includes marketing programs administered by TAP and marketing programs administered by a loyalty program provider. One of skill in the pertinent art(s) will recognize that output file 142 may be configured in any number of ways and include less or more information represented in FIG. 3. For example, a separate output file may be provided for each LPP or TAP program, and for each loyalty program offered by the same LPP. Further, the transaction and discount information reflected therein may be provided collectively or separately for downstream processing of a CM credit statement 144 and a merchant debit statement 146.

As shown in FIG. 3, output file 142 is processed by TAP to provide line item rebate credits on CM statement 144 for each purchase subject to a discount offer available pursuant to a marketing program. For example, CM statement 144 includes a TailorMade rebate credit of $71, for an original charge amount of $355 at participating merchant, Acme Clothing. Similarly, a credit of $37 under TAP's restaurant marketing program is provided for an original charge amount of $370 at participating merchant, Acme Food. Merchant debit statement 146 includes line item debits in accordance with CM's rebate credits also as line items for each marketing program. The debit for the merchant may be equal or unequal to the rebate credit to CM. For example, for Acme Clothing, the merchant debit of $71 is equal to CM credit of $71, whereas the debit for Acme Food is $74, corresponding to the sum of the rebate credit to CM and a commission or service fee of 10% of the original charge amount imposed by TAP for performing the services described herein. Although not shown here, a similar commission may be imposed by LPP and/or TAP on Acme Clothing's account and incorporated as part of a line item debit on its statement. Alternatively, such commission may be a separate line item from the line item for the merchant's debit for CM's rebate credit.

Figure 4:
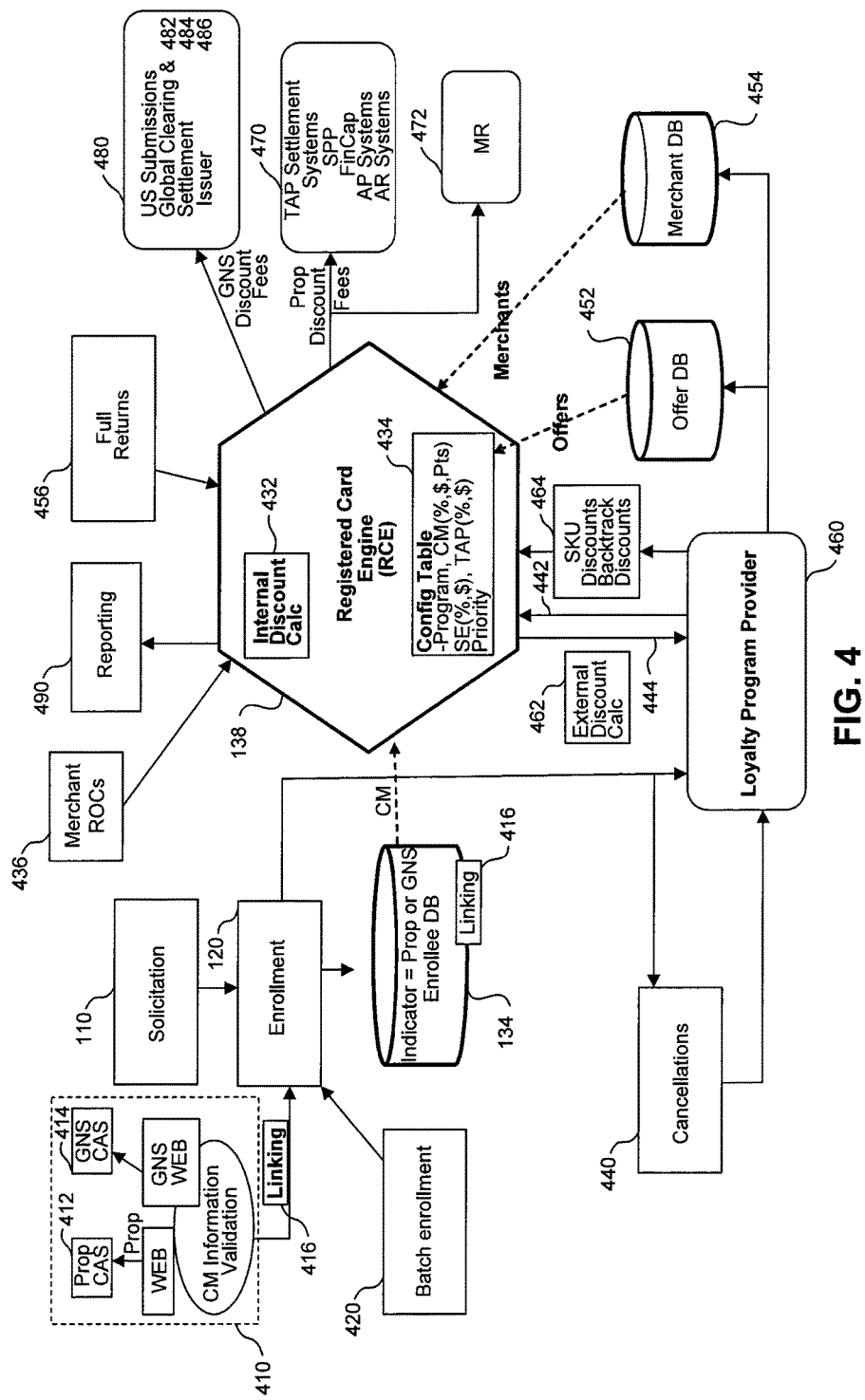
FIG. 4 is a detailed high level flow diagram of the process of FIG. 1, in accordance with an embodiment.

FIG. 4 is a detailed high level block diagram of the process of FIG. 1, showing processes for registration of a CM, calculation of a rebate credit to the CM (or a negative discount amount in case of a return), and downstream settlement with the CM and the merchant relating to the rebate credit (or negative discount amount), in accordance with an embodiment. The CM registers with TAP to receive coupon-less discounts for purchases drawn on their transaction card/account. Generally, the registration process begins with solicitation 110 of the CM, followed by enrollment 120 of one or more transaction cards held by the CM. Description of exemplary embodiments of process for solicitation 110 and enrollment 120 will be provided further below. In order to enroll, each transaction card and corresponding customer information undergoes a validation process 410 to determine whether the CM's card is eligible for participation in TAP's registered card program. This registered card program may be made available to not only CMs holding transaction cards issued by TAP, but also to CMs holding cards issued by third party transaction account providers in a brand network. Third party transaction account providers are referred to herein collectively as Global Network Services (GNS). For example, "American Express" branded cards are available from both American Express Travel Related Services Company, Inc (referred to herein as proprietary cards, or "Prop cards") as well as from other issuers (referred to herein as "GNS cards"), such as Citibank, N.A. of New York, N.Y. Accordingly, validation process 410 may include validation of proprietary cards and GNS cards. For proprietary cards, customer information is validated by TAP's card authorization system (CAS) 412, and for GNS cards, CM information is validated by GNS's card authorization system 414.

The CM may be provided the option to enroll more than one card and link each second and additional card to a primary enrolled card, which is illustrated in FIG. 4 as linking 416. Linking 416 provides the capability to assign a single registration identification to the CM and provides the CM the flexibility to make a purchase on any of the linked cards, with discount payments appearing on the CM's statement for the primary card. The linked cards may be all Prop cards, all GNS cards, or a mixture of Prop and GNS cards. Further, the linked cards assigned to a single registration identification may be corporate cards, personal cards, or a mixture thereof. The registration process may also include the capability of batch enrollment 420 of a plurality of cards of one or more CMs in a single instance. Information relating to enrolled CMs are stored in enrollee database 134. Information relating to linking 416 of a plurality of cards to the CM is also contained therein. Information from the enrollee database 134 may then be provided to RCE 138, as described above with reference to FIG. 2.

In the embodiment of FIG. 4, information on participating merchants and their offers are divided into separate databases, i.e., an offer database 452 and a merchant database 454, and provided to RCE 138. As described above, TAP may collaborate with a loyalty program provider (LPP) 460 to deliver loyalty incentives to the CM in the form of coupon-less discounts. Accordingly, offer database 452 and merchant database 454 may be populated by TAP and/or LPP, with offers and merchants associated with TAP's marketing programs and LPP's marketing programs, respectively. TAP may screen merchants participating in LPP's marketing programs prior to accepting and storing them in merchant database 454. TAP's program administrator (not shown) may upload merchants and offers to the respective databases along with other information associating merchants and offers with one or more marketing programs.

For marketing programs administered by TAP, registered card engine 138 may include its own calculation of discount 432 for purchases made by registered CMs with merchants participating in TAP's marketing program. Further, LPP 460 may be responsible for calculation of discount 462 for purchases made at merchants participating in marketing programs administered by LPP 460. A merchant may be a participating merchant for a plurality of externally administered and/or internally administered marketing programs. Therefore, these offer and merchant databases may include a field identifying each offer and merchant to one or more marketing programs, as further described below with reference to FIG. 5.

Another input to RCE 138 are merchant ROCs 436, which may be compiled as a daily transaction file and stored in transaction database 136 (shown in FIGS. 1 and 2). RCE 138 performs transaction matching of merchant ROCs 436 with enrolled CM information from enrollee database 134 and participating merchant and offer information from respective databases 454 and 452. Further detail regarding this matching will be described below with reference to FIGS. 5 through 7. Matched transactions relating to loyalty programs administered by loyalty program provider 460 are provided as an output file 444 to LPP 460 for discount calculation 462, whereby LPP 460 returns an output file (represented here as arrow 442), which includes the discount amount, or rebate credit, similar to the incentive payment field in output file 142 described above with reference to FIG. 3. This process of discount calculation by LPP 460 and exchange of information thereof with RCE 138 is discussed below with reference to FIG. 8.

A problem to be overcome in implementing a loyalty incentive program as described herein is how to deal with returns. For example, assume a card member makes a purchase for $100 and receives a 10% discount (also called a rebate or incentive) on his or her account. If the card member then returns the purchased goods to the merchant, it is desirable to be able to ascertain whether the purchase involved an incentive so that a return credit can be made in the appropriate amount. This problem is solved by providing a mechanism for dealing with returns. In the embodiment of FIG. 4, RCE 138 has the capability to process returns 456 on purchases for which a registered CM may have been provided a rebate credit pursuant to a marketing program. If a rebate credit had been previously provided, then processing of returns 456 includes providing a credit to the merchant for the earlier debited amount of the rebate credit provided to the CM and providing a corresponding debit to the CM of the earlier rebate credit. Processing of returns is similar to the transaction processing of purchases and is described in greater detail below with reference to FIGS. 6 and 7. Accordingly, output file 444 from RCE 438 may include return transactions, whereby loyalty program provider 460 calculates a negative discount, or a discount reversal amount, 464 for each eligible return. Eligible returns may be identified based on a stock keeping unit (SKU) associated with the purchase or based on the date of the purchase and the amount of the purchase (i.e., "backtrack discounts"). Logic associated with matching prior purchases with returns by means other than SKUs is described in further detail with reference to FIGS. 11 and 12.

RCE 138 has the capability to convert the discount amount to an equivalent of membership reward points which may be redeemable in accordance with membership rewards program. Typically, a membership rewards program offers goods or travel packages in exchange for membership reward points. Moreover, the discount amount may be a combination of a monetary credit and an equivalent of reward points. To implement such conversions, as well as to support service fee calculation, etc. RCE 138 may include a configuration table 434. Configuration table 434 may include fields for each marketing program and corresponding information for converting the calculated discount (i.e., the rebate credit) between a monetary credit and/or an equivalence in membership rewards points (shown as "CM (%, $, Pts)"). Further, since a discount offer may be represented in units of monetary amount off or percent off a purchase price, or in terms of membership rewards points, then for internally calculated discounts 432, RCE uses configuration table 434 to match program, merchant, and conversion terms (shown as "SE (%, $)") to convert the offer terms to the desired units for discount calculation. Configuration table 434 may also have a field for TAP's service fees for each program and participating merchants, and service fees may be in units such percent of purchase or monetary amount (shown as "TAP (%, $)"). Further, since a merchant may be submitting the same offer for more than one marketing program, configuration table includes a "priority" field that is used to identify repeated offers and ensure that the CM receives only a single rebate credit on a purchase that is eligible to receive a discount pursuant to multiple marketing programs.

The calculated discount (or discount reversal, if relating to a return) is provided to TAP settlement systems 470 for transactions on Prop registered cards, or to GNS settlement systems 480 for transactions on GNS registered cards. An AR system of TAP settlement systems 470 processes the discount amount and provides the rebate credit (as a monetary credit or an equivalence in reward points, or both) on CM's credit statement. If the rebate credit includes membership reward points, then information relating the rebate credit is also provided to membership rewards 472 for appropriate record keeping for that CM. AP systems of TAP settlement systems 470 processes the merchant debit in accordance with CM's rebate credit, as well as any service fee charged by TAP for providing the services described herein. Further detail regarding processing of matched transactions via TAP settlement systems is described below with reference to FIG. 8. GNS settlement systems 480 includes U.S. submissions 482, global clearing and settlement 484, and one or more issuers 486. Global clearing and settlement 484 may be considered a repository for RCE 138's matched transactions associated with GNS cards so as to permit each GNS issuer 486 to retrieve their respective GNS card transaction information, including information of the discount and any service fees charged by TAP. GNS issuers 486 may then use this information to provide a rebate credit to CMs accounts managed by issuers 486 and to provide a debit to participating merchants in a similar manner as described above with reference to FIG. 2. Further details regarding application of the registered card program to GNS registered cards is described below with reference to FIGS. 9 and 10.

RCE 138 may further have the capability to provide TAP with reporting 490, which may include a marketing analysis or monitoring of the success of various marketing programs and information relating to card member participation therein. Reporting 490 thereby permits TAP to target CMs and deliver merchant offers that are desirable to its registered CMs and/or merchants.

Offer DB 452 may comprise a plurality of offers. In an embodiment, the offers may be predetermined offers and/or offers based on merchant criteria. The offers may be configured to be delivered electronically through reporting 490. The electronic delivery may include delivery via email, text messaging, instant messaging and/or social networking distribution (e.g., via Facebook, Twitter, Myspace, Linked-in). The electronic delivery may be automatic or require a manual input. The offers may be accessible by RCE 138. These offers may be based upon specific parameters which define at least one of a reward, a merchant and/or class of merchants, characteristics of a targeted CM, a predetermined qualification threshold, and the like. RCE 138 may analyze the parameters to identify intended recipients of the offers. RCE 138 may also analyze the parameters to determine characteristics for a CM population. This capability allows the merchant to quickly and inexpensively target the CM with customized marketing and/or offers. This capability also allows the merchant to provide an offer to targeted CMs before a target list is pulled.

In an embodiment, reporting 490 may be configured to deliver offers to CMs with particular behaviors and/or patterns (e.g., spending behaviors, reward usage behaviors, etc). RCE 138 may be configured to define a particular CM population based on merchant targeted marketing efforts, CM spending patterns, CM demographic data and/or the like. For example, RCE 138 may identify a CM population that spends a predetermined amount of money on electronics in a predetermined period of time. Further, RCE 138 may identify a merchant who offers electronics for purchase, but does not capture significant spending from the identified CM population. In other words, the CMs who spend a predetermined amount on electronics are not spending significant amounts on electronics with the identified merchant. RCE 138 may analyze the CM spending to compare the total amount of spending on a particular class of items (e.g., electronics). RCE 138 may also analyze such CM spending based on merchants that receive the CM spend, to determine the proportions of spending at a particular merchant, class of merchants, and/or the like. Such information may be compared to a predetermined threshold spending amount or proportions of spending at particular merchants and/or classes of merchants. The comparison allows, for example, a merchant to target CMs that do not typically spend significant amounts with a particular merchant or class of merchant, but the CMs buy the types of products and/or services offered by the merchant or class of merchants.

CM populations may be initially created based on, for example, historical data. The historical data accessible to a financial processor, such as spend level data, is leveraged using various data clustering and/or data appending techniques. The CM populations may also be created based on, for example, current spending patterns. The current spend patterns available to a financial processor (e.g., current authorized transactions, posted transactions, and the like) may be leveraged using various data clustering and/or data appending techniques. Associations may be established among entities (e.g. CMs), among merchants, and between entities and merchants. In an embodiment, RCE 138 may receive passively collected spend level data for a transaction of a plurality of CMs, aggregate the collected spend level data for a plurality of CMs, and cluster the CMs into subsets of the plurality of CMs, based on the aggregated spend level data.

The collection of the spend level data may be passive. For instance, passively collecting spend level data of a CM includes acquiring the spend level data in response to a transaction by a CM with a merchant. In an embodiment, the spend level data may be integral to information processed in a transaction for goods and/or services with a merchant. For instance, a survey and/or survey responses are not needed to capture spend level data, but such data may be used to supplement the data discussed herein. Collecting the spend level data may include acquiring the spend level data from a merchant. In an embodiment, passively collecting the spend level data of a CM includes collecting the spend level data from a transaction database. In yet another embodiment, passively collecting the spend level data includes reconciling the spend level data, transferring the spend level data to a host, organizing spend level data into a format, saving the spend level data to a memory, gathering the spend level data from the memory, and/or saving the spend level data to a database. For instance, if a CM performs a transaction (such as by using a transaction account), spend level data (such as transaction data and/or consumer account data) related to the transaction may be captured and stored in a memory, database, and/or multiple databases. Spend level data (such as transaction data and/or consumer account data) may be stored locally with the merchant, remotely by the merchant and/or transmitted to a remote host (e.g., financial processor) for storing and processing.

In one embodiment, aggregating the collected spend level data includes combining a selectable range of collected spend level data. The selectable range may be a period of time (e.g., time range) and/or from a particular geographic region. The period may be any suitable period and/or periods such as a minute, an hour, a period of hours, one day, one week, one month, a period of days, a period of months, one year, or more than one year. The periods may be consecutive or non-consecutive. In an embodiment, the selectable range may be a value, such as values of spend exceeding a pre-selected threshold. The selectable range may also include frequency, such as spend level data occurring at a particular frequency.

In an embodiment, the spend level data may be segmented by a gender of the entity (e.g., male or female), such that only data collected from merchants in transactions with men are processed by RCE 138. This data may be aggregated, clustered, assigned a weighed percentile and analyzed in accordance with the previous descriptions. Using this exemplary embodiment of the system, preferences, attributes, and inferences of a selected demographic may be obtained. In one embodiment, spend level data segmented geographically (e.g., zip code) or by other regions can reveal which regions are most compelling to a merchant and/or marketer.

Any demographic included within the characteristic data may be selected for pre-segmenting the spend level data. In an embodiment, the spend level data may be segmented by an attribute (e.g., homeowner designation), and data collected from merchants in transactions with entities that are homeowners may be processed by RCE 138. This data may be aggregated, clustered, assigned a weighed percentile and analyzed in accordance with the previous descriptions. From this procedure, a holistic picture of homeowners segmented into different clusters may be created. More than one demographic or attribute may be selected and the spend level data may be pre-segmented any suitable number of times in any suitable order. Additionally, in one embodiment, a particular demographic may be selected to be removed from the larger set of all available spend level data. For instance, the spend level data of very high income entities may be selected for removal and data collected from merchants in transactions with very high income entities may be excluded from processing by RCE 138. The remaining data may be aggregated, clustered, assigned a weighed percentile and analyzed in accordance with the previous descriptions. Using this embodiment, outliers may be removed from the results. Additional details regarding combining CMs into populations are disclosed in, for example, U.S. application Ser. No. 12/690,669, entitled "System And Method For Clustering a Population Using Spend level Data" and filed on Jan. 20, 2010, which is hereby incorporated by reference in its entirety.

The CM populations may be established based on historical data or on current spending patterns, as discussed above, and in one embodiment are modified based on current spending habits. For example, spend level data may be actively captured and used to modify CM populations. As CM spending habits change, the groups are modified to provide greater accuracy for delivering rewards, merchant offers and the like. For example, a CM may be placed in a population of CMs whose spend level data suggests that they attend public entertainment events (e.g. movies, concerts, and the like). As time passes, the system may analyze a shift in the spend level data which suggests that the CM (possibly due to a having a new baby) attends less public entertainment events and spends more for home entertainment items, such as for example, home electronics equipment. In response to the shift in spend level data, RCE 138 may associate the CM with a new CM population which receives rewards offers for electronics. Further, RCE 138 may also remove a CM from a particular CM population based on current spend level data, wherein the CM was originally placed in a CM population based on historical spend level data, but no longer exhibits spending behavior consistent with the historical spend level data.

In one embodiment, in response to the determination that the CM population is spending on electronics, but not with a particular identified merchant, reporting 490 may send the CM population a reward offer from the identified merchant. The rewards offer may be designed to encourage the CM population to buy electronics from the identified merchant, with whom the CM population had not previously conducted significant business.

The terms of a rewards offer may define a trigger event, such as a threshold spending amount at a particular merchant or class of merchants, or for a class of items. The reward offer may be provided electronically to the CM population based on a trigger event (e.g., in real time). A trigger event may be any action identified by the merchant or the account issuer. The trigger event may be based on spend data, geographic region spend, CM population size, time of year, or any other event. The event may be identified by the merchant, CM and/or account issuer. For example, the trigger event may be based on spend data. In response to a CM population reaching a predetermined spend level on a class of products (e.g. electronics), the rewards offer may be sent to the CM population via e-mail. Similarly, the trigger event may be based on a CM population size. In response to the CM population reaching a predetermined level, a rewards offer is sent to the CM population. In another example, the merchant and a product supplier or manufacturer may create a joint offer, which provides a reward offer if a CM buys a particular item (e.g. a particular model laptop computer) or class of items (e.g. any Sony® television).

In an embodiment, a merchant may wish to market rewards offers to CM populations based on CMs spending at other merchants. For example, a merchant that sells home improvement items (e.g. Home Depot) may wish to market its products and services to a CM population that spends a predetermined amount on electronics. The merchant may formulate a set of criteria to develop a CM population based on spend data for electronics purchases (e.g. televisions) and/or spend data at particular electronics merchants (e.g. Best Buy). Thereafter, rewards offers from the merchant are provided to the CM population in response to a trigger event.

In an embodiment, the identified merchant offer is provided in conjunction with an existing rewards program. For example, the CM may be eligible for a reward based on the CM's pre-existing participation in a rewards program. The reward offer is provided in addition to the existing reward. For example, a CM is provided with a credit based on a particular transaction at a particular merchant. The transaction may also result in the CM becoming a member of a particular CM population that is provided with a rewards offer (e.g. an additional discount with the identified merchant based on the loyal spending behavior). As such, the CM receives the pre-existing reward and the reward offer based on the CM becoming a member of a CM population.

In an embodiment, a CM is automatically enrolled in a program to receive e-mail rewards based on criteria determined by a merchant or account issuer. In an embodiment, a CM may be invited to join a CM population that is eligible to receive rewards offers. The CM may receive a notification which indicates that the CM is eligible to receive rewards offers. The notification may provide for an opt-out period during which the CM can request that the CM is not sent the rewards offers based on the CM's inclusion in a CM population. The notification may also provide that the CM register to receive the rewards offers by taking some affirmative action, such as for example, registering the CM's account via a webpage and/or contacting the account issuer and requesting to be included in the CM population associated with the rewards offers.

RCE 138 may be configured to administer rewards associated with a prepaid transaction account. The prepaid transaction account may comprise embedded rewards, including for example, credits to the prepaid transaction account, merchant specific rewards (e.g. merchant gift cards), discounts, and the like. The rewards may be customized by a merchant. The rewards may be offered in conjunction the pre-paid transaction cards (e.g. American Express Gift Cards, Home Depot Gift Card). Offers may be customized by an individual merchant or a group of merchants. This ability to customize offers allows local and regional merchants to offer rewards to customers that were previously unavailable because of the cost and complexity of administering a rewards program. Further, providing rewards with a prepaid transaction account allows those who are not credit card users to participate in rewards programs traditionally reserved for credit card account holders.

In an embodiment, a prepaid transaction account has an embedded reward which is configured by an offering merchant. For example, a merchant may configure a reward which provides a credit on purchases of certain products and/or services (e.g. dry cleaning services) at the merchant or within a group of cooperating merchants. The reward may also be based on transactions conducted in a geographic or other region. In one embodiment, the reward may be limited or restricted for use in a similar or other geographic region. The rewards may be offered through a prepaid account, such as a prepaid transaction card, available for purchase through the offering merchant. The prepaid transaction account may be used with any merchant who accepts transaction accounts from the account issuer associated with the prepaid transaction card. Further, the prepaid transaction account may be configured with pre-determined reward criteria from the offering merchant. For example, when seventy percent of the total value of the prepaid card is spent with the offering merchant, a reward is issued. The reward may be issued in the form of a credit to the prepaid transaction account, or may be provided in some other fashion (e.g. another gift card from the offering merchant).

In an embodiment, participation in the rewards program associated with the prepaid transaction account may be automatic or may require registration. Registration may be provided by accessing a webpage and providing identifying information. Registration may also be achieved by contacting an account issuer and requesting that a particular prepaid transaction account be associated with a rewards program.

In an embodiment, any prepaid transaction account associated with an account issuer may participate in any rewards program offered by the account issuer. The transaction account may be registered with the account issuer for a particular rewards program selected by a prepaid transaction account owner. Where the activities associated with the transaction account conform to the rules governing the rewards program, a reward is provided to the prepaid transaction account owner.

Cancellations 440 of registered accounts by enrolled CMs are communicated to loyalty program provider 460 as well as to enrollment 120 so as to maintain enrollee database 134 with up-to-date enrolled CM information. Cancellations 440 may arise, for example, from a CM reporting a lost or stolen card or a CM requesting TAP to deregister one or more of its registered cards from the registered card program. In an embodiment, enrollee database 134 may be provided with timely and consistent updates to reflect lost and stolen cards.

Cancellations 440 may also include deregistration of a CM from one or more particular marketing programs administered by TAP or LPP 460.

Further description will now be provided with respect to solicitation 110 and enrollment 120. As noted above with reference to FIG. 2, CM may be solicited to join an incentive program offered by TAP via an email invitation from LPP 460. In this instance, a CM may receive a solicitation email providing a link to a loyalty program's website landing page, whereby the CM may begin an enrollment process. The enrollment may include, for example, the steps of agreeing to the incentive program's terms and conditions, setting up a username and password and selecting marketing preferences, etc. Moreover, such an incentive program website may be hosted by LPP 460 and branded by TAP. As such, the enrollment process may further include providing TAP with the CM's email address, such as when the card member clicks on the link of the solicitation email to start the enrollment process. TAP may use CM's email address to validate the CM prior to enrollment 120 via validation process 410. Further, the incentive program's website may provide registered CMs with a customized home page where they may be presented with personalized offers (such as those identified based on their selected marketing preferences), as well as being able to engage in online shopping of goods and services offered by merchants participating in the particular marketing program(s) in which the card member enrolls. If a CM receives an email solicitation but is already enrolled in TAP's registered card program, then by clicking on the link provided in the solicitation email, the already enrolled CM may be prompted to log in to their customized homepage. As noted above, a CM may be solicited indirectly simply by being provided with access to a website link to the enrollment webpage and/or TAP's enrollment webpage for the registered card program. Further, enrollment in TAP's registered card program via a TAP-hosted website link may allow for enrollment in TAP's marketing programs as well as a marketing program offered in collaboration with one or more loyalty program providers.

Solicitation 110 may further include a pre-solicitation process prior to sending a solicitation email to a targeted CM. The pre-solicitation process may involve determining which CMs should be targeted and which offer clusters and particular marketing programs the CM may be eligible to participate in pursuant to the registered card program. Accordingly, TAP may collaborate with LPP 460 to identify appropriate CMs for email solicitation based on TAP's data on a CM's spending preferences and the LPP's clusters of merchant offers. These identified, targeted CMs may then reviewed so as to exclude solicitation of any targeted CMs having opted out of receiving direct marketing materials from TAP or LPP 460. TAP then provides LPP 460 with a marketing list of targeted CMs and associated identifying information (such as salutation, name, gender, and zip code). The marketing list may further be provided to LPP 460 with a given effective period during which solicitation emails may be sent, since the list should be updated periodically to exclude CMs from the list that have since opted out of receiving marketing materials. Upon receipt of the marketing list from TAP, loyalty program provider sends out email invitations to the targeted CMs.

Enrollment 120 may provide an option to the CM to participate in the registered card program as a preferred enrollee. For example, during enrollment a card member may choose to be eligible for "premium" offers in exchange for paying an enrollment fee. Alternatively, the CM may wish to forego payment of any enrollment fee and be eligible for "everyday" offers. Preferred (i.e., premium) customers may also be eligible for everyday offers. TAP's registered card program may therefore offer tiers of offer packages corresponding to the "premium" and "everyday" tiers of enrolled card members. Accordingly, RCE 138, during transaction matching, may consider whether an enrolled CM is registered as a premium card member or an everyday card member so as to identify CM purchases that qualify for a premium offer and/or an everyday offer.

Figure 5:
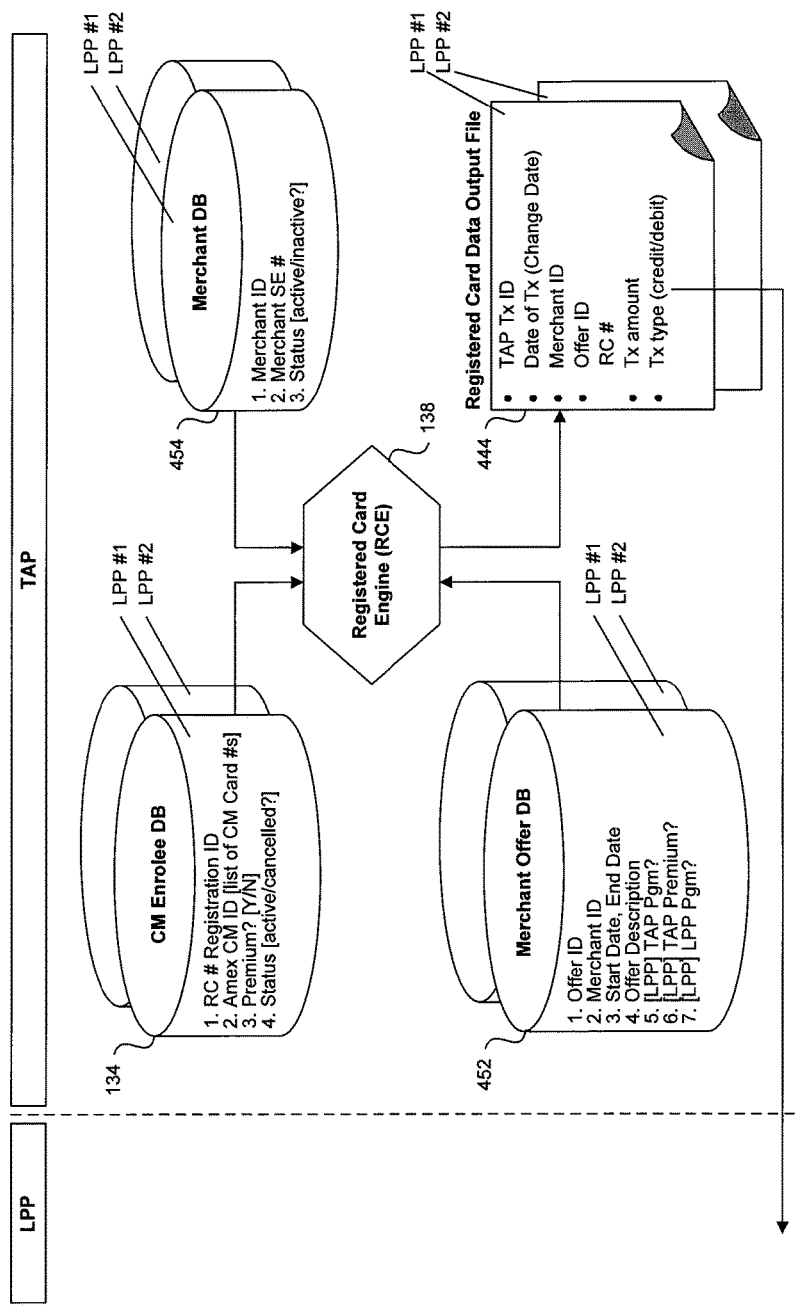
FIG. 5 is a high level flow diagram showing data flow of card member customer information and participating merchant information for transaction matching, in accordance with an embodiment.

An embodiment, the TAP collaborates with loyalty program provider 460 will now be described in greater detail with reference to FIGS. 5 through 8. FIG. 5 illustrates transaction-based data flow between databases at TAP during transaction matching by RCE 138. As shown, CM enrollee database 134 may include such data as a CM's registration identification (RC# ID) for one or more registered transaction cards linked together in accordance with linking step 416, described above; a list of account numbers for these linked cards; indication of whether the CM is a premium card member; and whether the CM and/or their registered transaction card(s) are active or canceled pursuant to cancellations 440 (shown in FIG. 4). A second enrollee database (i.e., database identified as "LPP#2") and other additional enrollee databases may be provided for enrollees of each distinct loyalty program or program provider. Alternatively, a single enrollee database 134 may be provided for all enrollees of the registered card program, with another data field provided which identifies the one or more loyalty program providers the CM is associated with. Likewise, separate merchant database may be provided for each loyalty program or program provider, or a single database may be provided with a data field identifying the merchant with the program(s) or provider(s). Merchant database 454 may include a merchant ID, its SE #, as well as whether the merchant is actively or inactively enrolled in the registered card program.

Merchant offer database 452 may include an offer ID, a corresponding merchant ID, a start and end date for the particular offer, a description, and whether the offer is a premium offer, as described above. Since TAP and LPP may each administer marketing programs, and since there may be multiple loyalty program providers, merchant offer database 452 may also include a field identifying each TAP or LPP marketing program to which the offer belongs. FIG. 5 also shows exemplary data contained in output file 444 provided to the loyalty program provider(s) for discount calculation (or discount reversal calculation, in the case of return), as described above with reference to FIG. 4. In this figure, "Tx" represents the term "transaction." As shown, output file 444 includes: transaction ID, transaction date, merchant ID and offer ID, card member's registration identification (RC#), transaction amount, as well as whether the transaction type is a credit (return) or a debit (purchase).

In this embodiment, output file 444 includes CM's RC# as a substitute for the CM's actual transaction account number. Output file 444 is provided to LPP for discount calculation, and the level of security associated with LPP's network may prohibit allowing LPP using the actual account number as a means to identify the transaction for discount calculation. However, it should be understood that for internally calculated discounts 432 (described in FIG. 4) or in instance where secure networks exists with the loyalty program provider(s), then output file may contain the particular transaction account number associated with the transaction. As such, the discount calculated by LPP may be directly matched with the card number and may also be provided on the statement for a secondary card, rather than appearing on the statement of the primary card, which may occur when several linked cards are associated with CM's registration identification (RC#).

Figure 6:
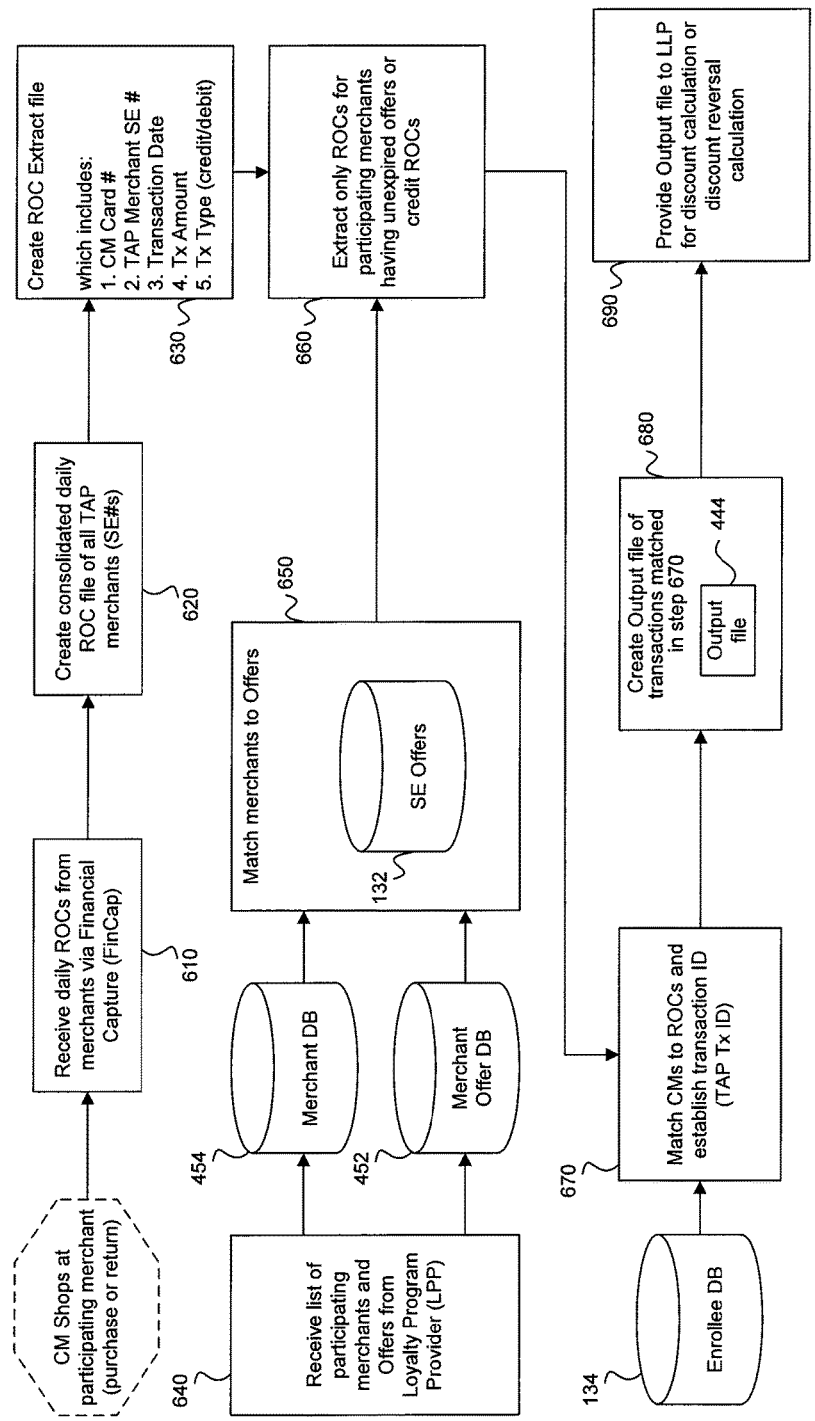
FIG. 6 is a flow diagram of a transaction matching process, in accordance with an embodiment.
Figure 7:
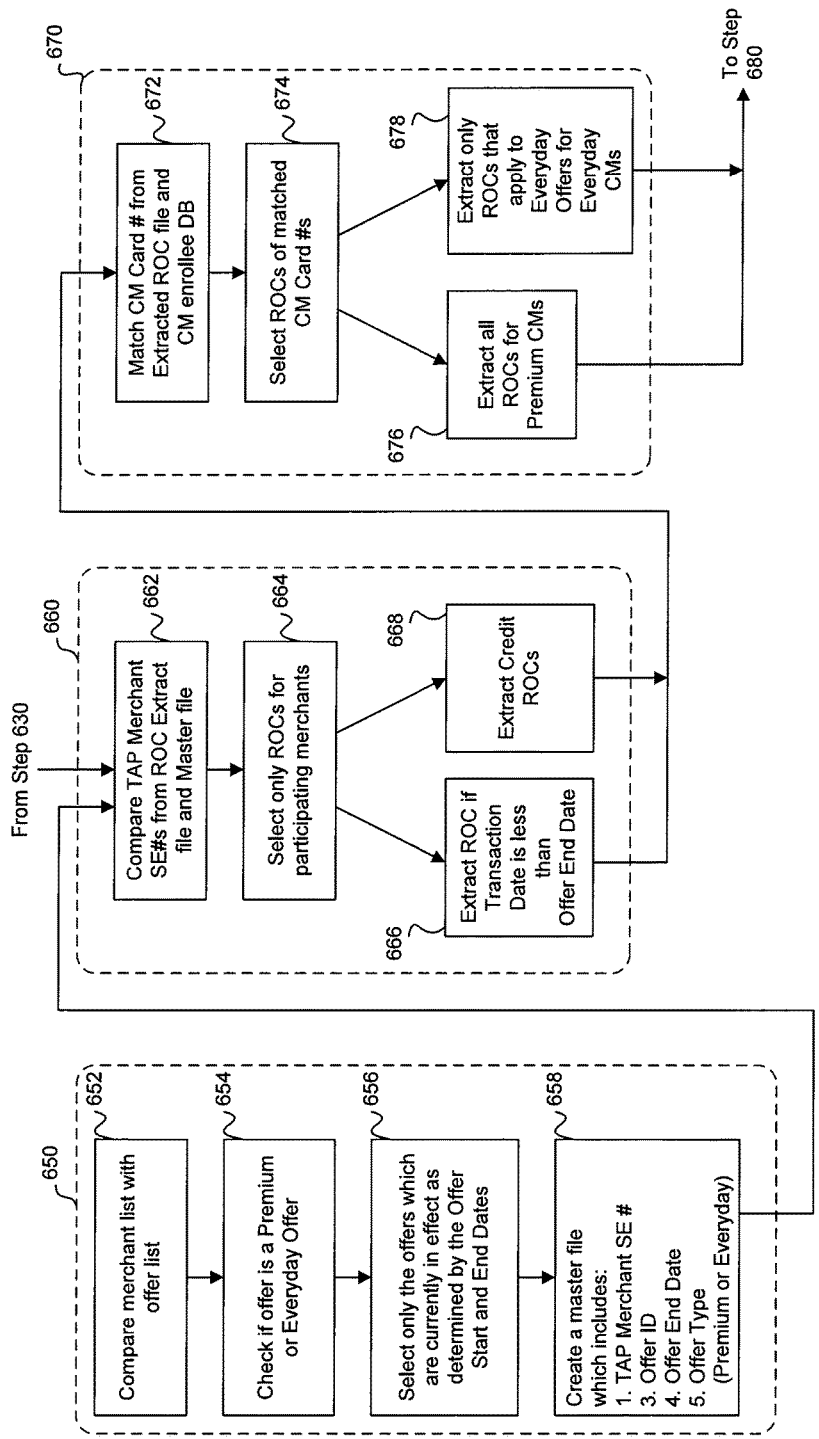
FIG. 7 is a flow diagram illustrating the processes associated with individual steps shown in FIG. 6.
Figure 8:
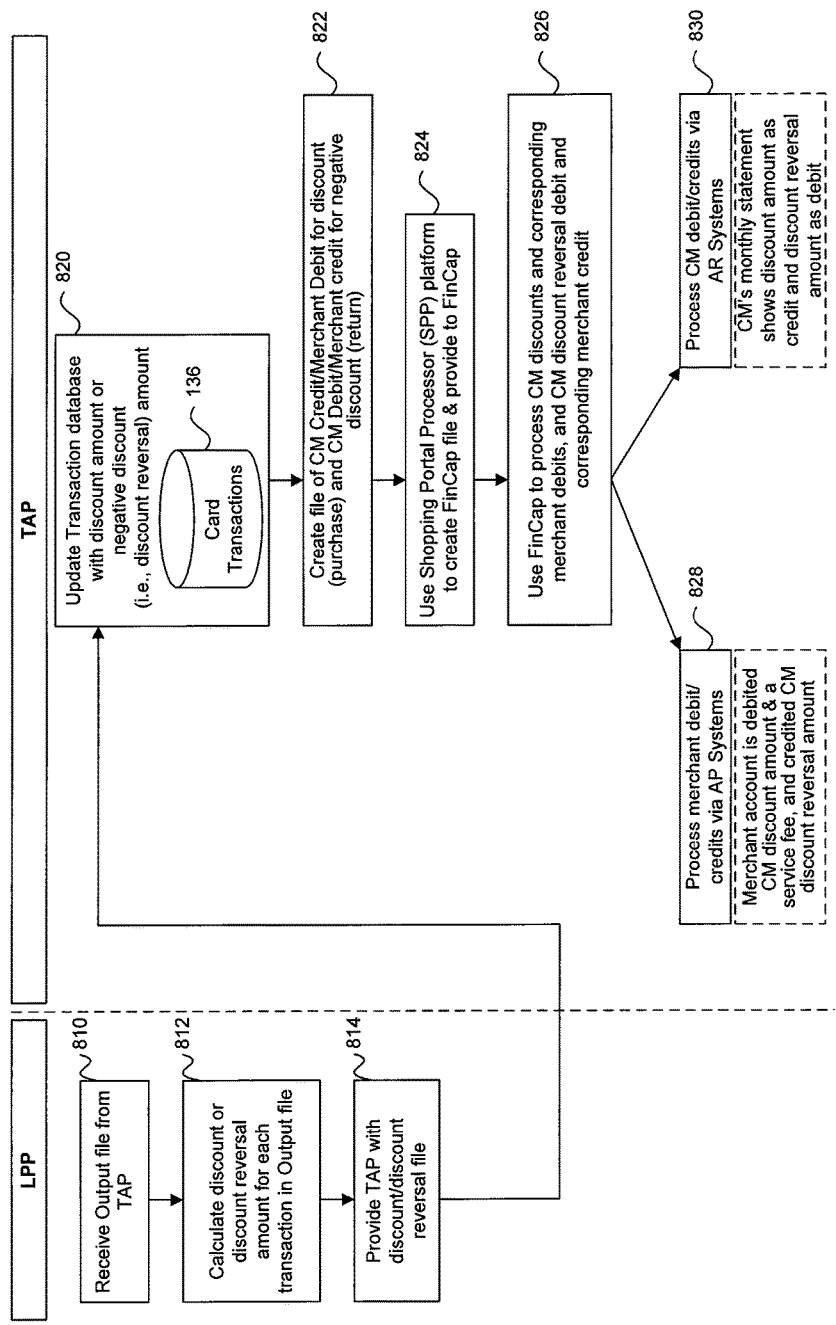
FIG. 8 is a flow diagram of transaction based data flow between a third party loyalty program provider and a transaction account provider, in accordance with an embodiment.

FIGS. 6 and 7 show in greater detail the process of transaction matching by RCE 138 when a registered CM shops at a participating merchant. FIG. 8 shows in detail an embodiment of a process for calculation (via LPP) of CM discount credits and discount reversal debits and their subsequent processing so as to appear on CM and merchant statements. The processes of FIGS. 6 through 8 are shown to incorporate both CM purchases and their returns. Accordingly, the output file provided to LPP and an input file from LPP to TAP (as shown and later described in step 814 in FIG. 8), as well as creation of a file of merchant credit-debit and card member credit/debit (as shown in step 822 of FIG. 8), are described to include information relating to both purchases and returns. It should be understood, however, that individual files at the noted steps may be provided, one for processing of discounts for purchases and another for processing discount reversals for returns. Further description of methodologies for identifying whether a return is on a purchase for which a CM received a discount will be described with reference to FIGS. 11 and 12.

FIG. 6 shows steps in a process from the point when the card member makes a purchase or return at a particular participating merchant to when an output file is provided to an LPP for discount calculation (or discount reversal calculations). In step 610, TAP receives daily ROCs from merchants via its financial capture system (FinCap). In step 620, TAP creates a consolidated daily ROC file of all merchants associated with TAP. As part of the consolidation, TAP may monitor ROC submissions for return ROCs, i.e., ROCs having a negative amount for the transaction amount, and/or for which the transaction type is identified as a credit, whereby the transaction may be subject to additional processing to determine whether a negative discount (i.e., discount reversal) is due prior to including the transaction on the output file provided to the LPP for discount reversal calculation. In step 640, TAP receives the list of participating merchants and offers from LPP. Participating merchants and offers are stored in merchant database 454 and merchant offer database 452, respectively. At step 650, merchants are matched to offers, and at step 660, ROCs are extracted for only those participating merchants that have unexpired offers. Also extracted are credit ROCs (i.e., ROCs for returns).

Once TAP identifies credit ROCs from participating merchants, TAP may compare them to transaction debits stored in transaction database 136 (see FIG. 8) over a given time period (e.g., the last 60 days, or the last 90 days) to determine whether there exists a debit ROC with the same merchant as the credit ROC, for the same registered card. If found, TAP further checks to see if the previous transaction was eligible for a rebate credit and the amount of the rebate credit that was provided to the CM. If the previous transaction is eligible for a rebate credit, then a debit corresponding to the amount of the rebate credit in full (corresponding to full returns) or in part (corresponding to partial returns) is charged to the card member. These debits thereby adjust the net return credit to equal the original purchase price less the rebate credit. The merchant is reimbursed for the amount of the debited rebate credit, and the merchant's reimbursement appears as a credit on the merchant's account. The determination of the discount reversal amount (i.e., amount of the debited rebate credit) is based on the CM's rebated credit on the original purchase rather than the debit received by the merchant, since the merchant's previous debit for the CM's rebate credit may include an associated service fee imposed by TAP and/or LPP. As noted above, in one embodiment, stock keeping units (SKU's) of purchased goods/services are used to match purchases with returns and determine the discount reversal amount. In another embodiment, certain assumptions are made in accordance with a return logic policy to do the matching. Exemplary return logic policy is described below with reference to FIGS. 11 and 12.

At step 670, CM information in enrollee database 134 is used to match registered CMs with ROCs extracted in step 660, and each matched transactions is provided with a transaction ID. In step 680, output file 444 is created of transactions matched in step 670. At step 690, output file 444 is provided to loyalty program provider for discount/discount reversal calculation.

FIG. 7 shows in greater detail the matching processes of steps 650 and 670 and the process of extraction step 660 of FIG. 6, in accordance to an embodiment. Step 650, for the matching of merchants to offers, may include steps 652, 654, 656 and 658. In step 652, the list of merchants from merchant database 454 is compared with the list of offers in merchant offer database 452. In step 654, offers are checked to be either premium or everyday offers. In step 656, offers are selected for inclusion in a master file in step 658 if the offers are currently in effect as determined by the offer start and end dates, and in step 658, a master file is created which includes the merchant SE#, the offer ID, the offer end date, and the offer type (premium or everyday). Extraction step 660 receives the ROC extraction file from step 630 (see FIG. 6) as well as the master file of step 658. In this embodiment, extraction step 660 includes steps 662, 664, 666 and 668. In step 662, merchant SE#s are compared to the ROC extract file of step 660 and master file of step 658, and in step 654, ROCs for merchants participating in TAP's registered card program are selected. Of the selected ROCs for participating merchants, the ROCs are extracted if (in step 666) the transaction date is less than the offer end date reflected in the master file, or if (in step 668) the ROC is a credit ROC. These extracted ROCs are an input to matching step 670 that includes steps 672, 674, 676 and 678. In step 672, CM account/card numbers from the extracted ROC file are matched with the registered accounts stored in enrollee database 134. In step 674, those ROCs corresponding to the registered accounts of CMs are selected. If the registered CM is a premium CM then at step 676, all ROCs are extracted for the CM; otherwise, at step 678 only ROCs that apply to everyday offers are extracted for the CM. These extracted ROCs are provided to step 680 of FIG. 6 for creation of output file 444.

As shown in FIG. 8, the LPP receives output file 444 from TAP at step 810. In step 812, the LPP calculates the discount or negative discount (i.e., discount reversal) amount for each purchase and return transaction, respectively. In step 814, a file including a discount or discount reversal calculation (such as file 442 provided to RCE 138, described above in FIG. 4) is provided to TAP. TAP uses this file at step 820 to update its transaction database with discount amounts or negative discount amounts, whereby the original ROC transaction is matched with these discounts or negative discounts. At step 822, TAP creates a file of CM credits and corresponding merchant debits for discounts associated with a purchase. Further, TAP may include CM debits and merchant credits for negative discounts associated with returns. In step 824, TAP's SPP (shopping portal processor) platform is used to create a FinCap file which is provided to FinCap, and in step 826, FinCap processes CM discounts (i.e., rebate credits) and CM discount reversals. In particular, as described above in FIG. 4, RCE 138 provides TAP's AP (accounts payable) system with information on merchant debits and credits for processing at step 828 and provides TAP's AR (accounts receivable) system with information on card member debits and credits for processing at step 830. Pursuant to step 828, a merchant's account is debited for the CM's rebated credit, may be further debited a service fee, and is credited a CM's discount reversal amount in the case of an eligible return. Pursuant to step 840, a CM's account (or monthly statement) shall show a credited amount in accordance with any rebate credit and a debited amount in accordance with any discount reversal arising from an eligible return.

Figure 11:
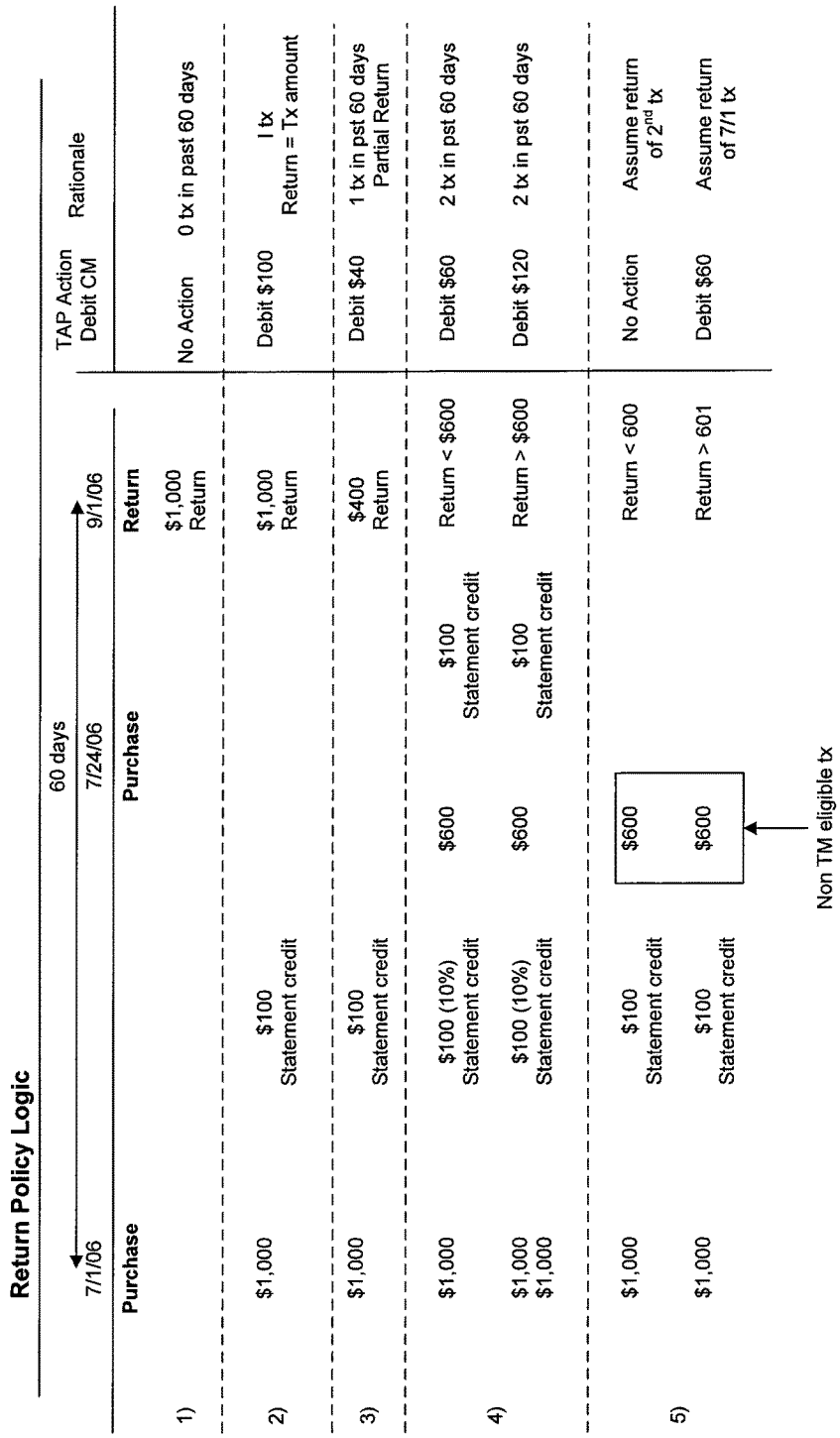
FIG. 11 is a diagram of a method for determining whether a return relates to a purchase for which a rebate credit was provided to the card member customer, in accordance with an embodiment.

Methodologies unique to processing of card member returns by means of a return logic policy in accordance with an embodiment are now described with reference to FIGS. 11 and 12. In these figures "TM tx" represents CM transactions which were eligible for a rebate credit in accordance with the TailorMade$^{SM}$ registered card program described herein. FIG. 11 provides examples of actions taken in response to returns. For example, in line 1 of FIG. 11, a $1,000 return is made on Sep. 1, 2006. In response to this return, TAP will take no action with respect to debiting any rebate credit, because there were no transactions made in the prior 60 days to correspond to the $1,000 return. In line 2, for the same return, it is determined that there was a $1,000 purchase within the prior 60 days along with a $100 statement credit. Therefore, it is assumed that the $100 statement credit was a rebate credit that must be debited. In line 3, a $400 return is made. In this case, a proportional $40 debit is made to correspond to the portion of the rebate credit on the $400 purchase that was returned. Additional examples and assumptions/rationales are provided in FIG. 11.

FIG. 12 provides additional examples of return policy logic in which a CM may be debited for identified rebate credit(s) on TM (TailorMade$^{SM}$)transactions. As shown in FIG. 12, if the CM is debited for identified rebate credit(s), and if the CM disputes the credit and claims that the return is part of a non-TM transaction (i.e., a transaction in which the CM did not receive a rebate credit), then the rebate credit is written off of CM's account. For example, in the line 1 of FIG. 12, a return is made for $1000, and it assumed that the return is associated the first exact transaction in the past 60 days for that is the same amount as the return. In this example, transaction "6" is the first transaction of $1000, and the return is associated with transaction "6." Since transaction "6" was discounted 10%, whereby the CM received a rebate credit of $100, then the CM is debited the $100. If the CM disputes the debit, such as by claiming that the return is in fact part of transaction "4," then the debit is written off, since transaction "4" was not subject to a discount.

If in line 1 there is no exact matched transaction identified with the return, then, in line 2, the first transaction in the past 60 days which is greater than the amount of the return is identified with the return. As shown in line 2, transaction "6" for $5000 is the first matched transaction having an amount greater than the return. Since transaction "6" was not discounted, then no action is taken with regard to debiting CM. If CM claims that the return is part of transaction "5" and "2", then a debit from the CM's account is made in the amount of the rebate credits (15% and 15%) for those transactions. If there is no transaction matched in lines 1 or 2, then in line 3, if the sum of the return is equal or smaller than the sum of all transactions in the past 60 days, then it is assumed that the return refers to TM transactions up to $1000, and a debit to CM's account is provided in accordance with the discounts on TM transactions 2 and 5.

Figure 9:
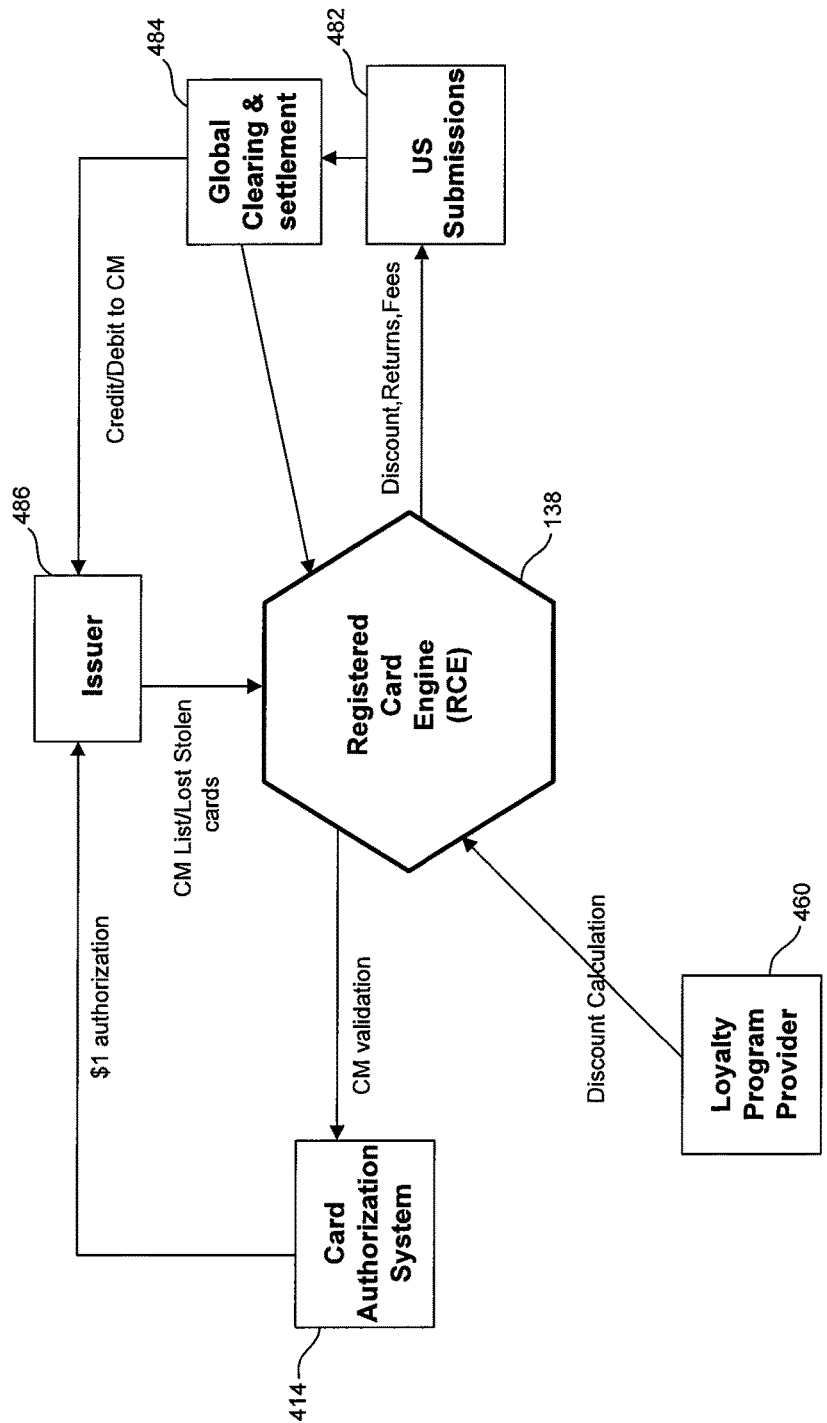
FIG. 9 is a high level flow diagram of a process of providing loyalty incentives to a card member customer using a transaction card issued by a third party transaction account provider.
Figure 10:
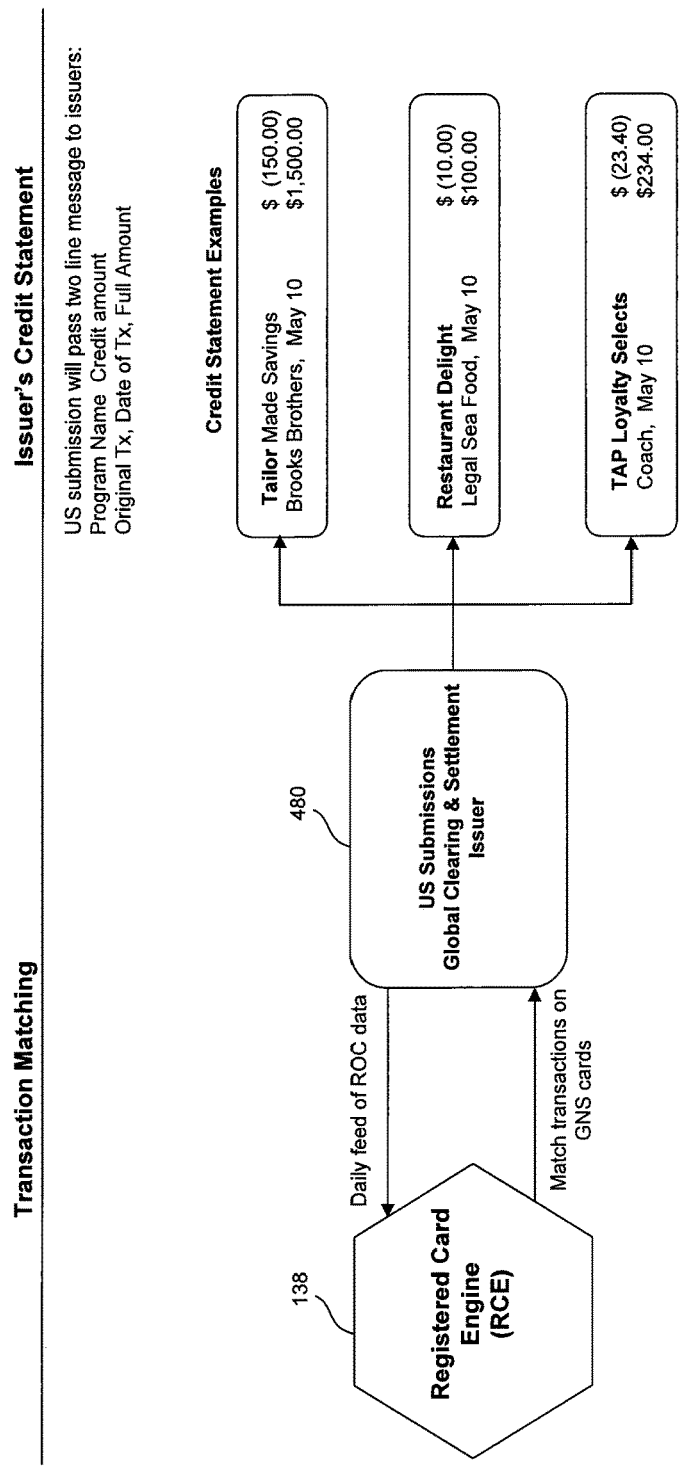
FIG. 10 is another high level flow diagram of the process of FIG. 9, providing an exemplary credit statement of the third party transaction account provider, in accordance with an embodiment.

FIGS. 9 and 10 show high level flow diagrams of a process for transaction matching (via RCE 138) of registered GNS cards. As shown in FIG. 9, transactions deserving of discounts or discount reversals as well as any service fees are provided to U.S. Submissions 482 which is placed at global clearing and settlement 484, which is a repository for collection by GNS issuers 486 for processing of credits and debits on GNS cards held by registered CMs (referred to as "GNS CMs"). Global clearing and settlement 484 is also a repository for daily ROC data that is submitted to RCE 138 for transaction matching. Although not shown here, GNS issuers 486 provide TAP with information on GNS accounts held by registered CMs to permit transaction matching, and also to permit enrollee database 134 to be updated according to cancellations 440 (as described above with reference to FIG. 4). In an embodiment shown in FIG. 9, card authorization system 414 may involve a one dollar authorization by which the CM's card is validated at enrollment. As shown in FIGS. 9 and 10, U.S. submissions 482 receives discount, returns, and service fee information from RCE 138 that is used by GNS issuers 486 to settle with merchants and GNS CMs. U.S. submissions 482 passes a two line message to GNS issuers 486, which appears on the respective issuer's credit statement. A similar two line message may be provided on GNS CM's account statement, thereby providing transparency of the settlement of transactions made pursuant to TAP's registered card program to both GNS CMs and CMs holding cards issued by TAP, such as in the manner described above with reference to FIG. 2.

The present invention or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

Figure 13:
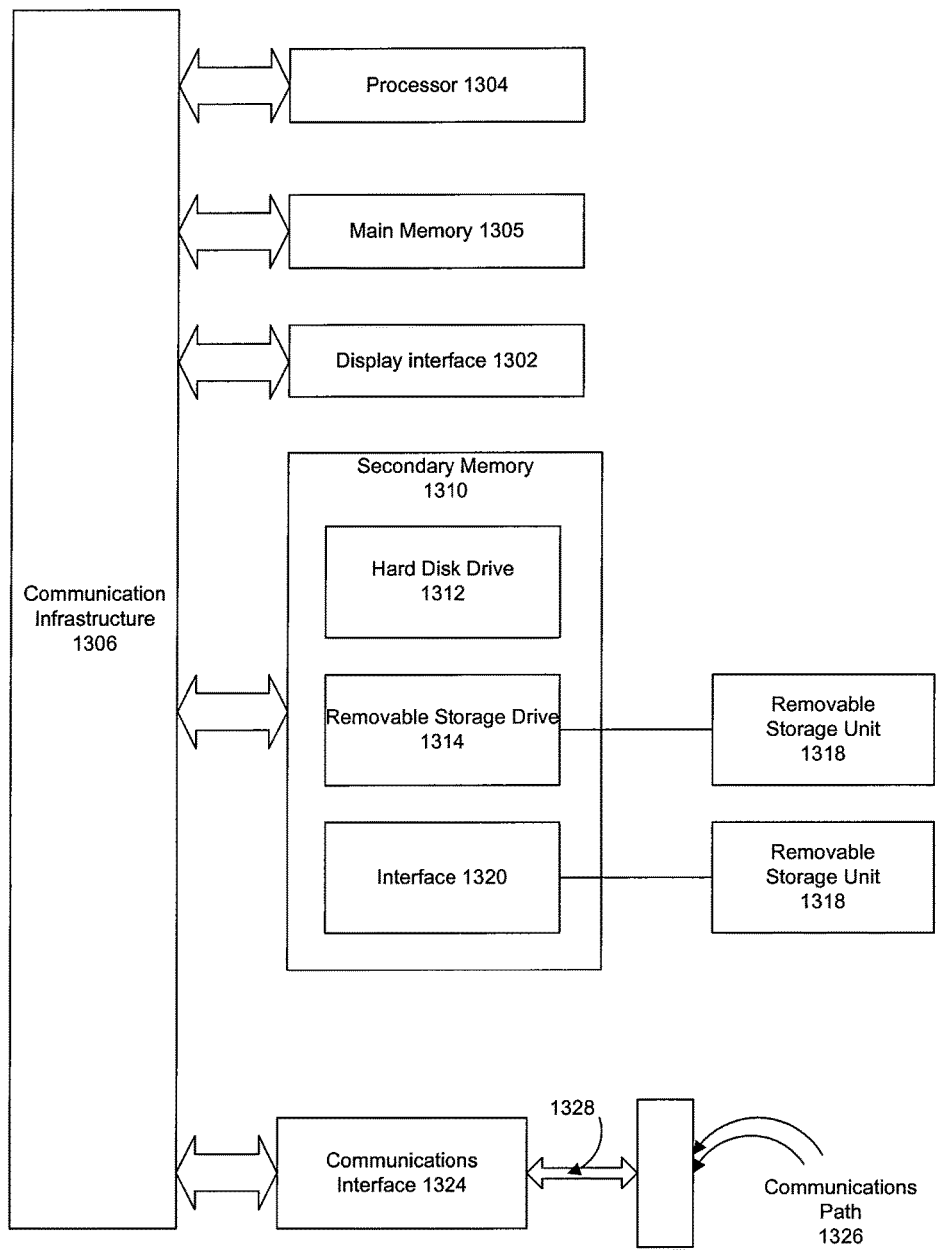
FIG. 13 is a block diagram of an exemplary computer system used for implementing an embodiment.

In fact, in one embodiment, the embodiments are directed toward one or more computer systems capable of carrying out the functionality described herein. An example of a computer system 1300 is shown in FIG. 13.

The computer system 1300 includes one or more processors, such as processor 1304. The processor 1304 is connected to a communication infrastructure 1306 (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures.

Computer system 1300 can include a display interface 1302 that forwards graphics, text, and other data from the communication infrastructure 1306 (or from a frame buffer not shown) for display on the display unit 1330.

Computer system 1300 also includes a main memory 1308, such as for example random access memory (RAM), and may also include a secondary memory 1310. The secondary memory 1310 may include, for example, a hard disk drive 1312 and/or a removable storage drive 1314, representing a floppy disk drive, a magnetic tape drive, an optical disk drive, etc. The removable storage drive 1314 reads from and/or writes to a removable storage unit 1318 in a well known manner. Removable storage unit 1318 represents a floppy disk, magnetic tape, optical disk, etc. which is read by and written to by removable storage drive 1314. As will be appreciated, the removable storage unit 1318 includes a computer usable storage medium having stored therein computer software and/or data.

In alternative embodiments, secondary memory 1310 may include other similar devices for allowing computer programs or other instructions to be loaded into computer system 1300. Such devices may include, for example, a removable storage unit 1318 and an interface 1320. Examples of such may include a program cartridge and cartridge interface (such as that found in video game devices), a removable memory chip (such as an erasable programmable read only memory (EPROM), or programmable read only memory (PROM)) and associated socket, and other removable storage units 1318 and interfaces 1320, which allow software and data to be transferred from the removable storage unit 1318 to computer system 1300.

Computer system 1300 may also include a communications interface 1324. Communications interface 1324 allows software and data to be transferred between computer system 1300 and external devices. Examples of communications interface 1324 may include a modem, a network interface (such as an Ethernet card), a communications port, a Personal Computer Memory Card International Association (PCMCIA) slot and card, etc. Software and data transferred via communications interface 1324 are in the form of signals 1328 which may be electronic, electromagnetic, optical or other signals capable of being received by communications interface 1324. These signals 1328 are provided to communications interface 1324 via a communications path (e.g., channel) 1326. This channel 1326 carries signals 1328 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 1314 and a hard disk installed in hard disk drive 1312. These computer program products provide software to computer system 1300.

Computer programs (also referred to as computer control logic) are stored in main memory 1308 and/or secondary memory 1310. Computer programs may also be received via communications interface 1324. Such computer programs, when executed, enable the computer system 1300 to perform the features as discussed herein. In particular, the computer programs, when executed, enable the processor 1304 to perform the features of various embodiments. Accordingly, such computer programs represent controllers of the computer system 1300.

In an embodiment, software may be stored in a computer program product and loaded into computer system 1300 using removable storage drive 1314, hard drive 1312 or communications interface 1324. The control logic (software), when executed by the processor 1304, causes the processor 1304 to perform the functions of various embodiments as described herein.

In another embodiment, hardware components such as application specific integrated circuits (ASICs). Implementation of the hardware state machine so as to perform the functions described herein will be apparent to persons skilled in the relevant art(s).

One skilled in the art will appreciate that system 100 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of system 100, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with system 100 by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of system 100, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 100 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 100 may consist of any combination thereof at a single location or at multiple locations, wherein each database or system 100 includes any of various suitable security features, such as firewalls, access codes, encryption, decryption, compression, decompression, and/or the like.

In addition to those described above, the various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards And Protocols (1998); Java 2 Complete, various authors, (Sybex 1999); Deborah Ray And Eric Ray, Mastering Html 4.0 (1997); and Loshin, TCP/IP Clearly Explained (1997) and David Gourley and Brian Tatty, HTTP, The Definitive Guide (2002), the contents of which are hereby incorporated by reference.

The invention may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and/or the like, which may carry out a variety of functions under the control of one or more microprocessors or other control devices. Similarly, the software elements of system 100 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 100 may employ any number of conventional techniques for data transmission, signaling, data processing, network control, and/or the like. Still further, system 100 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to 'at least one of A, B, or C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

We claim:

1. A method, comprising:

receiving, by a computer based system, a prepaid transaction account identifier that corresponds to a prepaid transaction account, wherein the prepaid transaction account identifier does not particularly identify a user of the prepaid transaction account;

linking, by the computer based system and in response to the receiving, the prepaid transaction account with a rewards program based on the prepaid transaction account identifier, wherein the rewards program includes a rewards program identifier, and wherein the rewards program is linked to a social networking channel profile for a social networking channel;

receiving, by the computer based system and from a merchant system, an authorization request for a transaction including transaction information, wherein the transaction was initiated with the prepaid transaction account;

determining, by the computer based system and in response to the receiving the authorization request from the merchant system and prior to approving the authorization request, an offer from a plurality of offers based on the authorization request associated with the prepaid transaction account, wherein the offer applies to the transaction initiated with the prepaid transaction account;

transmitting, by the computer based system and through the social networking channel, a notice of a reward credit amount associated with the offer;

approving, by the computer based system, the authorization request for the transaction based on the transaction information received from the merchant; and crediting, by the computer based system, the reward credit amount to the transaction account in response to the authorizing the transaction initiated by the prepaid transaction account.

2. The method of claim 1, wherein the user of the transaction account is identified in response to registering the transaction account.

3. The method of claim 1, further comprising determining, by the computer based system, the reward credit amount based on the transaction information and in response to the transaction information complying with a rule from the offer.

4. The method of claim 1, further comprising monitoring, by the computer based system, transactions associated with the prepaid transaction account.

5. The method of claim 1, further comprising:
registering, by the computer based system, the transaction account with the rewards program; and
assigning, by the computer based system, the rewards program identifier to the transaction account.

6. The method of claim 1, further comprising providing, by the computer based system and in response to the linking, notifications through the social networking channel of the plurality of offers for the prepaid transaction account.

7. The method of claim 1, further comprising selecting, by the computer based system and in response to the linking, the transaction account to receive the reward credit amount for transactions initiated by the prepaid transaction account that are eligible for reward credit amounts.

8. The method of claim 1, wherein the reward credit amount is credited to the transaction account based on the rewards program identifier being associated with the transaction account and the prepaid transaction account.

9. The method of claim 1, further comprising determining, by the computer based system, that the transaction information satisfies a rule associated with the offer, wherein the offer is associated with the rewards program.

10. The method of claim 1, wherein the offer is a merchant offer, and wherein the offer is funded by the merchant.

11. The method of claim 1, wherein a rule is provided by the merchant and the rule defines a basis for providing the offer from the merchant.

12. The method of claim 1, wherein the reward credit amount is provided by a transaction account issuer.

13. The method of claim 1, further comprising evaluating, by the computer based system, at least one of a first activity associated with the prepaid transaction account or a second activity associated with the transaction account against offer rules.

14. The method of claim 13, further comprising transmitting, by the computer based system, the offer in response to at least one of the first activity or the second activity conforming with at least a portion of the offer rules.

15. The method of claim 1, wherein the offer has a monetary value.

16. The method of claim 1, wherein the transaction information is real time spend data and includes requests for authorization and transactions that have been posted to the prepaid transaction account.

17. The method of claim 1, wherein the prepaid transaction account is used for purchasing from the merchant participating in the rewards program.

18. The method of claim 1, wherein the prepaid transaction account identifier anonymously associates the prepaid transaction account with the reward program.

19. A tangible, non-transitory computer-readable storage medium having computer-executable instructions stored thereon that, if executed by a computer based system, causes the computer based system to be capable of performing a method comprising:

receiving, by the computer based system, a prepaid transaction account identifier that corresponds to a prepaid transaction account, wherein the prepaid transaction account identifier does not particularly identify a user of the prepaid transaction account;

linking, by the computer based system and in response to the receiving, the prepaid transaction account with a rewards program based on the prepaid transaction account identifier, wherein the rewards program includes a rewards program identifier, and wherein the rewards program is linked to a social networking channel profile for a social networking channel;

receiving, by the computer based system and from a merchant system, an authorization request for a transaction including transaction information, wherein the transaction was initiated with the prepaid transaction account;

determining, by the computer based system and in response to the receiving the authorization request from the merchant system and prior to approving the authorization request, an offer from a plurality of offers based on the authorization request associated with the prepaid transaction account, wherein the offer applies to the transaction initiated with the prepaid transaction account;

transmitting, by the computer based system and through the social networking channel, a notice of a reward credit amount associated with the offer;

approving, by the computer based system, the authorization request for the transaction based on the transaction information received from the merchant; and crediting, by the computer based system, the reward credit amount to the transaction account in response to the authorizing the transaction initiated by the prepaid transaction account.

20. A system comprising:
a processor; and
a tangible network interface communicating with a non-transitory memory,
the non-transitory memory communicating with the processor, and
the processor, when executing a computer program, performs operations comprising:
receiving, by the processor, a prepaid transaction account identifier that corresponds to a prepaid transaction account,
wherein the prepaid transaction account identifier does not particularly identify a user of the prepaid transaction account;
linking, by the processor and in response to the receiving, the prepaid transaction account with a rewards program based on the prepaid transaction account identifier, wherein the rewards program includes a rewards program identifier, and wherein the rewards program is linked to a social networking channel profile for a social networking channel;

receiving, by the processor and from a merchant system, an authorization request for a transaction including transaction information, wherein the transaction was initiated with the prepaid transaction account;

determining, by the processor and in response to the receiving the authorization request from the merchant system and prior to approving the authorization request, an offer from a plurality of offers based on the authorization request associated with the prepaid transaction account, wherein the offer applies to the transaction initiated with the prepaid transaction account;

transmitting, by the processor and through the social networking channel, a notice of a reward credit amount associated with the offer;

approving, by the processor, the authorization request for the transaction based on the transaction information received from the merchant; and crediting, by the processor, the reward credit amount to the transaction account in response to the authorizing the transaction initiated by the prepaid transaction account.

\* \* \* \* \*